(12) United States Patent
Carrigan et al.

(10) Patent No.: US 12,267,128 B2
(45) Date of Patent: Apr. 1, 2025

(54) SYSTEMS, METHODS, AND GRAPHICAL USER INTERFACES FOR AUTOMATIC AUDIO ROUTING

(71) Applicant: Apple Inc., Cupertino, CA (US)

(72) Inventors: Taylor G. Carrigan, San Francisco, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/133,484

(22) Filed: Apr. 11, 2023

(65) Prior Publication Data

US 2023/0246671 A1     Aug. 3, 2023

Related U.S. Application Data

(63) Continuation of application No. 17/023,274, filed on Sep. 16, 2020, now Pat. No. 11,722,178.

(Continued)

(51) Int. Cl.
*H04B 5/79*     (2024.01)
*G06F 9/54*     (2006.01)
(Continued)

(52) U.S. Cl.
CPC ............... *H04B 5/79* (2024.01); *G06F 9/542* (2013.01); *H02J 50/80* (2016.02); *H04L 65/75* (2022.05);
(Continued)

(58) Field of Classification Search
USPC ........................................................ 320/108
See application file for complete search history.

(56) References Cited

U.S. PATENT DOCUMENTS 5,003,607 A    3/1991   Reed
8,126,399 B1   2/2012   Lee
(Continued)

FOREIGN PATENT DOCUMENTS

CN     102439972 A    5/2012
CN     104054323 A    9/2014
(Continued)

OTHER PUBLICATIONS

Notice of Allowance, dated May 24, 2023, received in Korean Patent Application No. 2020-7027641, which corresponds with U.S. Appl. No. 16/920,303, 2 pages.

(Continued)

*Primary Examiner* — Mohammed Alam
(74) *Attorney, Agent, or Firm* — Morgan, Lewis & Bockius LLP

(57) ABSTRACT

A first electronic device is wireless connected to an audio output device that is also concurrently wirelessly connected with a second electronic device that is different from the first electronic device and playing first audio corresponding to first audio data transmitted by the second electronic device to the audio output device. The first electronic device, in response to detecting a user request to play a second audio that is associated with a media item, transmits to the audio output device second audio data corresponding to the second audio. In accordance with the second audio data being transmitted to the audio output device, the audio output device ceases playing the first audio and begins playing the second audio.

39 Claims, 58 Drawing Sheets

Related U.S. Application Data

(60) Provisional application No. 63/041,715, filed on Jun. 19, 2020, provisional application No. 63/033,086, filed on Jun. 1, 2020.

(51) Int. Cl.
*H02J 50/80* (2016.01)
*H04L 65/75* (2022.01)
*H04L 67/125* (2022.01)
*H04R 1/10* (2006.01)
*H04R 5/033* (2006.01)
*H04R 5/04* (2006.01)
*H04W 76/15* (2018.01)
*H04W 76/20* (2018.01)

(52) U.S. Cl.
CPC .............. *H04L 67/125* (2013.01); *H04R 1/10* (2013.01); *H04R 5/033* (2013.01); *H04R 5/04* (2013.01); *H04W 76/15* (2018.02); *H04W 76/20* (2018.02)

(56) References Cited

U.S. PATENT DOCUMENTS

| | | |
|---|---|---|
| 8,290,537 B2 | 10/2012 | Lee et al. |
| 8,831,238 B2 | 9/2014 | Rashid et al. |
| 8,971,546 B2 | 3/2015 | Millington et al. |
| 9,148,717 B2 | 9/2015 | Shaffer |
| 9,210,498 B1 | 12/2015 | Shaffer |
| 9,342,354 B2 | 5/2016 | Banda |
| 9,344,801 B2 | 5/2016 | Yoo et al. |
| 9,385,546 B2 | 7/2016 | Wakayama et al. |
| 9,398,367 B1 | 7/2016 | Scott et al. |
| 9,729,958 B2 | 8/2017 | Jaques et al. |
| 9,807,491 B2 | 10/2017 | Kim |
| 9,894,452 B1 | 2/2018 | Termeulen et al. |
| 9,936,297 B2 | 4/2018 | Dennis |
| 9,949,015 B1 | 4/2018 | Minoo et al. |
| 9,949,021 B1 | 4/2018 | Voigt et al. |
| 10,042,595 B2 | 8/2018 | Behzadi et al. |
| 10,045,111 B1 | 8/2018 | Bonner et al. |
| 10,133,358 B1 | 11/2018 | Chen et al. |
| 10,136,214 B2 | 11/2018 | Smus et al. |
| 10,142,577 B1 | 11/2018 | Laird |
| 10,157,037 B2 | 12/2018 | Patel et al. |
| 10,165,347 B2 | 12/2018 | Pantfoerder et al. |
| 10,200,780 B2 | 2/2019 | Steiner |
| 10,405,165 B2 | 9/2019 | Llami et al. |
| 10,423,381 B2 | 9/2019 | Utsuki et al. |
| 10,560,773 B1 | 2/2020 | Roadley-Battin et al. |
| 10,628,105 B2 | 4/2020 | Behzadi et al. |
| 10,735,554 B1 | 8/2020 | Jorgovanovic |
| 10,873,798 B1 | 12/2020 | Jackson et al. |
| 10,951,043 B2 | 3/2021 | Behzadi et al. |
| 11,006,201 B2 | 5/2021 | Kumar et al. |
| 11,018,516 B2 | 5/2021 | Cho et al. |
| 11,089,398 B1 | 8/2021 | Venkatraman et al. |
| 11,115,746 B1 | 9/2021 | Morrison et al. |
| 11,204,733 B2 | 12/2021 | Behzadi et al. |
| 11,211,819 B2 | 12/2021 | Ng et al. |
| 11,228,625 B1 | 1/2022 | Libin |
| 11,240,583 B1 | 2/2022 | DeMaio |
| 11,258,280 B2 | 2/2022 | Li |
| 11,269,575 B2 | 3/2022 | Behzadi et al. |
| 11,688,382 B2 | 6/2023 | Hull et al. |
| 2003/0202341 A1 | 10/2003 | McClanahan |
| 2003/0223604 A1 | 12/2003 | Nakagawa |
| 2006/0135218 A1 | 6/2006 | Son et al. |
| 2006/0166718 A1 | 7/2006 | Seshadri et al. |
| 2006/0193487 A1 | 8/2006 | Mok et al. |
| 2006/0200358 A1 | 9/2006 | Ohnemus et al. |
| 2007/0206829 A1 | 9/2007 | Weinans et al. |
| 2007/0213092 A1 | 9/2007 | Geelen |
| 2007/0300063 A1 | 12/2007 | Adams et al. |
| 2008/0065720 A1 | 3/2008 | Brodersen et al. |
| 2008/0076489 A1 | 3/2008 | Rosener et al. |
| 2008/0152160 A1 | 6/2008 | Chew et al. |
| 2008/0166968 A1 | 7/2008 | Tang et al. |
| 2008/0226094 A1 | 9/2008 | Rutschman |
| 2008/0248748 A1 | 10/2008 | Sangster et al. |
| 2008/0280655 A1 | 11/2008 | Ozaki |
| 2009/0081999 A1 | 3/2009 | Khasawneh et al. |
| 2009/0170431 A1 | 7/2009 | Pering et al. |
| 2009/0280871 A1 | 11/2009 | Hofer et al. |
| 2010/0041333 A1 | 2/2010 | Ungari et al. |
| 2010/0074451 A1 | 3/2010 | Usher et al. |
| 2010/0110368 A1 | 5/2010 | Chaum |
| 2010/0309284 A1 | 12/2010 | Samadani et al. |
| 2010/0310087 A1 | 12/2010 | Ishida |
| 2010/0320961 A1 | 12/2010 | Castillo et al. |
| 2011/0116643 A1 | 5/2011 | Tiscareno et al. |
| 2011/0159959 A1 | 6/2011 | Mallinson et al. |
| 2011/0222701 A1 | 9/2011 | Donaldson et al. |
| 2011/0286615 A1 | 11/2011 | Olodort et al. |
| 2012/0096188 A1 | 4/2012 | Cohen et al. |
| 2012/0144473 A1 | 6/2012 | Wyld |
| 2012/0215366 A1 | 8/2012 | Redmond et al. |
| 2012/0262537 A1 | 10/2012 | Baker et al. |
| 2012/0289157 A1 | 11/2012 | Palin et al. |
| 2012/0317194 A1 | 12/2012 | Tian |
| 2013/0010975 A1 | 1/2013 | Tsingos et al. |
| 2013/0121494 A1 | 5/2013 | Johnston |
| 2013/0154917 A1 | 6/2013 | Adermann et al. |
| 2013/0182867 A1 | 7/2013 | Knowles |
| 2013/0300463 A1* | 11/2013 | Gemmeke ............ G06F 1/3296 716/108 |
| 2013/0311694 A1 | 11/2013 | Bhamidipati et al. |
| 2013/0316679 A1* | 11/2013 | Miller ................ H04R 1/08 455/569.1 |
| 2014/0016803 A1 | 1/2014 | Puskarich |
| 2014/0037104 A1 | 2/2014 | Seo et al. |
| 2014/0126733 A1 | 5/2014 | Gauger, Jr. et al. |
| 2014/0126734 A1 | 5/2014 | Gauger, Jr. et al. |
| 2014/0143744 A1* | 5/2014 | Dimond ................ G06F 30/34 716/105 |
| 2014/0152235 A1 | 6/2014 | Huang et al. |
| 2014/0247948 A1 | 9/2014 | Goldstein |
| 2014/0270200 A1 | 9/2014 | Usher et al. |
| 2014/0317242 A1 | 10/2014 | Koo et al. |
| 2014/0341399 A1 | 11/2014 | Dusse et al. |
| 2015/0054458 A1 | 2/2015 | Yoon et al. |
| 2015/0102879 A1 | 4/2015 | Jacobs et al. |
| 2015/0110263 A1 | 4/2015 | Johnston |
| 2015/0121328 A1* | 4/2015 | Segal ................ G06F 30/398 716/113 |
| 2015/0200558 A1 | 7/2015 | Castillo et al. |
| 2015/0230022 A1 | 8/2015 | Sakai et al. |
| 2015/0245126 A1 | 8/2015 | Shaffer |
| 2015/0245127 A1 | 8/2015 | Shaffer |
| 2015/0281830 A1 | 10/2015 | Gauger, Jr. et al. |
| 2015/0294662 A1 | 10/2015 | Ibrahim |
| 2015/0310846 A1 | 10/2015 | Andersen et al. |
| 2015/0319554 A1 | 11/2015 | Blanche et al. |
| 2015/0331940 A1 | 11/2015 | Manning |
| 2015/0351143 A1 | 12/2015 | Seymour et al. |
| 2016/0007140 A1 | 1/2016 | Yae et al. |
| 2016/0014492 A1 | 1/2016 | McCarthy et al. |
| 2016/0029114 A1 | 1/2016 | Chen |
| 2016/0071409 A1 | 3/2016 | Suomela et al. |
| 2016/0072936 A1 | 3/2016 | Kim et al. |
| 2016/0073249 A1 | 3/2016 | Moore et al. |
| 2016/0077843 A1 | 3/2016 | Jakoboski et al. |
| 2016/0094934 A1 | 3/2016 | Yang et al. |
| 2016/0109931 A1 | 4/2016 | Kobayashi |
| 2016/0119708 A1 | 4/2016 | Rodzevski et al. |
| 2016/0134141 A1 | 5/2016 | Jentz et al. |
| 2016/0165381 A1 | 6/2016 | Kapoor et al. |
| 2016/0180806 A1 | 6/2016 | Sharp et al. |
| 2016/0219358 A1 | 7/2016 | Shaffer et al. |
| 2016/0241972 A1 | 8/2016 | Gobeli et al. |
| 2016/0291666 A1 | 10/2016 | Hosoya et al. |
| 2016/0327911 A1 | 11/2016 | Eim et al. |
| 2016/0351183 A1 | 12/2016 | Gauger, Jr. et al. |

(56) References Cited

U.S. PATENT DOCUMENTS

| | | |
|---|---|---|
| 2017/0013345 A1 | 1/2017 | Kumar et al. |
| 2017/0026509 A1 | 1/2017 | Rand |
| 2017/0048613 A1 | 2/2017 | Smus et al. |
| 2017/0078820 A1 | 3/2017 | Brandenburg et al. |
| 2017/0108906 A1 | 4/2017 | Chandra et al. |
| 2017/0134845 A1 | 5/2017 | Milam et al. |
| 2017/0140089 A1* | 5/2017 | Hathaway ............. G06F 30/398 |
| 2017/0180840 A1 | 6/2017 | Yamkovoy |
| 2017/0192746 A1 | 7/2017 | Jeong et al. |
| 2017/0193974 A1 | 7/2017 | Gadonniex et al. |
| 2017/0195466 A1 | 7/2017 | Chen |
| 2017/0214994 A1 | 7/2017 | Gadonniex et al. |
| 2017/0245039 A1 | 8/2017 | Chen |
| 2017/0251295 A1 | 8/2017 | Pergament et al. |
| 2017/0256978 A1 | 9/2017 | Sauterel et al. |
| 2017/0293577 A1 | 10/2017 | Gomzin et al. |
| 2017/0318374 A1 | 11/2017 | Dolenc et al. |
| 2017/0339483 A1 | 11/2017 | Ergezer et al. |
| 2018/0014973 A1 | 1/2018 | Echeverri et al. |
| 2018/0048960 A1 | 2/2018 | Jeffrey et al. |
| 2018/0067712 A1 | 3/2018 | Behzadi et al. |
| 2018/0081453 A1 | 3/2018 | Ely |
| 2018/0088897 A1 | 3/2018 | Mathur |
| 2018/0091887 A1* | 3/2018 | Minoo ................. H04R 1/1025 |
| 2018/0114518 A1 | 4/2018 | Scanlan et al. |
| 2018/0132088 A1 | 5/2018 | Lee |
| 2018/0152781 A1 | 5/2018 | Boyer et al. |
| 2018/0206022 A1 | 7/2018 | Hsieh |
| 2018/0206025 A1 | 7/2018 | Rule et al. |
| 2018/0242085 A1 | 8/2018 | Dohmen et al. |
| 2018/0249266 A1 | 8/2018 | Termeulen et al. |
| 2018/0277123 A1 | 9/2018 | Boesen et al. |
| 2018/0279063 A1 | 9/2018 | Sun et al. |
| 2018/0286428 A1 | 10/2018 | Seider |
| 2018/0295439 A1 | 10/2018 | Garrett |
| 2018/0295455 A1 | 10/2018 | Eichfeld et al. |
| 2018/0301134 A1 | 10/2018 | Le et al. |
| 2018/0310116 A1 | 10/2018 | Arteaga et al. |
| 2018/0341448 A1 | 11/2018 | Behzadi et al. |
| 2018/0376528 A1 | 12/2018 | Lee et al. |
| 2019/0007780 A1 | 1/2019 | Sheaffer et al. |
| 2019/0052951 A1 | 2/2019 | Kofman et al. |
| 2019/0075385 A1 | 3/2019 | Lee et al. |
| 2019/0081499 A1 | 3/2019 | Sun et al. |
| 2019/0124432 A1 | 4/2019 | Champy |
| 2019/0155487 A1 | 5/2019 | Zhao |
| 2019/0179604 A1 | 6/2019 | Alexander et al. |
| 2019/0215611 A1 | 7/2019 | Lou et al. |
| 2019/0227536 A1* | 7/2019 | Cella ................... G06F 16/2477 |
| 2019/0278556 A1 | 9/2019 | Usher et al. |
| 2019/0305591 A1 | 10/2019 | Ng et al. |
| 2019/0313178 A1 | 10/2019 | Mutlu et al. |
| 2019/0320282 A1 | 10/2019 | Moeller |
| 2019/0339825 A1 | 11/2019 | Anzures et al. |
| 2019/0341050 A1 | 11/2019 | Diamant et al. |
| 2019/0361666 A1 | 11/2019 | Oide et al. |
| 2019/0394607 A1 | 12/2019 | Laaksonen et al. |
| 2020/0007989 A1 | 1/2020 | Gong et al. |
| 2020/0014792 A1 | 1/2020 | Lyren et al. |
| 2020/0067340 A1 | 2/2020 | Batra et al. |
| 2020/0120384 A1 | 4/2020 | Armaly |
| 2020/0150740 A1 | 5/2020 | Zhang et al. |
| 2020/0169101 A1 | 5/2020 | Li |
| 2020/0204484 A1* | 6/2020 | Altman ................. H04L 47/125 |
| 2020/0213705 A1 | 7/2020 | Ding et al. |
| 2020/0213799 A1 | 7/2020 | Lyren |
| 2020/0218486 A1 | 7/2020 | Behzadi et al. |
| 2020/0275223 A1 | 8/2020 | Usher et al. |
| 2020/0367006 A1 | 11/2020 | Beckhardt |
| 2021/0014610 A1 | 1/2021 | Carrigan et al. |
| 2021/0014611 A1 | 1/2021 | Carrigan et al. |
| 2021/0014612 A1 | 1/2021 | Carrigan |
| 2021/0014613 A1 | 1/2021 | Carrigan et al. |
| 2021/0092543 A1 | 3/2021 | Salehin et al. |
| 2021/0126470 A1 | 4/2021 | Banerjee et al. |
| 2021/0210967 A1 | 7/2021 | Xiongbin |
| 2021/0218595 A1 | 7/2021 | Liu et al. |
| 2021/0255816 A1 | 8/2021 | Behzadi et al. |
| 2021/0258419 A1 | 8/2021 | Lyren et al. |
| 2021/0281943 A1 | 9/2021 | Lehnert |
| 2021/0329367 A1 | 10/2021 | Fletcher et al. |
| 2021/0376880 A1* | 12/2021 | Carrigan ................. G06F 9/542 |
| 2021/0377663 A1* | 12/2021 | Carrigan ................. G06F 9/542 |
| 2021/0391739 A1 | 12/2021 | Venkatraman et al. |
| 2022/0078864 A1 | 3/2022 | Yang et al. |
| 2022/0103963 A1 | 3/2022 | Satongar et al. |
| 2022/0107771 A1 | 4/2022 | Behzadi et al. |
| 2022/0256275 A1 | 8/2022 | Bang et al. |
| 2022/0337969 A1 | 10/2022 | Seefeldt et al. |
| 2022/0374197 A1 | 11/2022 | Carrigan |
| 2023/0007398 A1 | 1/2023 | Carrigan |
| 2023/0020542 A1 | 1/2023 | Satongar et al. |
| 2023/0246671 A1* | 8/2023 | Carrigan ................. H04R 5/033 |
| | | 320/108 |
| 2024/0078079 A1 | 3/2024 | Carrigan et al. |
| 2024/0184513 A1 | 6/2024 | Carrigan |

FOREIGN PATENT DOCUMENTS

| | | |
|---|---|---|
| CN | 104365173 A | 2/2015 |
| CN | 106291121 A | 1/2017 |
| CN | 206759683 U | 12/2017 |
| EP | 2190213 A1 | 5/2010 |
| EP | 3188495 A1 | 7/2017 |
| EP | 3001695 B1 | 7/2018 |
| EP | 3456299 A1 | 3/2019 |
| EP | 3599777 A1 | 1/2020 |
| EP | 3664092 A1 | 6/2020 |
| JP | S60-150899 A | 8/1985 |
| JP | 2006-093792 | 4/2006 |
| JP | 2009-532937 | 9/2009 |
| JP | 2011-521504 | 7/2011 |
| JP | 2012-524917 | 10/2012 |
| JP | 2013-051626 A | 3/2013 |
| JP | 2015-173369 A | 10/2015 |
| JP | 2015-537466 A | 12/2015 |
| JP | 2016-076202 A | 5/2016 |
| JP | 2017-126873 A | 7/2017 |
| JP | 2019-504346 A | 2/2019 |
| JP | 2022-078056 A | 5/2022 |
| KR | 101236167 B1 | 2/2013 |
| KR | 2014-0018701 A | 2/2014 |
| KR | 2015-0021803 A | 3/2015 |
| KR | 101518010 B1 | 5/2015 |
| KR | 2016-0098522 A | 8/2016 |
| KR | 2016-0103779 A | 9/2016 |
| KR | 2017-0138588 A | 12/2017 |
| KR | 2019-0013880 A | 2/2019 |
| WO | WO 2008/000304 A1 | 1/2008 |
| WO | WO 2012/170446 A2 | 12/2012 |
| WO | WO 2013/030736 A1 | 3/2013 |
| WO | WO 2013/064747 A1 | 5/2013 |
| WO | WO 2015/006950 A1 | 1/2015 |
| WO | WO 2015/185123 A1 | 12/2015 |
| WO | WO 2016/036541 A2 | 3/2016 |
| WO | WO 2016/063143 A1 | 4/2016 |
| WO | WO 2016/066483 A1 | 5/2016 |
| WO | WO 2017203484 A1 | 11/2017 |
| WO | WO 2017/179409 A | 11/2018 |
| WO | WO 2019/053993 A1 | 3/2019 |
| WO | WO 2020/204611 A1 | 10/2020 |
| WO | WO 2021/136671 A1 | 7/2021 |
| WO | WO 2022/031260 A1 | 2/2022 |

OTHER PUBLICATIONS

Patent, dated Nov. 28, 2023, received in Chinese Patent Application No. 202011544171.2, which corresponds with U.S. Appl. No. 16/824,506, 6 pages.

Patent, dated Oct. 5, 2023, received in Japanese Patent Application No. 2022-018022, which corresponds with U.S. Appl. No. 17/306,898, 4 pages.

(56) References Cited

OTHER PUBLICATIONS

Notice of Allowance, dated Oct. 23, 2023, received in U.S. Appl. No. 17/379,864, 9 pages.
Final Office Action, dated Jan. 16, 2024, received in U.S. Appl. No. 17/553,018, 17 pages.
Final Office Action, dated Oct. 17, 2023, received in Korean Patent Application No. 2022-7016117, which corresponds with U.S. Appl. No. 17/553,018, 4 pages.
Office Action, dated Jan. 8, 2024, received in U.S. Appl. No. 17/898,735, 16 pages.
Office Action, dated Oct. 13, 2023, received in U.S. Appl. No. 17/947,042, 29 pages.
Invitation to Pay Additional Fees, dated Dec. 13, 2023, received in International Patent Application No. PCT/US2023/032012, which corresponds with U.S. Appl. No. 18/241,778, 13 pages.
Patent, dated Jun. 13, 2023, received from Chinese Patent Application No. 202011538744.0, which corresponds with U.S. Appl. No. 16/056,328, 6 pages.
Decision to Grant, dated Jun. 22, 2023, received from European Patent Application No. 22161118.9, which corresponds with U.S. Appl. No. 17/028,936, 3 pages.
Notice of Allowance, dated Jul. 6, 2023, received in U.S. Appl. No. 17/379,864, 9 pages.
Office Action, dated Jun. 23, 2022, received in U.S. Appl. No. 17/553,018, 17 pages.
Office Action, dated Oct. 10, 2023, received in European Patent Application No. 20745450.5, which corresponds with U.S. Appl. No. 16/920,303, 9 pages.
Patent, dated Jul. 19, 2023. received in European Patent Application No. 23175376.5, which corresponds with U.S. Appl. No. 17/028,936, 3 pages.
Notice of Allowance, dated Sep. 8, 2023, received in Japanese Patent Application No. 2022-018022, which corresponds with U.S. Appl. No. 17/306,898, 1 page.
Final Office Action, dated Sep. 19, 2023, received in U.S. Appl. No. 17/898,735, 15 pages.
European Search Report, dated Sep. 1, 2023, received in European Patent Application No. 23175376.5, 16 pages.
Aguilera et al., "Spatial Audio for Audioconferencing in Mobile Devices: Investigating the Importance of Virtual Mobility and Private Communication and Optimizations", https://www.aes.og/e-lib=18138, 4 pages.
Anonymous, "RX-V3800AV Receiver Owner's Manual", Yamaha Music Manuals, Dec. 31, 2007, pp. 35, 36, 44-50.
Samsung Electronics America, Inc., "Gear Icon X SM-R150", User Manual, https://static.bhphtovideo.com/lit_files/268655.pdf, Aug. 6, 2016, 43 pages.
Innovation Patent, dated Aug. 16, 2017, received in Australian Patent Application No. 2017101032, which corresponds with U.S. Appl. No. 15/271,114, 4 pages.
Office Action, dated Nov. 6, 2017, received in Australian Patent Application No. 2017101032, which corresponds with U.S. Appl. No. 15/271,114, 5 pages.
Certificate of Exam, dated May 1, 2018, received in Australian Patent Application No. 2017101032, which corresponds with U.S. Appl. No. 15/271,114, 1 page.
Notice of Acceptance, dated Feb. 19, 2019, received in Australian Patent Application No. 2017324072, which corresponds with U.S. Appl. No. 15/271,114, 3 pages.
Certificate of Grant, dated Jun. 13, 2019, received in Australian Patent Application No. 2017324072, which corresponds with U.S. Appl. No. 15/271,114, 1 page.
Office Action, dated Sep. 25, 2019, received in Chinese Patent Application No. 201710741130.4, which corresponds with U.S. Appl. No. 15/271,114, 5 pages.
Office Action, dated Jun. 18, 2020, received in Chinese Patent Application No. 201710741130.4, which corresponds with U.S. Appl. No. 15/271,114, 10 pages.
Notice of Allowance, dated Nov. 27, 2020, received in Chinese Patent Application No. 201710741130.4, which corresponds with U.S. Appl. No. 15/271,114, 3 pages.
Patent, dated Jan. 22, 2021, received in Chinese Patent Application No. 201710741130.4, which corresponds with U.S. Appl. No. 15/271,114, 6 pages.
Office Action, dated Dec. 16, 2016, received in Danish Patent Application No. 201670727, which corresponds with U.S. Appl. No. 15/271,114, 7 pages.
Office Action, dated May 29, 2017, received in Danish Patent Application No. 201670727, which corresponds with U.S. Appl. No. 15/271,114, 6 pages.
Office Action, dated Dec. 13, 2017, received in Danish Patent Application No. 201670727, which corresponds with U.S. Appl. No. 15/271,114, 6 pages.
Office Action, dated Aug. 16, 2019, received in European Patent Application No. 17746593.7, which corresponds with U.S. Appl. No. 15/271,114, 6 pages.
Office Action, dated Jul. 5, 2019, received in Japanese Patent Application No. 2019-506652, which corresponds with U.S. Appl. No. 15/271,114, 4 pages.
Notice of Allowance, dated Oct. 18, 2019, received in Japanese Patent Application No. 2019-506652, which corresponds with U.S. Appl. No. 15/271,114, 5 pages.
Patent, dated Nov. 22, 2019, received in Japanese Patent Application No. 2019-506652, which corresponds with U.S. Appl. No. 15/271,114, 3 pages.
Office Action, dated Jun. 17, 2019, received in Korean Patent Application No. 2019-7004211, which corresponds with U.S. Appl. No. 15/271,114, 3 pages.
Notice of Allowance, dated Sep. 17, 2019, received in Korean Patent Application No. 2019-7004211, which corresponds with U.S. Appl. No. 15/271,114, 4 pages.
Patent, dated Dec. 4, 2019, received in Korean Patent Application No. 2019-7004211, which corresponds with U.S. Appl. No. 15/271,114, 4 pages.
Office Action, dated Oct. 3, 2019, received in U.S. Appl. No. 16/056,328, 11 pages.
Notice of Allowance, dated Jan. 15, 2020, received in U.S. Appl. No. 16/056,328, 7 pages.
Notice of Allowance, dated Feb. 22, 2021, received in Australian Patent Application No. 201920, which corresponds with U.S. Appl. No. 16/056,328, 3 pages.
Certificate of Grant, dated Jun. 24, 2021, received in Australian Patent Application No. 2019203626, which corresponds with U.S. Appl. No. 16/056,328, 3 pages.
Office Action, dated Jul. 2, 2021, received from Chinese Patent Application No. 202011538744.0, which corresponds with U.S. Appl. No. 16/056,328, 4 pages.
Office Action, dated Dec. 30, 2021, received from Chinese Patent Application No. 202011538744.0, which corresponds with U.S. Appl. No. 16/056,328, 2 pages.
Office Action, dated Mar. 29, 2022, received from Chinese Patent Application No. 202011538744.0, which corresponds with U.S. Appl. No. 16/056,328, 1 page.
Office Action, dated Jan. 19, 2023, received from Chinese Patent Application No. 202011538744.0, which corresponds with U.S. Appl. No. 16/056,328, 1 page.
Office Action, dated Jan. 12, 2021, received in Japanese Patent Application No. 2019-207313, which corresponds with U.S. Appl. No. 16/056,328, 5 pages.
Office Action, dated Oct. 18, 2021, received in Japanese Patent Application No. 2019-207313, which corresponds with U.S. Appl. No. 16/056,328, 2 pages.
Notice of Allowance, dated Mar. 11, 2022, received in Japanese Patent Application No. 2019-207313, which corresponds with U.S. Appl. No. 16/056,328, 2 pages.
Patent, dated Mar. 25, 2022, received in Japanese Patent Application No. 2019-207313, which corresponds with U.S. Appl. No. 16/056,328, 3 pages.
Office Action, dated Apr. 6, 2020, received in Korean Patent Application No. 2019-7035730, which corresponds with U.S. Appl. No. 16/056,328, 2 pages.

(56) References Cited

OTHER PUBLICATIONS

Notice of Allowance, dated Jun. 23, 2020, received in Korean Patent Application No. 2019-7035730, which corresponds with U.S. Appl. No. 16/056,328, 2 pages.
Patent, dated Sep. 14, 2020, received in Korean Patent Application No. 2019-7035730, which corresponds with U.S. Appl. No. 16/056,328, 3 pages.
Office Action, dated Jun. 24, 2021, received in U.S. Appl. No. 16/920,303, 5 pages.
Notice of Allowance, dated Sep. 14, 2021, received in U.S. Appl. No. 16/920,303, 7 pages.
Office Action, dated Sep. 10, 2021, received in Australian Patent Application No. 2020-239693, which corresponds with U.S. Appl. No. 16/920,303, 2 pages.
Notice of Allowance, dated Oct. 15, 2021, received in Australian Patent Application No. 2020-239693, which corresponds with U.S. Appl. No. 16/920,303, 3 pages.
Patent, dated Feb. 17, 2022, 2022, received in Australian Patent Application No. 2020-239693, which corresponds with U.S. Appl. No. 16/920,303, 3 pages.
Office Action, dated Dec. 21, 2020, received in Danish Patent Application No. 2020-70630, which corresponds with U.S. Appl. No. 16/920,303, 8 pages.
Intention to Grant, Action, dated Mar. 3, 2021, received in Danish Patent Application No. 2020-70630, which corresponds with U.S. Appl. No. 16/920,303, 2 pages.
Notice of Allowance, dated Jun. 10, 2021, received in Danish Patent Application No. 2020-70630, which corresponds with U.S. Appl. No. 16/920,303, 2 pages.
Patent, dated Oct. 14, 2021, received in Danish Patent Application No. 2020-70630, which corresponds with U.S. Appl. No. 16/920,303, 6 pages.
Office Action, dated Feb. 21, 2022, received in Indian Patent Application No. 202017041564, which corresponds with U.S. Appl. No. 16/920,303, 6 pages.
Office Action, dated Jan. 7, 2022, received in Japanese Patent Application No. 2020-550113, which corresponds with U.S. Appl. No. 16/920,303, 2 pages.
Office Action, dated Aug. 12, 2022, received in Japanese Patent Application No. 2020-550113, which corresponds with U.S. Appl. No. 16/920,303, 2 pages.
Notice of Allowance, dated Nov. 14, 2022, received in Japanese Patent Application No. 2020-550113, which corresponds with U.S. Appl. No. 16/920,303, 2 pages.
Patent, dated Dec. 8, 2022, received in Japanese Patent Application No. 2020-550113, which corresponds with U.S. Appl. No. 16/920,303, 3 pages.
Office Action, dated Apr. 13, 2022, received in Korean Patent Application No. 2020-7027641, which corresponds with U.S. Appl. No. 16/920,303, 7 pages.
Office Action, dated Oct. 26, 2022, received in Korean Patent Application No. 2020-7027641, which corresponds with U.S. Appl. No. 16/920,303, 3 pages.
Office Action, dated Nov. 24, 2021, received in U.S. Appl. No. 17/023,265, 16 pages.
Final Office Action, dated Jun. 2, 2022, received in U.S. Appl. No. 17/023,265, 19 pages.
Notice of Allowance, dated Nov. 17, 2022, received in U.S. Appl. No. 17/023,265, 10 pages.
Notice of Allowance, dated Mar. 21, 2023, received in U.S. Appl. No. 17/023,265, 9 pages.
Office Action, dated Sep. 4, 2020, received in U.S. Appl. No. 16/824,506, 17 pages.
Final Office Action, dated Mar. 22, 2021, received in U.S. Appl. No. 16/824,506, 22 pages.
Office Action, dated Aug. 5, 2021, received in U.S. Appl. No. 16/824,506, 20 pages.
Notice of Allowance, dated Oct. 18, 2021, received in U.S. Appl. No. 16/824,506, 9 pages.
Intent to Grant, dated Sep. 29, 2021, received in Australian Patent Application No. 2021201777, which corresponds with U.S. Appl. No. 16/824,506, 3 pages.
Notice of Acceptance, dated Nov. 29, 2021, received in Australian Patent Application No. 2021201777, which corresponds with U.S. Appl. No. 16/824,506, 3 pages.
Patent, dated Mar. 31, 2022, received in Australian Patent Application No. 2021201777, which corresponds with U.S. Appl. No. 16/824,506, 3 pages.
Office Action, dated Jun. 9, 2021, received in Chinese Patent Application No. 202011544171.2, which corresponds with U.S. Appl. No. 16/824,506, 1 page.
Office Action, dated Nov. 11, 2021, received in Chinese Patent Application No. 202011544171.2, which corresponds with U.S. Appl. No. 16/824,506. (English translation is provided.) 5 pages.
Office Action, dated Jun. 29, 2022, received in Chinese Patent Application No. 202011544171.2, which corresponds with U.S. Appl. No. 16/824,506, 5 pages.
Notice of Allowance, dated May 24, 2021, received in Korean Patent Application No. 2020-7026460, which corresponds with U.S. Appl. No. 16/824,506, 2 pages.
Notice of Allowance, dated Feb. 1, 2022, received in U.S. Appl. No. 17/031,637, 26 pages.
Notice of Allowance, dated Mar. 21, 2022, received in U.S. Appl. No. 17/031,637, 7 pages.
Notice of Allowance, dated Aug. 29, 2022, received in U.S. Appl. No. 17/483,741, 42 pages.
Office Action, dated Jan. 1, 2021, received in U.S. Appl. No. 17/028,936, 16 pages.
Final Office Action, dated Apr. 9, 2021, received in U.S. Appl. No. 17/028,936, 17 pages.
Notice of Allowance, dated Aug. 20, 2021, received in U.S. Appl. No. 17/028,936, 7 pages.
Notice of Allowance, dated Sep. 29, 2021, received in U.S. Appl. No. 17/028,936, 7 pages.
Office Action, dated Oct. 7, 2022, received in Australian Patent Application No. 2021245251, which corresponds with U.S. Appl. No. 17/028,936, 3 pages.
Office Action, dated Jan. 18, 2023, received in Australian Patent Application No. 2021245251, which corresponds with U.S. Appl. No. 17/028,936, 3 pages.
Office Action, dated Jan. 29, 2021, received in Danish Patent Application No. 2020-70718, which corresponds with U.S. Appl. No. 17/028,936, 7 pages.
Office Action, dated Oct. 22, 2021, received in Danish Patent Application No. 2020-70718, which corresponds with U.S. Appl. No. 17/028,936, 4 pages.
Intention to Grant, dated Jan. 7, 2022, received in Danish Patent Application No. 2020-70718, which corresponds with U.S. Appl. No. 17/028,936, 2 pages.
Notice of Allowance, dated Apr. 26, 2022, received in Danish Patent Application No. 2020-70718, which corresponds with U.S. Appl. No. 17/028,936, 2 pages.
Patent, dated Aug. 11, 2022, received in Danish Patent Application No. 2020-70718, which corresponds with U.S. Appl. No. 17/028,936, 3 pages.
Office Action, dated May 25, 2022, received in U.S. Appl. No. 17/028,943, 5 pages.
Notice of Allowance, dated Jun. 29, 2022, received in U.S. Appl. No. 17/028,943, 7 pages.
Office Action, dated Jan. 29, 2021, received in Danish Patent Application No. 2020-70719, which corresponds with U.S. Appl. No. 17/028,936, 7 pages.
Intention to Grant, dated Aug. 27, 2021, received in Danish Patent Application No. 2020-70719, which corresponds with U.S. Appl. No. 17/028,936, 2 pages.
Notice of Allowance, dated Dec. 16, 2021, received in Danish Patent Application No. 2020-70719, which corresponds with U.S. Appl. No. 17/028,936, 2 pages.
Patent, dated Mar. 21, 2022, received in Danish Patent Application No. 2020-70719, which corresponds with U.S. Appl. No. 17/028,936, 5 pages.

(56) References Cited

OTHER PUBLICATIONS

Intent to Grant, dated Feb. 1, 2023, received from European Patent Application No. 22161118.9, which corresponds with U.S. Appl. No. 17/028,936, 8 pages.
Office Action, dated Dec. 24, 2020, received in U.S. Appl. No. 17/028,947, 10 pages.
Final Office Action, dated Mar. 17, 2021, received in U.S. Appl. No. 17/028,947, 8 pages.
Office Action, dated Sep. 27, 2021, received in U.S. Appl. No. 17/028,947, 10 pages.
Notice of Allowance, dated Dec. 13, 2021, received in U.S. Appl. No. 17/028,947, 5 pages.
Office Action, dated Feb. 2, 2021, received in Danish Patent Application No. 202070720, which corresponds with U.S. Appl. No. 17/028,947, 3 pages.
Office Action, dated Nov. 4, 2021, received in Danish Patent Application No. 202070720, which corresponds with U.S. Appl. No. 17/028,947, 3 pages.
Intent to Grant, dated May 5, 2022, received in Danish Patent Application No. 202070720, which corresponds with U.S. Appl. No. 17/028,947, 2 pages.
Notice of Allowance, dated Jul. 28, 2022, received in Danish Patent Application No. 202070720, which corresponds with U.S. Appl. No. 17/028,947, 2 pages.
Patent, dated Oct. 6, 2022, received in Danish Patent Application No. 202070720, which corresponds with U.S. Appl. No. 17/028,947, 5 pages.
Office Action, dated Sep. 1, 2022, received in U.S. Appl. No. 17/023,274, 16 pages.
Notice of Allowance, dated Mar. 9, 2023, received in U.S. Appl. No. 17/023,274, 10 pages.
Office Action, dated Oct. 21, 2022, received in Australian Patent Application No. 2021290349, 2 pages.
Office Action, dated Aug. 5, 2021, received in U.S. Appl. No. 17/306,898, 6 pages.
Notice of Allowance, dated Oct. 29, 2021, received in U.S. Appl. No. 17/306,898, 5 pages.
Office Action, dated Mar. 3, 2023, received in Japanese Patent Application No. 2022-018022, which corresponds with U.S. Appl. No. 17/306,898, 6 pages.
Office Action, dated Aug. 20, 2021, received in Korean Patent Application No. 2021-7022726, which corresponds with U.S. Appl. No. 17/306,898, 5 pages.
Final Office Action, dated Feb. 10, 2022, received in Korean Patent Application No. 2021-7022726, which corresponds with U.S. Appl. No. 17/306,898, 4 pages.
Office Action, dated Jan. 13, 2023, received in U.S. Appl. No. 17/379,864, 24 pages.
Final Office Action, dated Feb. 14, 2023, received in U.S. Appl. No. 17/553,018, 15 pages.
Office Action, dated Jun. 8, 2022, received in Korean Patent Application No. 2022-7016117, which corresponds with U.S. Appl. No. 17/553,018, 5 pages.
Office Action, dated Dec. 8, 2022, received in Korean Patent Application No. 2022-7016117, which corresponds with U.S. Appl. No. 17/553,018, 5 pages.
Office Action, dated Apr. 17, 2023, received in U.S. Appl. No. 17/898,735, 16 pages.
International Search Report and Written Opinion, dated Sep. 8, 2021, received in International Patent Application No. PCT/US2021/033200, which corresponds with U.S. Appl. No. 17/023,265, 17 pages.
Invitation to Pay Additional Fees, dated Nov. 18, 2021, received in International Patent Application No. PCT/2021/042402, which corresponds with U.S. Appl. No. 17/031,637, 22 pages.
International Search Report and Written Opinion, dated Jan. 11, 2022, received in International Patent Application No. US/2021/042402, which corresponds with U.S. Appl. No. 17/031,637, 22 pages.
Invitation to Pay Additional Fees, dated Mar. 9, 2022, received in International Patent Application No. PCT/US2021/052052, which corresponds with U.S. Appl. No. 17/483,741, 23 pages.
International Search Report and Written Opinion, dated May 3, 2022, received in International Patent Application No. PCT/US2021/052052, which corresponds with U.S. Appl. No. 17/483,741, 54 pages.
Extended European Search Report, dated Jul. 29, 2022, received in European Patent Application No. 22161118.9, which corresponds with U.S. Appl. No. 17/028,943, 8 pages.
Notice of Allowance, dated Jun. 25, 2024, received in Chinese U.S. Appl. No. 16/920,303.5, which corresponds with U.S. Appl. No. 16/920,303, 2 pages.
Office Action, dated Jul. 1, 2024, received in Japanese Patent Application No. 2023-172092, which corresponds with U.S. Appl. No. 16/824,506, 6 pages.
Final Office Action, dated Jun. 10, 2024, received in Japanese Patent Application No. 2022-194986, which corresponds with U.S. Appl. No. 17/028,936, 9 pages.
Notice of Allowance, dated Jun. 24, 2024, received in Chinese U.S. Appl. No. 17/028,942.8, which corresponds with U.S. Appl. No. 17/028,942, 2 pages.
Patent, dated May 17, 2024, received in Korean Patent Application No. 2022-7016117, which corresponds with U.S. Appl. No. 17/553,018, 3 pages.
Office Action, dated Jul. 2, 2014, received in U.S. Appl. No. 17/947,042, 37 pages.
Certificate of Grant, dated Feb. 1, 2024, received in Australian U.S. Appl. No. 17/028,936, which corresponds with U.S. Appl. No. 17/028,936, 4 pages.
Office Action, dated Jan. 12, 2024, received in Japanese Patent Application No. 2022-194986, which corresponds with U.S. Appl. No. 17/028,936, 2 pages.
Certificate of Grant, dated Feb. 22, 2024, received in Australian Patent Application No. 2021290349, 4 pages.
Notice of Allowance, dated Apr. 19, 2024, received in U.S. Appl. No. 17/553,018, 10 pages.
Notice of Allowance, dated Mar. 4, 2024, received in Korean Patent Application No. 2022-7016117, which corresponds with U.S. Appl. No. 17/553,018, 3 pages.
Final Office Action, dated Apr. 18, 2024, received in U.S. Appl. No. 17/898,735, 15 pages.
Final Office Action, dated Mar. 7, 2024, received in U.S. Appl. No. 17/947,042, 33 pages.
International Search Report and Written Opinion, dated Feb. 5, 2024, received in International Patent Application No. PCT/US2023/032012, which corresponds with U.S. Appl. No. 18/241,778, 20 pages.
Patent, dated Jul. 23, 2024, received in Chinese U.S. Appl. No. 16/920,303.5, which corresponds with U.S. Appl. No. 16/920,303, 6 pages.
Office Action, dated Jul. 30, 2024, received in Australian U.S. Appl. No. 17/028,943, which corresponds with U.S. Appl. No. 17/028,943, 3 pages.
Patent, dated Jul. 23, 2024, received in Chinese U.S. Appl. No. 17/028,942.8, which corresponds with U.S. Appl. No. 17/028,942, 6 pages.
Notice of Allowance, dated Aug. 23, 2024, received in U.S. Appl. No. 17/853,763, 10 pages.
Office Action, dated Oct. 17, 2024, received in U.S. Application No. 18/443,162, 7 pages.
Intent to Grant, dated Sep. 24, 2024, received in European U.S. Appl. No. 16/920,303, which corresponds with U.S. Appl. No. 16/920,303, 10 pages.
Patent, dated Oct. 23, 2024, received in Indian U.S. Appl. No. 16/920,303, which corresponds with U.S. Appl. No. 16/920,303, 6 pages.
Notice of Allowance, dated Oct. 15, 2024, received in Japanese Patent Application No. 2022-194986, which corresponds with U.S. Appl. No. 17/028,936, 2 pages.
Office Action, dated Nov. 14, 2024, received in Australia U.S. Appl. No. 17/553,018, which corresponds with U.S. Appl. No. 17/553,018, 2 pages.

(56) References Cited

OTHER PUBLICATIONS

International Search Report and Written Opinion, dated Nov. 6, 2024, received in International Patent Application No. PCT/2024/026058, which corresponds with U.S. Appl. No. 18/639,759, 30 pages.

Final Office Action, dated Jan. 6, 2025, received in Japanese Patent Application No. 2023-172092, which corresponds with U.S. Appl. No. 16/824,506, 5 pages.

Patent, dated Dec. 16, 2024, received in Japanese Patent Application No. 2022-194986, which corresponds with U.S. Appl. No. 17,028,936, 3 pages.

Notice of Allowance, dated Jan. 30, 2025, received in Australian U.S. Appl. No. 17/028,943, which corresponds with U.S. Appl. No. 17/028,943, 5 pages.

\* cited by examiner

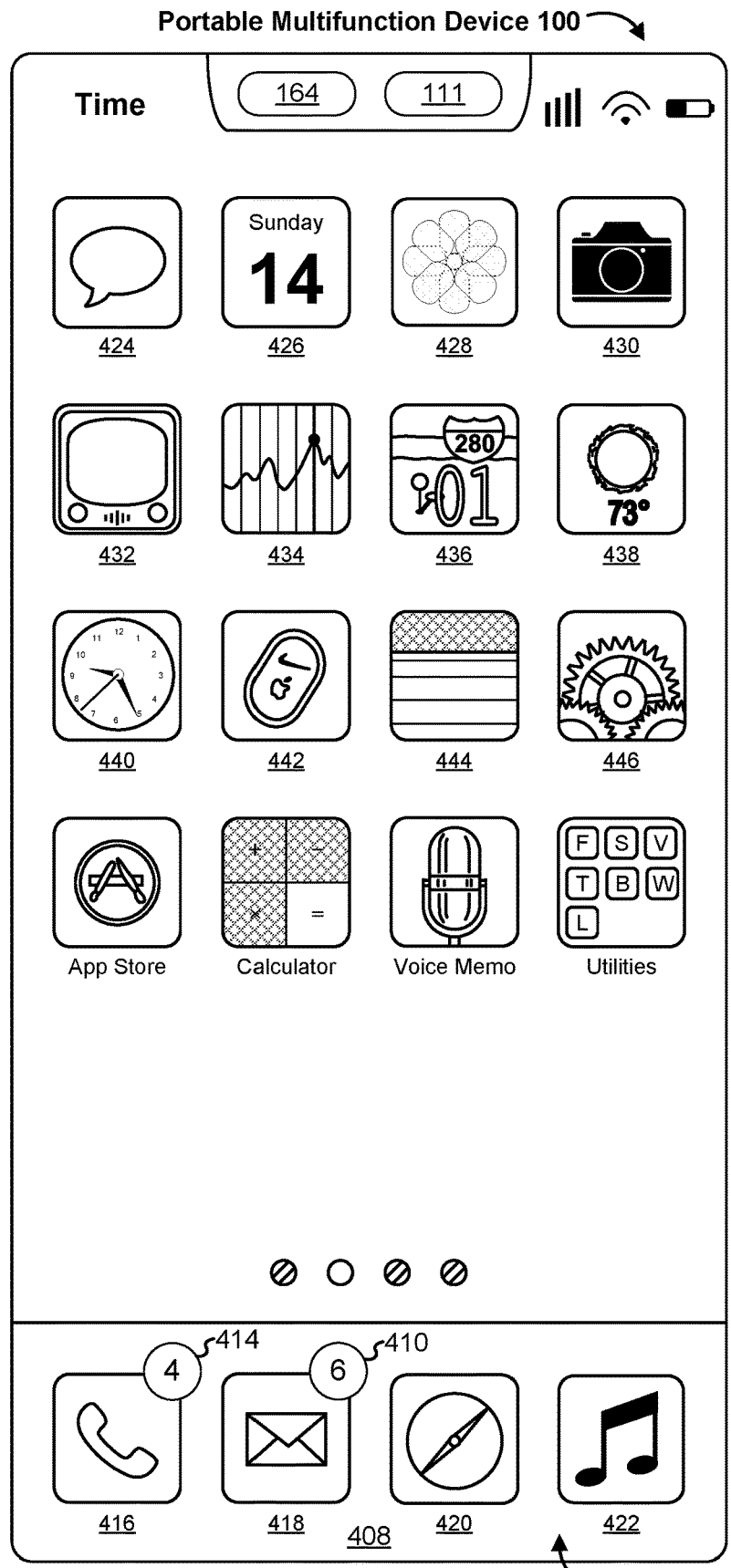

614 Receive a second input corresponding to an input received at the first device, wherein the input received at the first device corresponds to selection of the first alert; and
　　in response to the second input:
　　　　cease to output the second audio from the second device; and
　　　　output the first audio from the first device

---

616 In accordance with the determination that the second audio from the second device satisfies the audio priority criteria with respect to the first audio from the first device, cause the second device to display a second alert indicating that the second audio from the second device is being output by the wearable audio output device

---

618 In response to receiving the first input:
　　in accordance with a determination that the second audio from the second device does not satisfy the audio priority criteria with respect to the first audio from the first device:
　　　　forgo outputting the second audio from the second device; and
　　　　cause the second device to display a third alert indicating that the second audio from the second device is not being output by the wearable audio output device 620 Receive a third input corresponding to an input received at the second device, wherein the input received at the second device corresponds to selection of the third alert; and
　　in response to the third input:
　　　　cease to output the first audio from the first device; and
　　　　output the second audio from the second device 622 The determination that the second audio from the second device does not satisfy the audio priority criteria with respect to the first audio from the first device includes a determination that the second audio from the second device has a respective priority that is the same as a priority of the first audio from the first device

Figure 6B

624 The first input is received at the wearable audio output device in accordance with a determination that the first device and the second device are associated with a same respective user account 626 In accordance with a phone call being received at the second device and a determination that the first device and the second device satisfy call sharing criteria, receive from the first device a request to output a first audio alert of the phone call;
   the first input, corresponding to the request to output the second audio from the second device, is received at the wearable audio output device in accordance with the phone call being received at the second device and a determination that the first device and the second device do not satisfy the call sharing criteria, and the request to output the second audio includes a request to output a second audio alert, different from the first audio alert, of the phone call 628 The first input, corresponding to the request to output the second audio from the second device, is received at the wearable audio output device in accordance with a phone call being received at the second device;
   in accordance with the determination that the second audio from the second device satisfies audio priority criteria with respect to the first audio from the first device:
      cause the second device to display an alert that the wearable audio output device is configured to output audio from the second device, wherein the alert is displayed without regard to whether an input corresponding to a request to connect the phone call has been received at the second device

Figure 6C

1014 Receive an input corresponding to a request to charge the electronic device; in response to receiving the input corresponding to the request to charge the electronic device:
    initiate charging of the electronic device;
    display a second user interface element that includes information about:
        a charge level of the electronic device; and
        one or more charge levels of the first peripheral and/or the second peripheral

1016 Receive an input corresponding to activation of the second user interface element; and
    in response to receiving the input corresponding to activation of the second user interface element, display a plurality of user interface elements, including:
        a third user interface element corresponding to the electronic device;
        a fourth user interface element corresponding to the first peripheral; and
        a fifth user interface element corresponding to the electronic device and to the first peripheral;
    receive an input corresponding to activation of a respective user interface element of the plurality of user interface elements;
    in response to receiving the input corresponding to activation of the respective user interface element:
        in accordance with a determination that charging completion criteria for the electronic device are met, including a determination that the respective user interface element is the third user interface element or the fifth user interface element, initiating charging of the electronic device to a charge limit of the electronic device;
        wherein determining that the charging completion criteria for the first peripheral include are met includes determining that the respective user interface element is the fourth user interface element or the fifth user interface element

1018 Receiving the input corresponding to the request to charge the electronic device includes detecting wireless coupling of the electronic device with a power source that transmits power to the electronic device wirelessly

1020 While displaying the second user interface element, detect coupling of the second peripheral with a power source; and
    in response to detecting the coupling of the second peripheral with a power source:
        cease to display the information about the one or more charge levels of the first peripheral and/or the second peripheral

Figure 10B

1022 In accordance with a determination that a charge level of the second peripheral is below a threshold charge level for the second peripheral, display an alert of the charge level of the second peripheral

1024 The second peripheral is a case for the first peripheral, and displaying the alert of the charge level of the second peripheral is performed in response to detecting opening of the case

1026 Displaying the alert of the charge level of the second peripheral is performed in accordance with a determination that the first peripheral is coupled with the second peripheral

1028 Displaying the alert of the charge level of the second peripheral is performed in response to detecting decoupling of the first peripheral from the second peripheral

1030 Displaying the alert of the charge level of the second peripheral is performed in response to detecting coupling of the first peripheral with the second peripheral

1032 In accordance with a determination that a charge level of the first peripheral is below a second threshold charge level for the first peripheral, display an alert of the charge level of the first peripheral

1034 In accordance with the determination that the charge level of the first peripheral is below the second threshold charge level for the first peripheral, the first peripheral outputs an audio alert in conjunction with the electronic device displaying the alert of the charge level of the first peripheral

Figure 10C

SYSTEMS, METHODS, AND GRAPHICAL USER INTERFACES FOR AUTOMATIC AUDIO ROUTING

RELATED APPLICATIONS

This application is a continuation of U.S. application Ser. No. 17/023,274, filed Sep. 16, 2020, which claims priority to U.S. Provisional Patent Application No. 63/041,715, filed Jun. 19, 2020, and U.S. Provisional Patent Application No. 63/033,086, filed Jun. 1, 2020, each of which is hereby incorporated by reference in its entirety.

TECHNICAL FIELD

This relates generally to audio output systems, including but not limited to systems with wearable audio output devices that are configured to receive audio output from multiple connected electronic devices.

BACKGROUND

Audio output devices, including wearable audio output devices such as headphones, earbuds, and earphones, are widely used to provide audio outputs to a user. But conventional methods of providing audio outputs using audio output devices are cumbersome, inefficient, and limited. In some cases, conventional methods limit an audio output device to receiving audio outputs routed from only one device and require numerous inputs to transfer the audio route so that the audio output device can receive audio outputs from a different device. In some cases, conventional methods of connecting electronic devices to an audio output device do not automatically infer user intent when a user is using multiple electronic devices, all on a same user account, with the same audio output device. In some cases, conventional methods for charging the batteries of devices and connected peripheral audio output devices degrade the batteries over time more than necessary, fail to effectively alert a user to battery status, and/or provide only limited battery charging functionality. In addition, conventional methods take longer and require more user interaction than necessary, thereby wasting energy. These latter considerations are particularly important in battery-operated devices.

SUMMARY

Accordingly, there is a need for wearable audio output devices and associated electronic devices with improved methods and interfaces for routing audio between an audio output device and multiple connected electronic devices, and for charging electronic devices and peripheral audio output devices. Such methods and interfaces optionally complement or replace conventional methods of routing audio between electronic devices and peripheral audio output devices, and charging such devices. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with routing audio between an audio output device and multiple connected electronic devices and charging peripheral audio output devices are reduced or eliminated by the disclosed systems. In some embodiments, the system includes one or more peripherals, including a wearable audio output device (e.g., in-ear earphones, earbuds, on-ear or over-ear headphones, etc.) and optionally another peripheral associated with the wearable audio output device (e.g., a case for the wearable audio output device), and one or more electronic devices. In some embodiments, an electronic device is a desktop computer. In some embodiments, an electronic device is portable (e.g., a notebook computer, tablet computer, or handheld device). In some embodiments, an electronic device is a personal electronic device (e.g., a wearable electronic device, such as a watch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at a wearable audio output device that is in communication with a first device and with a second device that is different from the first device. The method includes, while outputting first audio from the first device, receiving a first input corresponding to a request to output second audio from the second device. The method includes, in response to receiving the first input: in accordance with a determination that the second audio from the second device satisfies audio priority criteria with respect to the first audio from the first device: ceasing to output the first audio from the first device; outputting the second audio from the second device; and causing the first device to display a first alert indicating that the first audio from the first device is not being output by the wearable audio output device.

In accordance with some embodiments, a method of controlling connections between an audio output device and two electronic devices, all associated with the same user account, and controlling audio routing from the electronic devices to the audio output device, is performed by a first electronic device of the two electronic devices. The method includes, while the audio output device is concurrently wirelessly connected with both the first electronic device and a second electronic device that is different from the first electronic device and playing first audio corresponding to first audio data transmitted by the second electronic device to the audio output device: detecting, at the first electronic device, a user request to play a second audio that is associated with a media item; and in response to detecting the user request, transmitting to the audio output device second audio data corresponding to the second audio. Further, in accordance with the second audio data being transmitted to the audio output device, the audio output device ceases playing the first audio and begins playing the second audio.

In accordance with some embodiments, a method is performed at an electronic device with a display and an input device. The method includes, while the electronic device is in wireless communication with a set of peripherals that includes a first peripheral and a second peripheral, and in accordance with a determination that the first peripheral satisfies charging criteria that require that the first peripheral is coupled with the second peripheral: initiating charging of the first peripheral, by the second peripheral, to a first threshold charge level that is less than a charge limit of the first peripheral; and in accordance with a determination that charging completion criteria for the first peripheral are met: initiating charging of the first peripheral, by the second peripheral, to the charge limit of the first peripheral.

In accordance with some embodiments, a system includes one or more peripherals, including a wearable audio output device (e.g., in-ear earphones, earbuds, on-ear or over-ear headphones, etc.) and optionally another peripheral associated with the wearable audio output device, and one or more electronic devices. In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device as described herein cause the electronic device to perform or cause performance of the operations of any of the methods described herein. In accordance with some embodiments, a graphical user interface on an electronic device as described herein includes one or more of the elements displayed in any of the methods described herein, which are updated in response to inputs, as described in any of the methods described herein. In accordance with some embodiments, an electronic device as described herein includes means for performing or causing performance of the operations of any of the methods described herein. In accordance with some embodiments, an information processing apparatus, for use in an electronic device as described herein, includes means for performing or causing performance of the operations of any of the methods described herein.

Thus, systems with a wearable audio output device, optionally another peripheral associated with the wearable audio output device, and one or more electronic devices are provided with improved methods and interfaces for routing audio between an audio output device and multiple connected electronic devices and charging peripheral audio output devices, thereby increasing the effectiveness, efficiency, and user satisfaction with such systems and devices. Such methods and interfaces may complement or replace conventional methods for routing audio to and charging audio output devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4A illustrates an example user interface for a menu of applications on a portable multifunction device in accordance with some embodiments.

FIGS. 6A-6C are flow diagrams of a process for routing audio between an audio output device and multiple connected electronic devices based on the priority of the audio that an electronic device requests to be output in accordance with some embodiments.

FIGS. 10A-10C are flow diagrams of a process for charging devices and connected peripheral audio output devices in accordance with some embodiments.

DESCRIPTION OF EMBODIMENTS

Figure 1A:
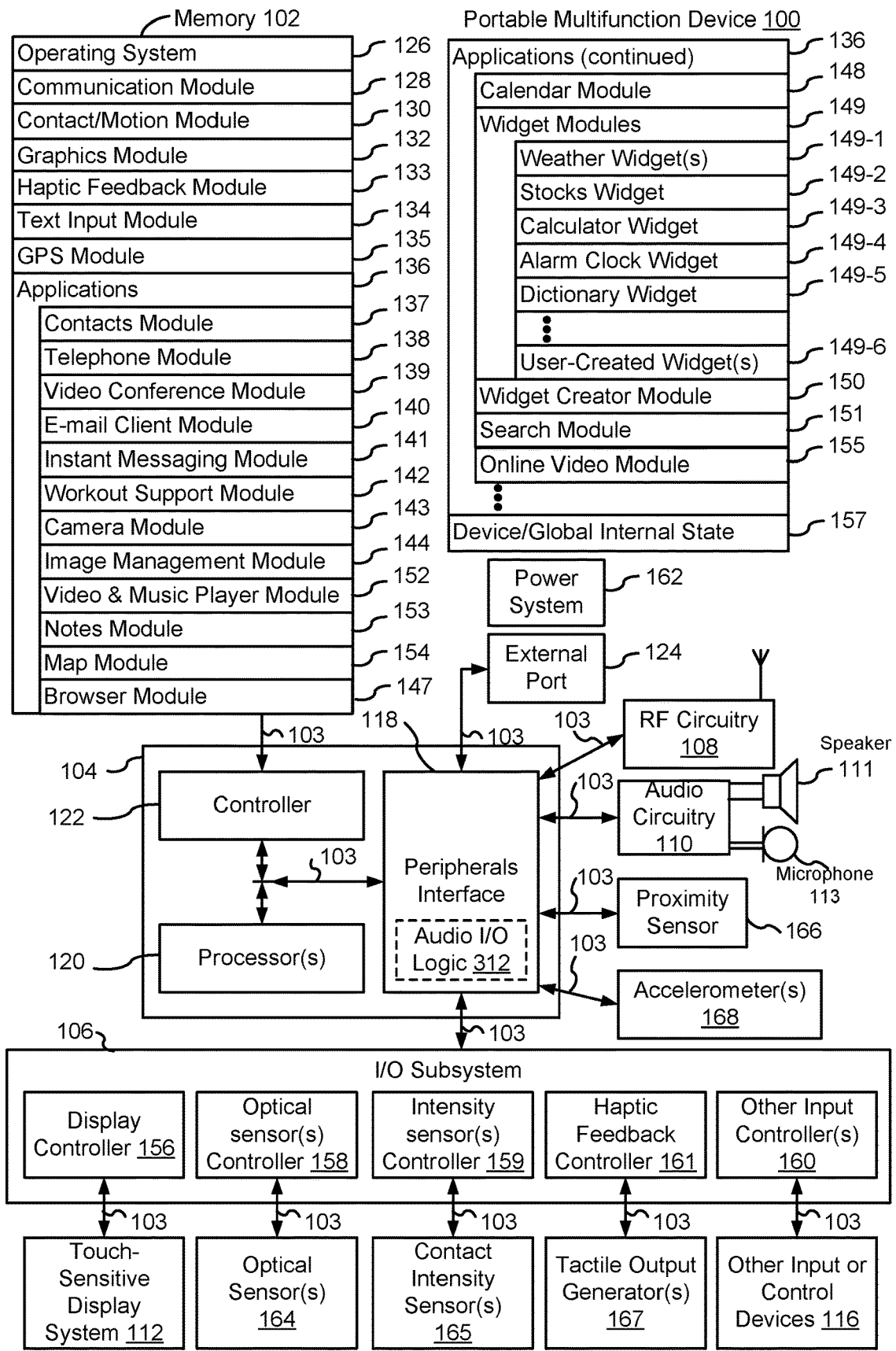
FIG. 1A is a block diagram illustrating a portable multifunction device with a touch-sensitive display in accordance with some embodiments.

As noted above, audio output devices such as wearable audio output devices are widely used to provide audio outputs to a user. Many electronic devices that include or are in communication with wearable audio output devices fail to ensure that the wearable audio output devices are properly calibrated and remain fitted to a user's ears, or give a user only limited control over audio outputs in response to inputs at the wearable audio output devices, or provide user interfaces with too few or too many audio output controls. The methods, systems, and user interfaces/interactions described herein improve how audio outputs are provided in multiple ways. For example, embodiments disclosed herein describe improved ways to determine and adjust the fit of the wearable audio output devices, to control audio outputs using inputs at the wearable audio output devices, and to provide improved user interfaces for controlling audio output settings.

Below, FIGS. 1A-1B, 2, and 3 provide a description of example devices. FIGS. 4A-4B, 5A-5V, 7A-7J-4, and 9A-9AD illustrate example user interfaces for routing audio between an audio output device and multiple connected electronic devices and charging peripheral audio output devices. FIGS. 6A-6C illustrate a flow diagram of a method of routing audio between an audio output device and multiple connected electronic devices based on the priority of the audio that an electronic device requests to be output. FIGS. 8A-8E illustrate a flow diagram of a method of automatically forming wireless connections and wirelessly routing audio from first and second electronic devices to an audio output device, all associated with the same user account. FIGS. 10A-10C illustrate a flow diagram of a method of charging devices and connected peripheral audio output devices. The user interfaces in FIGS. 5A-5V, 7A-7J-4, and 9A-9AD are used to illustrate the processes in FIGS. 6A-6C, 8A-8E, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone). In some embodiments, peripherals interface 118, in conjunction with RF circuitry 108 and optionally audio circuitry 110, communicates wirelessly with one or more peripheral audio output devices, such as wearable audio output device 301 (FIG. 3B), to control audio outputs and other functions of the peripheral audio output devices.

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., or an up button and a separate down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
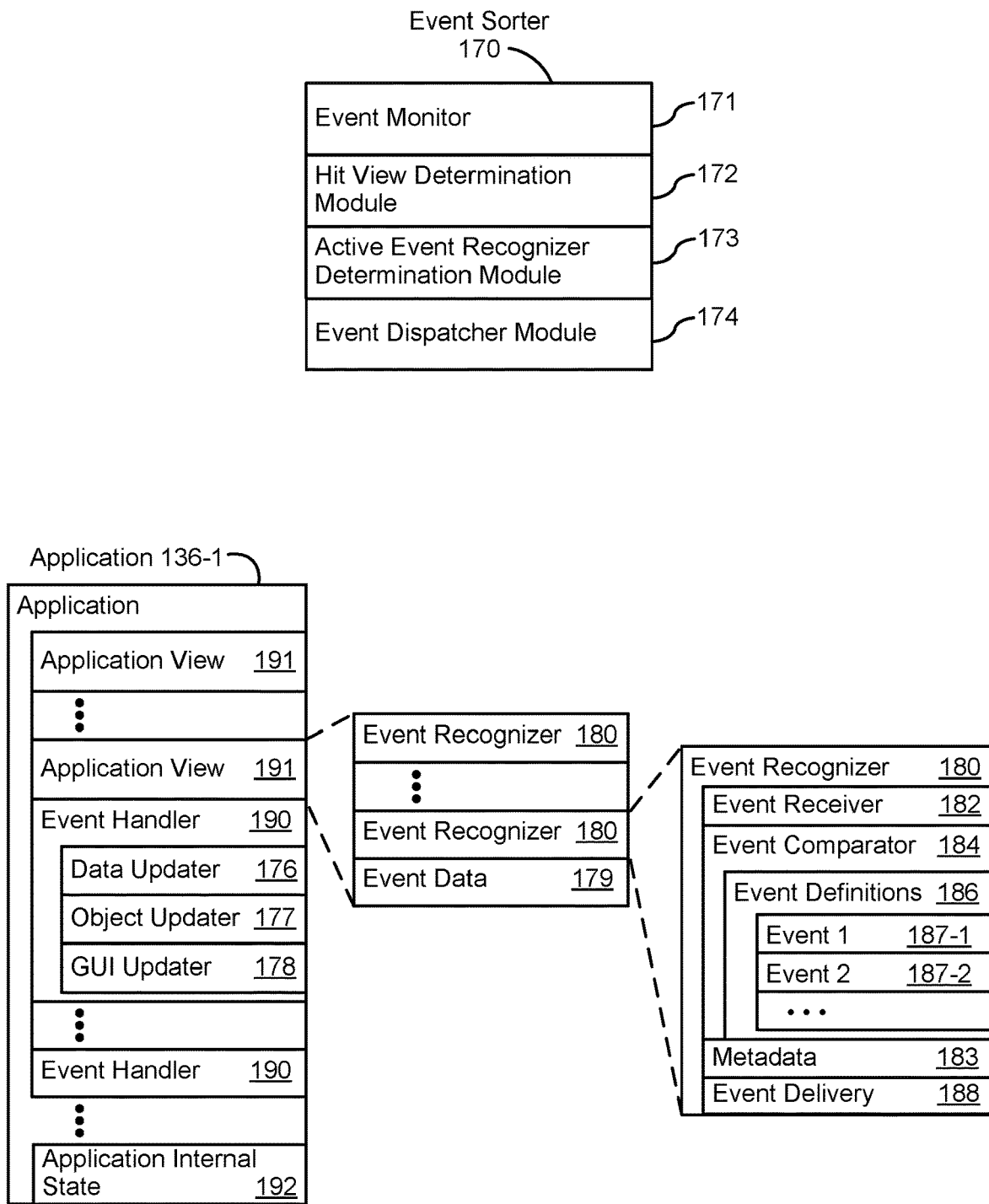
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
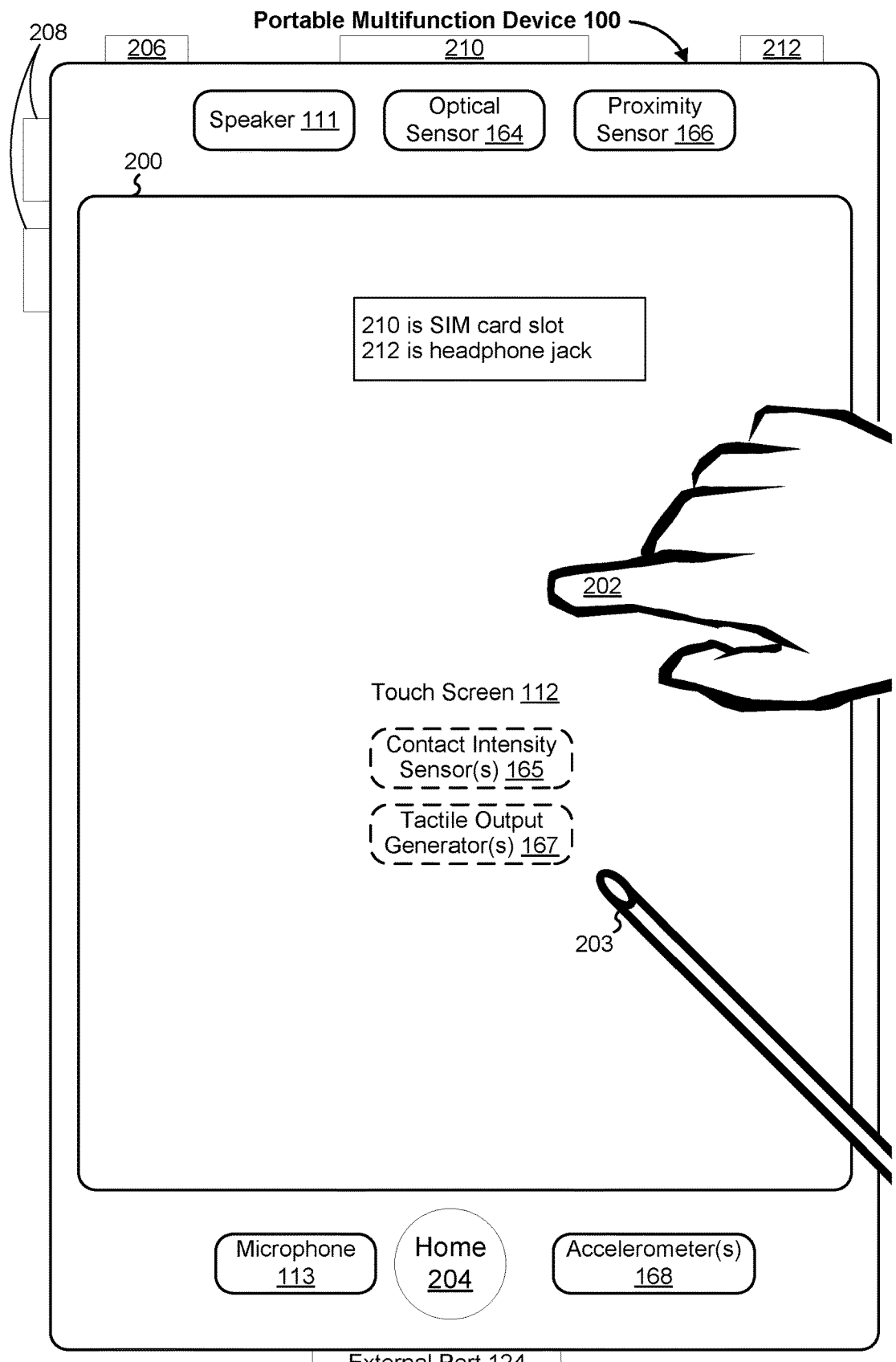
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
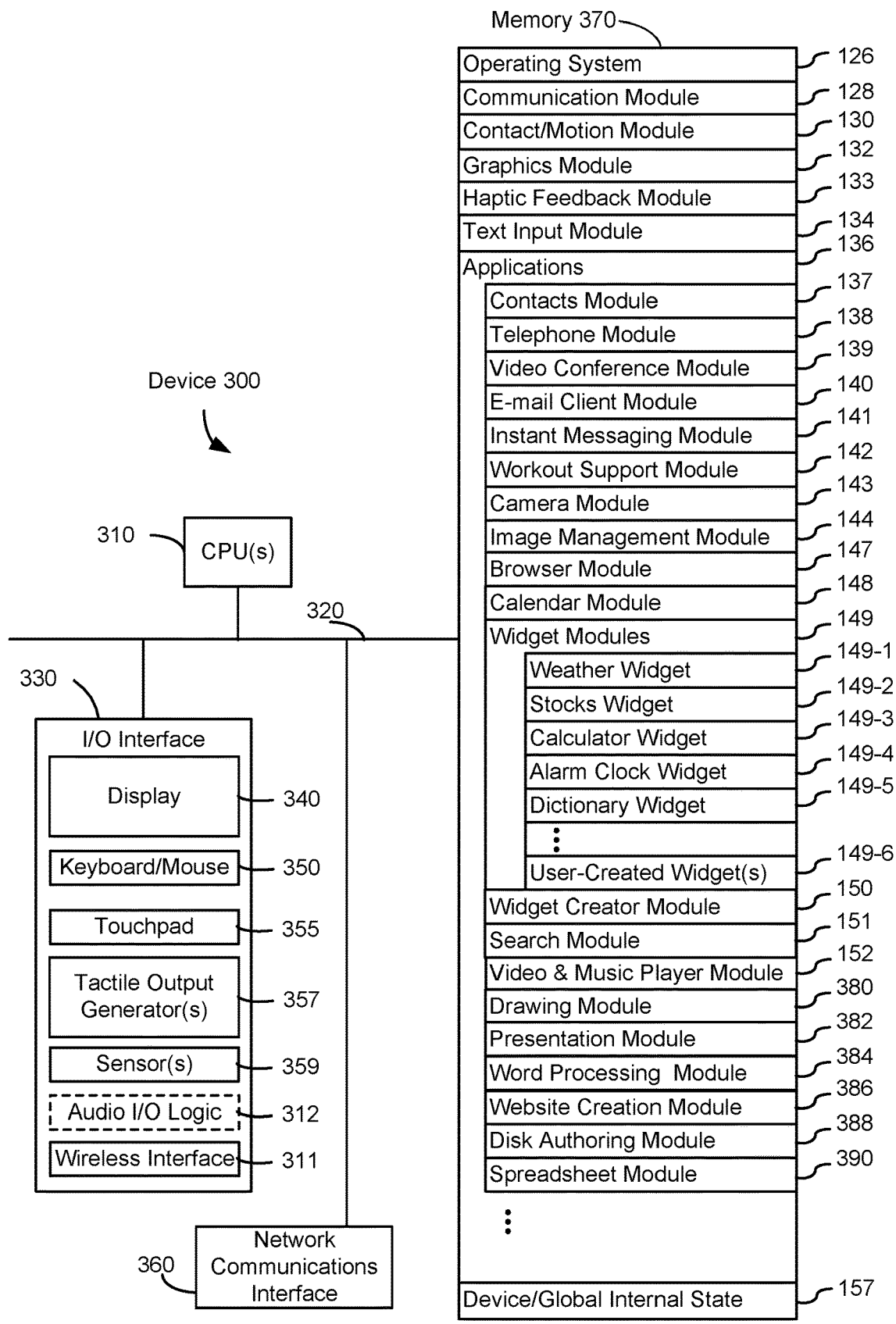
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301.

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
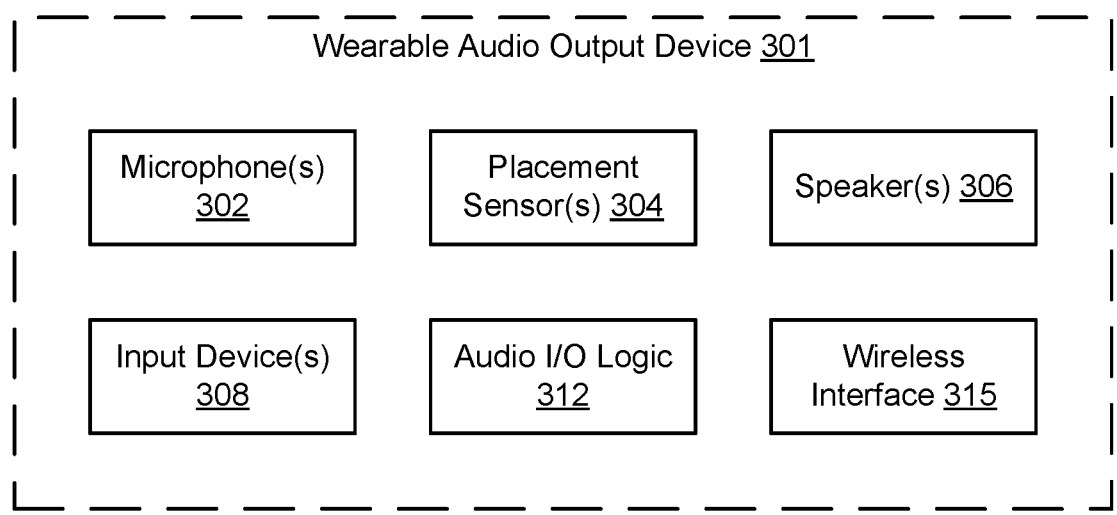
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more audio speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, so as to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein.

In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with one or more multifunction devices, such as device 100 (FIG. 1A) or device 300 (FIG. 3A). In some embodiments, interface 315 is a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315. In some embodiments, wearable audio output device 301 is in communication with multiple multifunction devices, and audio I/O logic 312 determines which of the multifunction devices from which to accept instructions for outputting audio (e.g., as described in further detail herein with reference to methods 600, 800 and 850).

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) for wireless communication(s), such as cellular and Wi-Fi signals;
  Time;
  a Bluetooth indicator;
  a Battery status indicator;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, labeled "Music;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
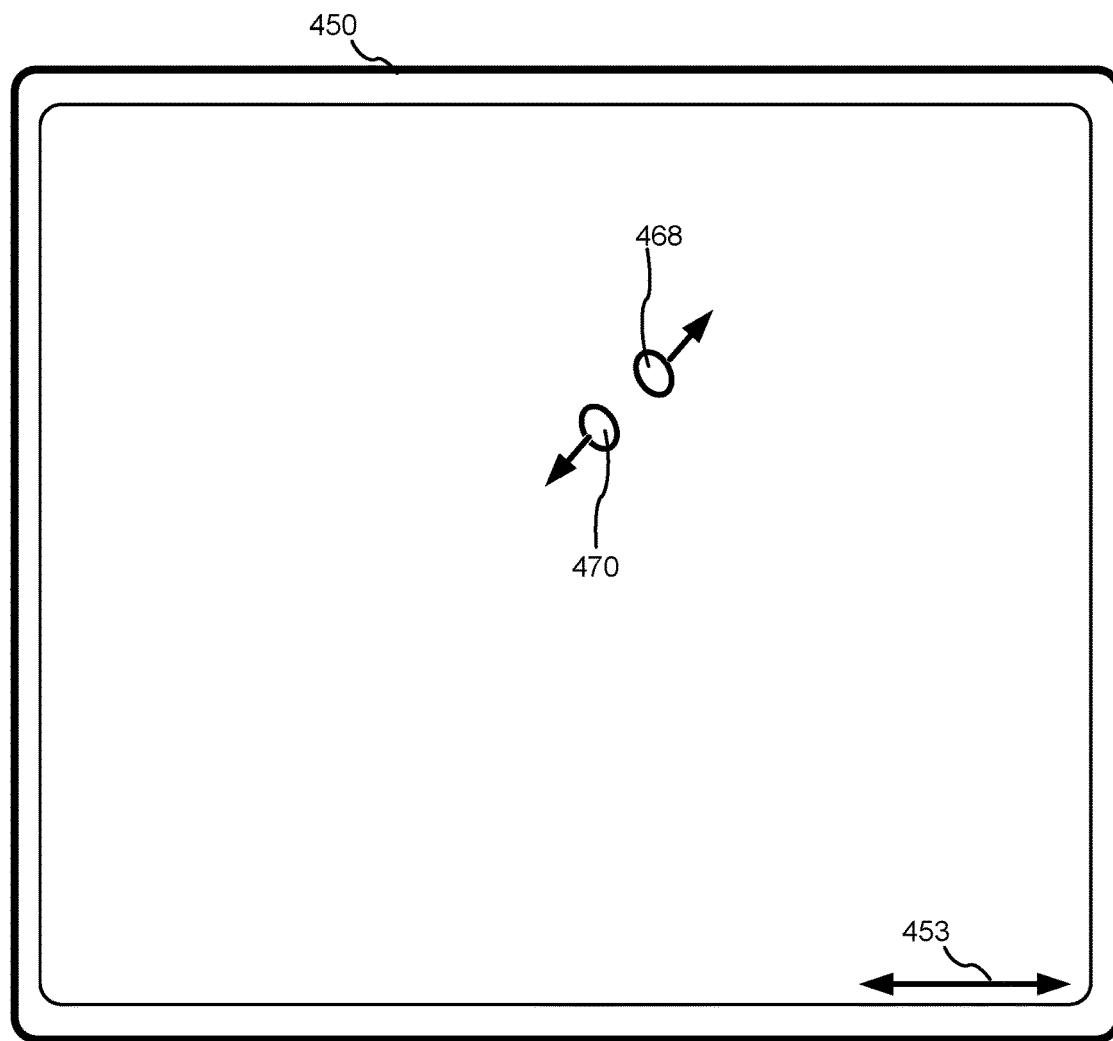
FIG. 4B illustrates an example user interface for a multifunction device with a touch-sensitive surface that is separate from the display in accordance with some embodiments.
Figure 4B:
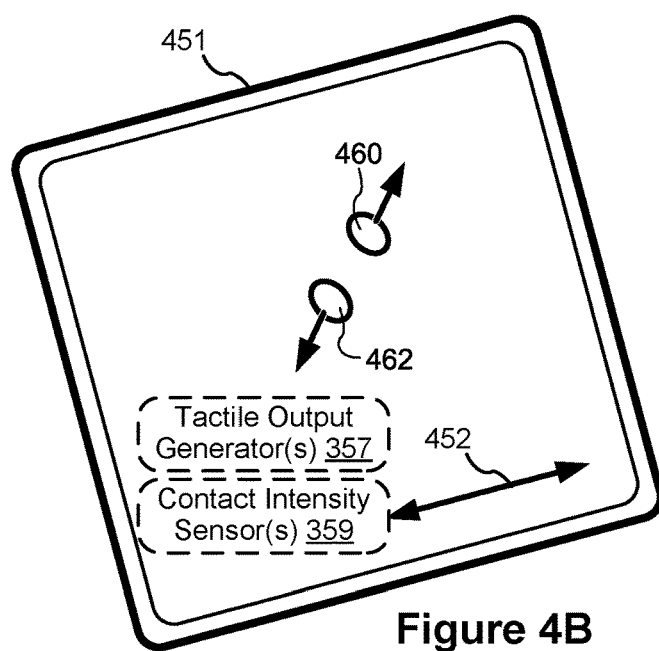

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

In some embodiments, the response of the device to inputs detected by the device depends on criteria based on characteristics of the input, such as the duration of the input or the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria. Alternatively, in some embodiments, for some light press inputs, the duration of the input exceeding a first threshold amount of time (e.g., since the input was detected) triggers a first response; and in some embodiments, for some deep press inputs, the duration of the input exceeding a second threshold amount of time (e.g., since the input was detected), greater than the first threshold amount of time, triggers a second response different from the first response.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented at least in part on a wearable audio output device (e.g., one or more wearable audio output devices 301 (FIG. 3B)), and in some embodiments at least in part on one or more electronic devices, such as portable multifunction device 100 (FIG. 1A) or device 300 (FIG. 3A), with a display, a touch-sensitive surface, (optionally) one or more tactile output generators for generating tactile outputs, and (optionally) one or more sensors to detect intensities of contacts with the touch-sensitive surface. In some embodiments, the user interfaces and associated processes may be implemented on a system that includes a wearable audio output device (e.g., wearable audio output device 301 (FIG. 3B)) that is in communication with one or more electronic devices (e.g., portable multifunction device 100 (FIG. 1A) or device 300 (FIG. 3A)).

FIGS. 5A-5V, 7A-7J-4, and 9A-9AD illustrate example user interactions and user interfaces for routing audio between an audio output device and multiple connected electronic devices and charging peripheral audio output devices in accordance with some embodiments. The user interfaces in these figures are used to illustrate the processes described below, including the processes in FIGS. 6A-6C, 8A-8E, and 10A-10C. For convenience of explanation, some of the embodiments will be discussed with reference to operations performed on a wearable audio output device that is worn by a user and that is in communication with an electronic device having a touch-sensitive display system 112 or display 340 that is separate from a touch-sensitive input device such as touchpad 355, and in some cases in communication with multiple such electronic devices. In some embodiments, the operations are performed in response to instructions received by the wearable audio output device from the electronic device, based on inputs received and/or processing performed at the electronic device. In some embodiments, the operations are performed by the wearable audio output device based on inputs received and/or processing performed at the wearable audio output device. However, some of the embodiments will be discussed with reference to operations performed at (or by) an electronic device that is in communication with one or more peripherals (e.g., audio output peripherals), and the operations are performed in response to inputs received and/or processing performed at the electronic device or in response to instructions received by the electronic device from the one or more peripherals based on inputs received and/or processing performed at the one or more peripherals. For example, the one or more peripherals include a wearable audio output device (e.g., that is optionally in communication with a second electronic device), which optionally includes a plurality of wearable audio output components (e.g., a pair of earbuds), and/or a case for the wearable audio output device (e.g., a case for the earbuds).

Figure 5A:
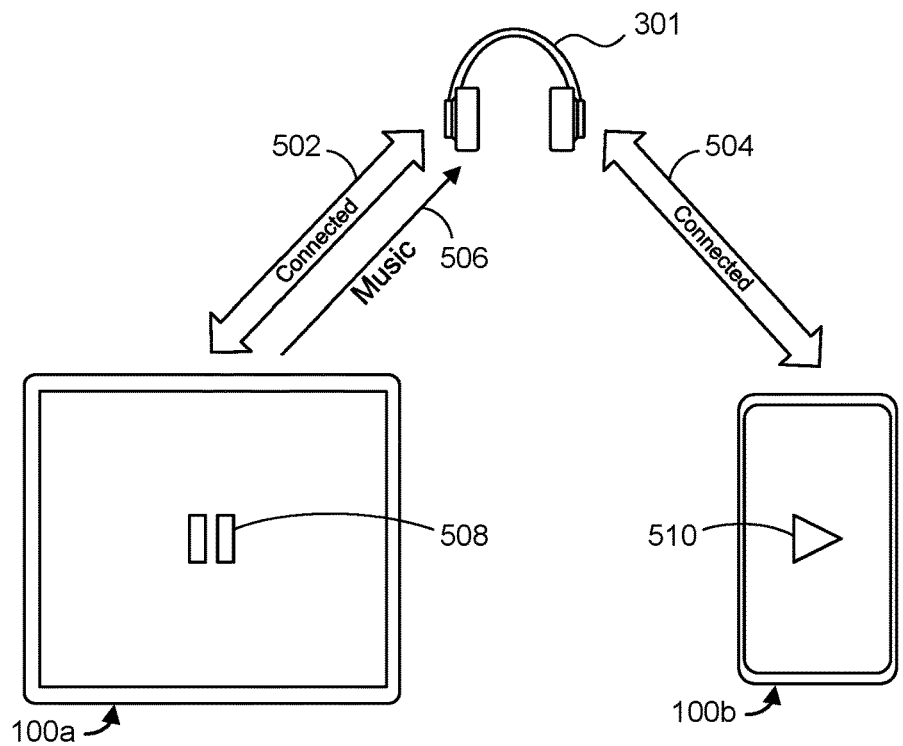
FIGS. 5A-5V illustrate example user interfaces for establishing an audio route between a wearable audio output device and an electronic device based on the priority of the audio that the electronic device requests to be output in accordance with some embodiments.
Figure 5B:
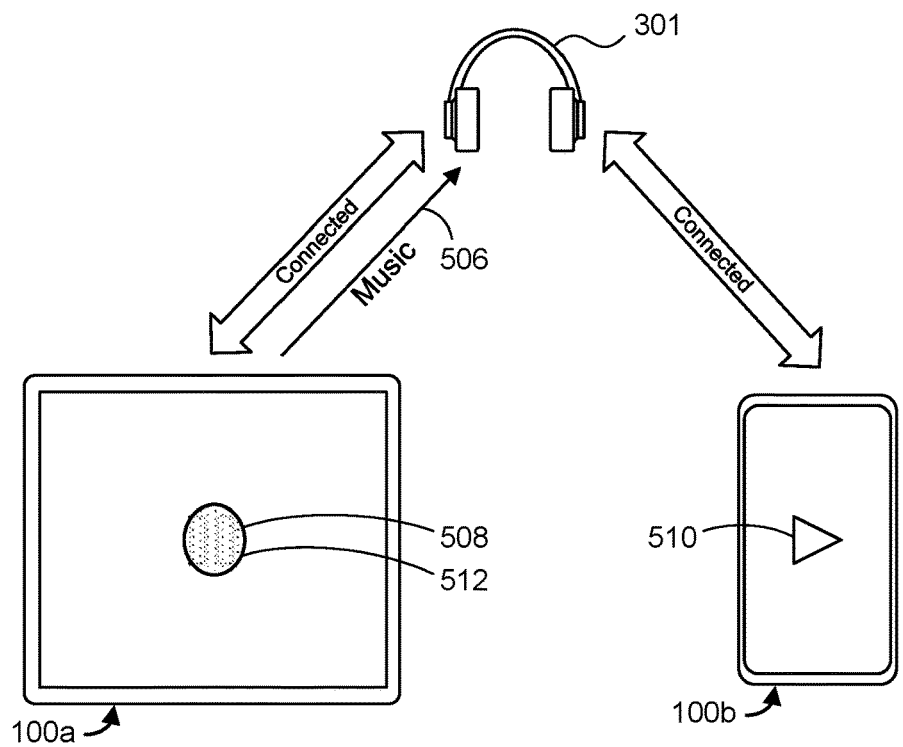
Figure 5C:
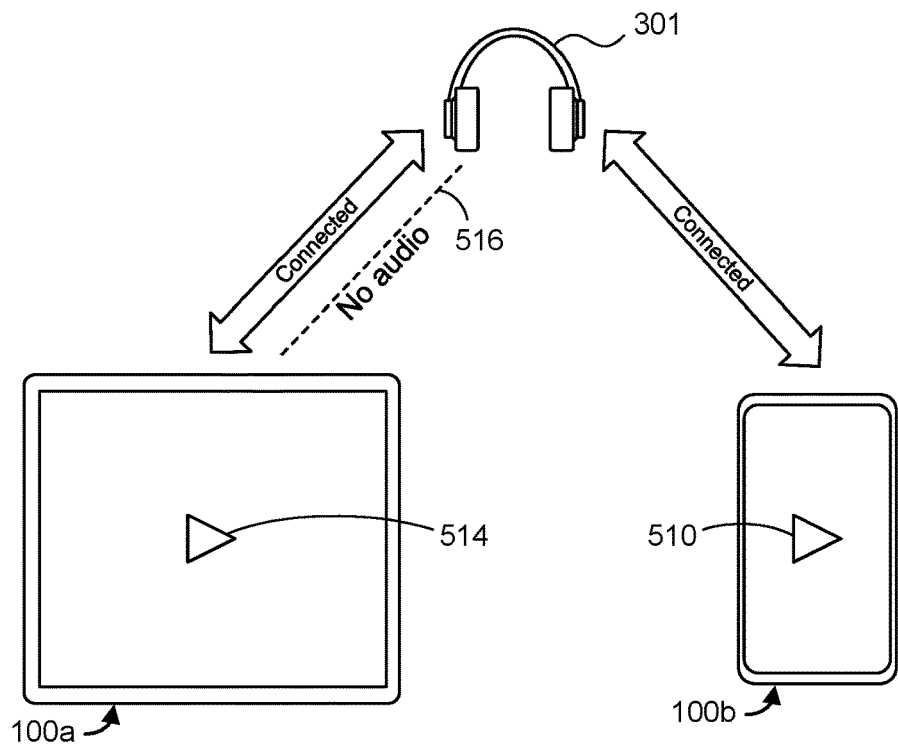
Figure 5D:
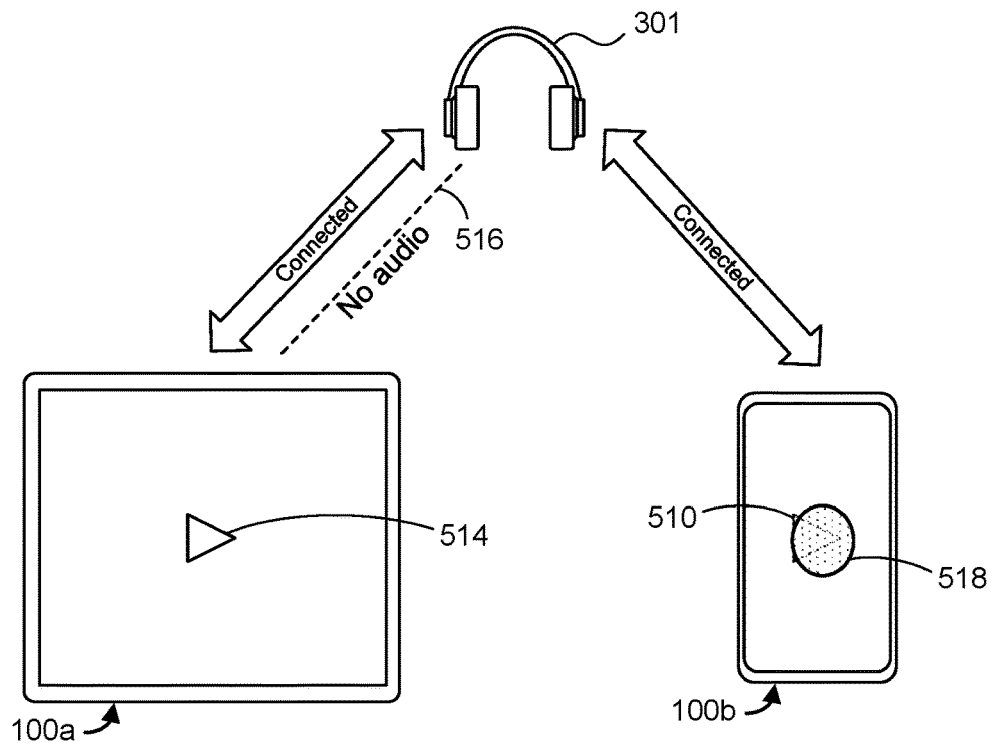
Figure 5E:
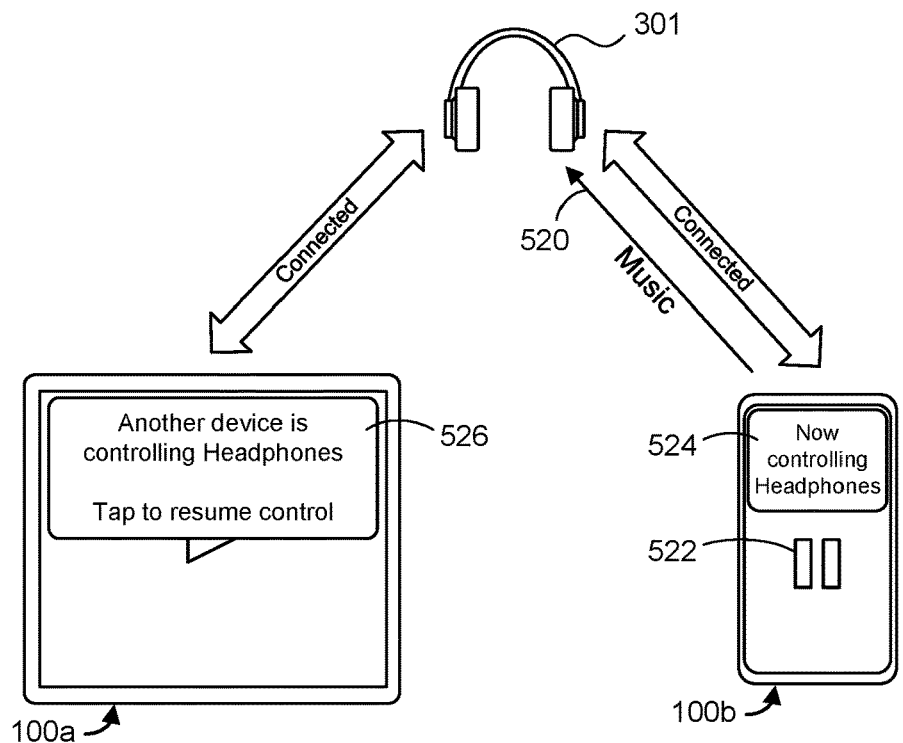
Figure 5F:
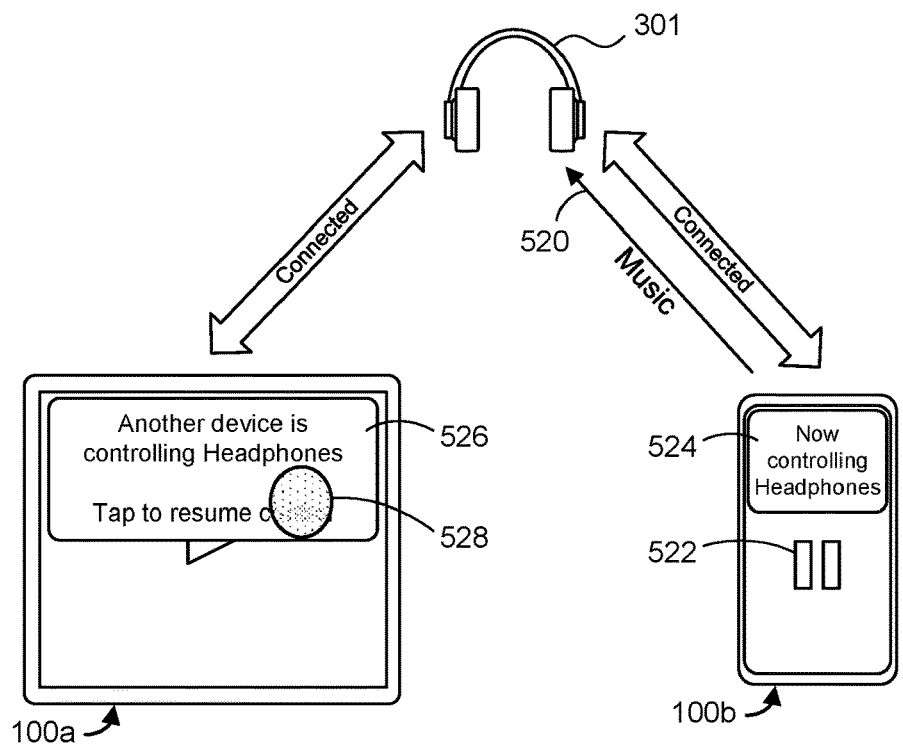
Figure 5G:
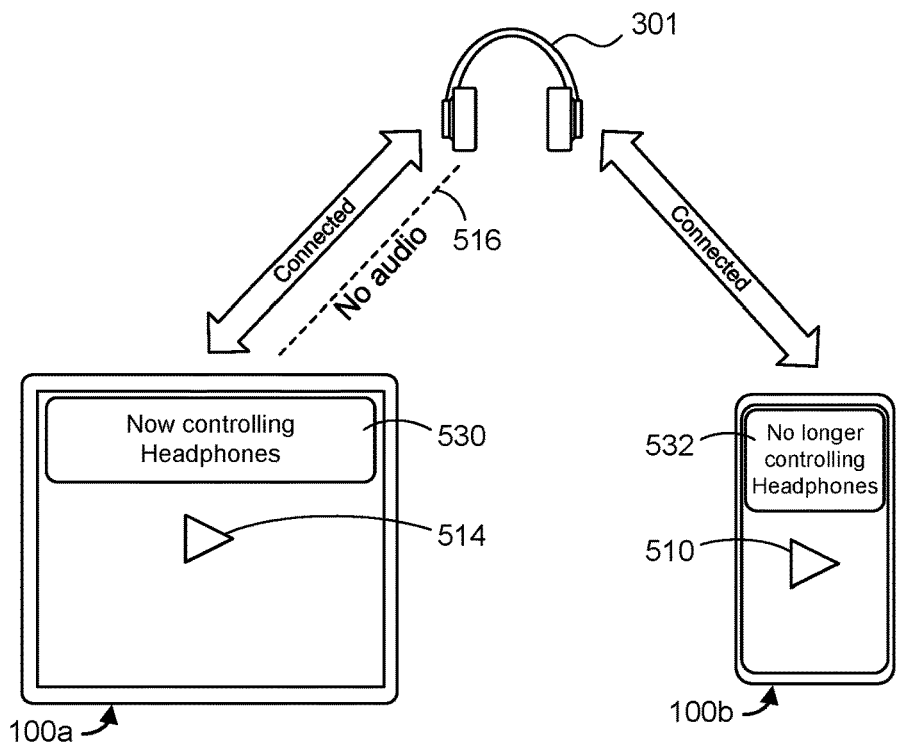
Figure 5H:
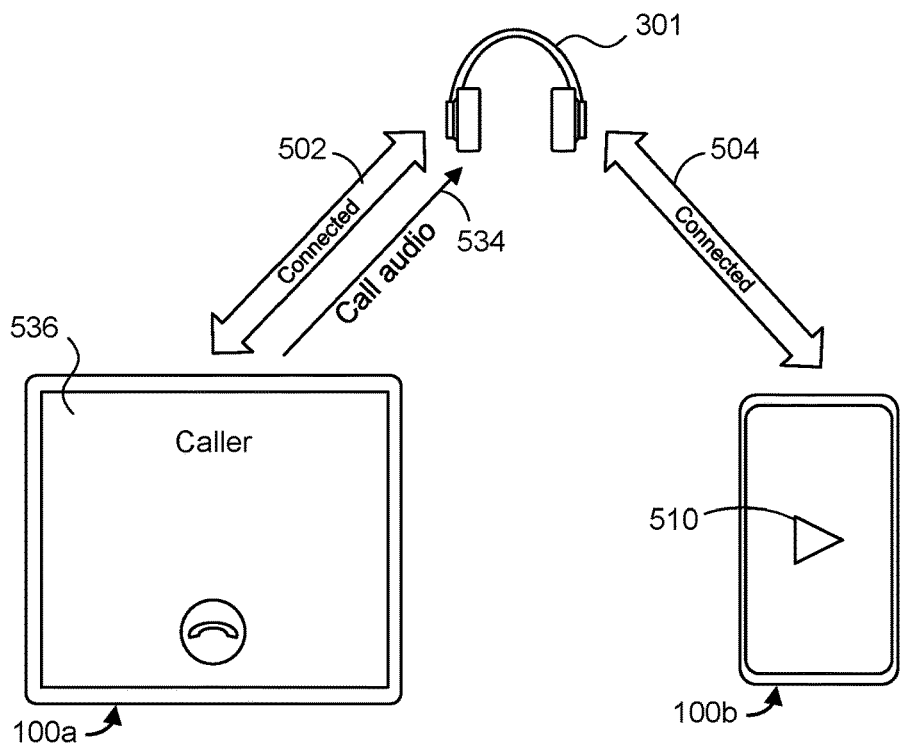
Figure 5I:
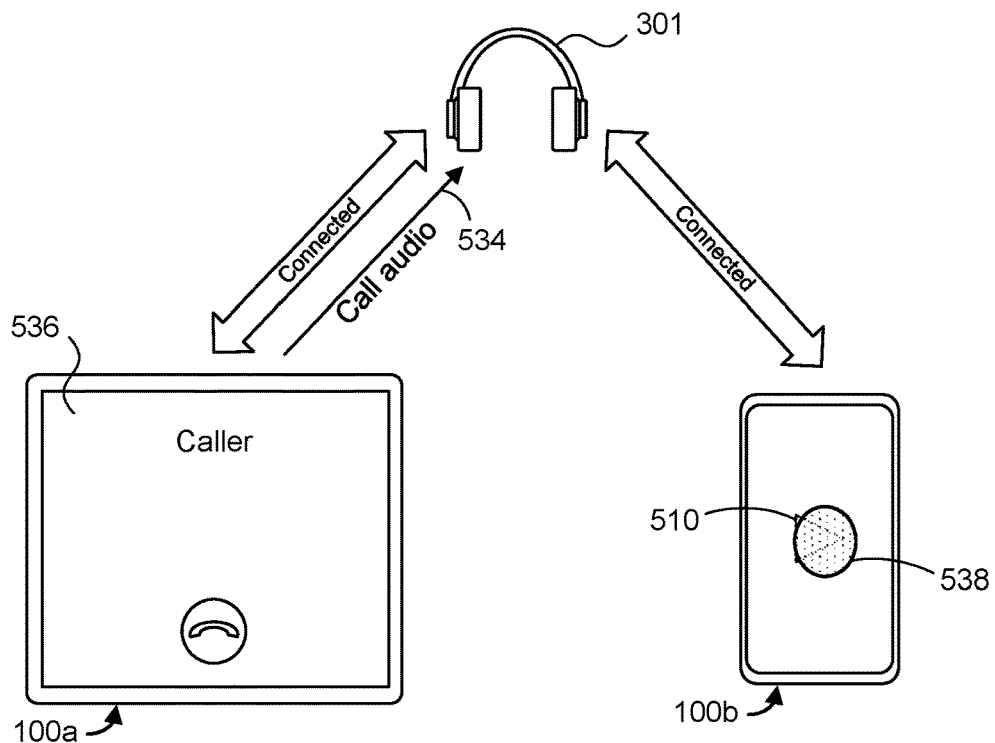
Figure 5J:
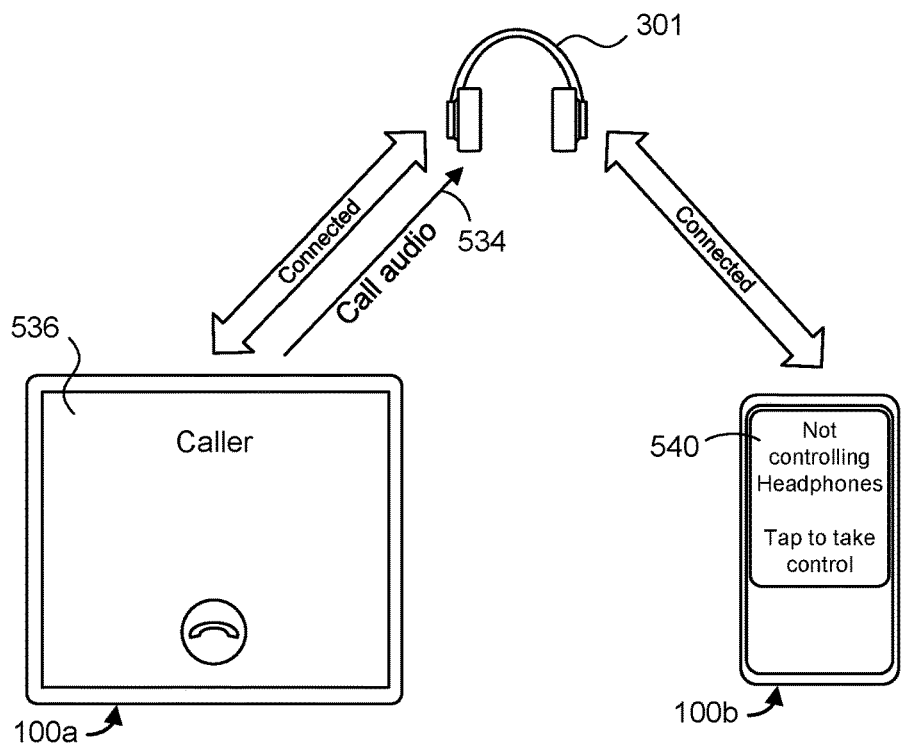
Figure 5K:
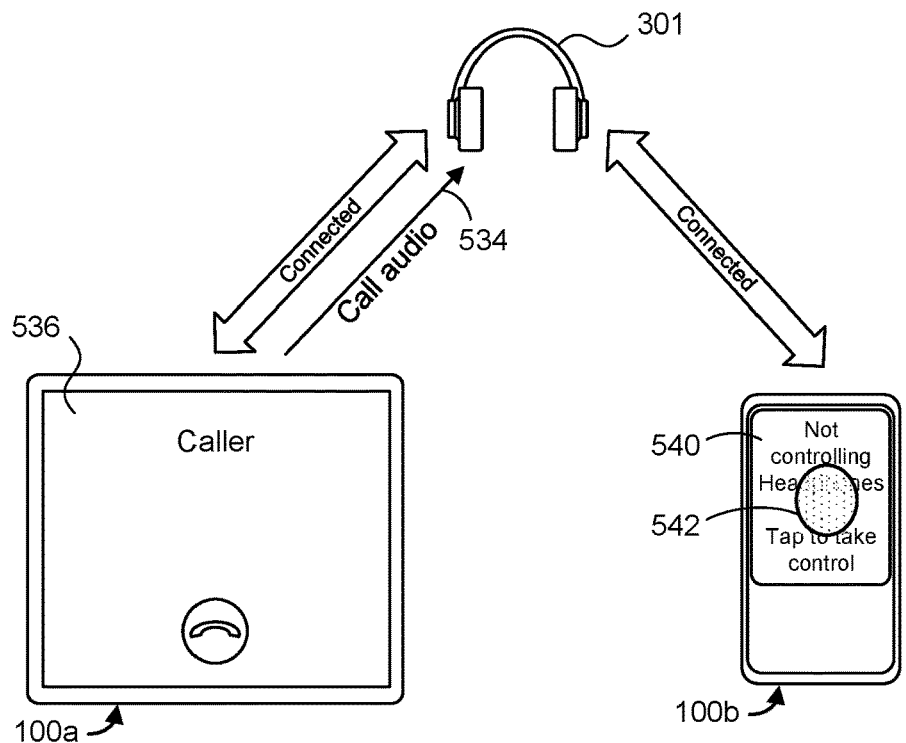
Figure 5L:
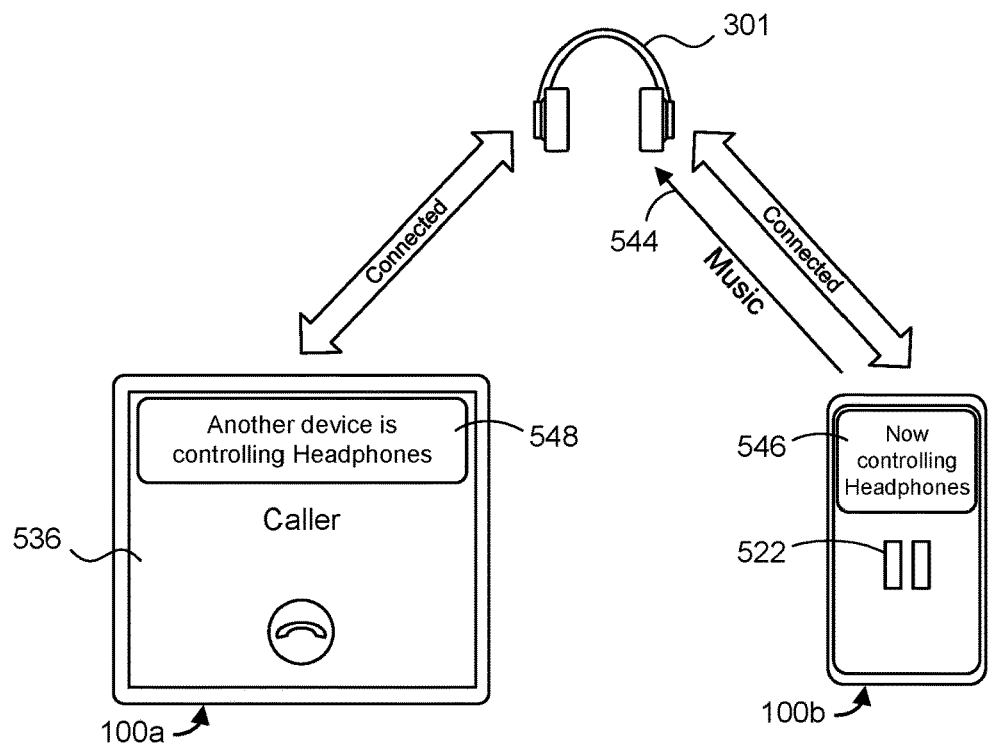
Figure 5M:
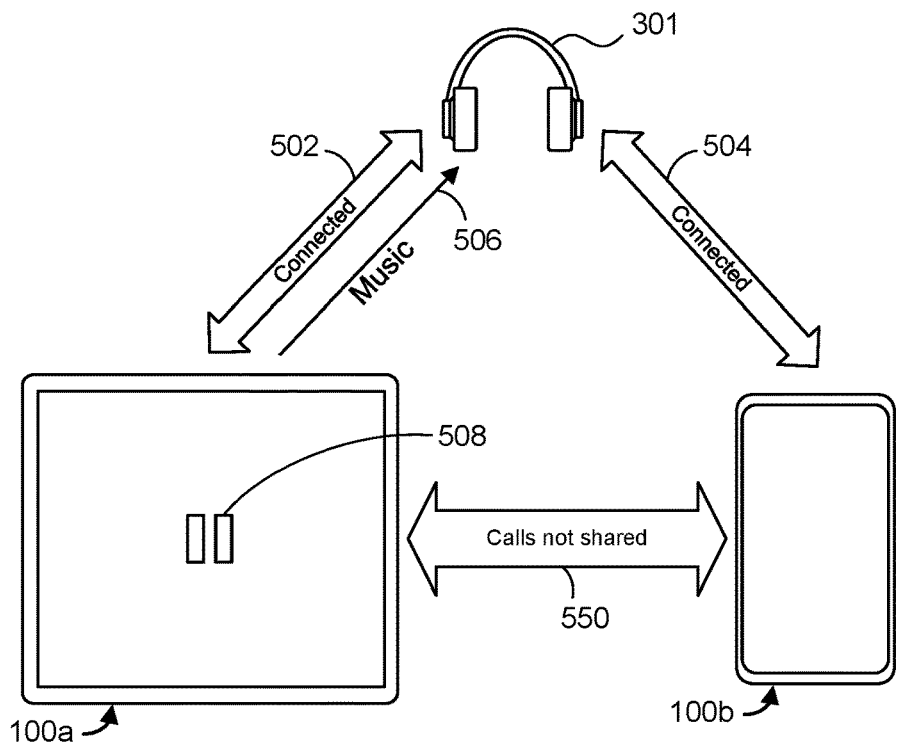
Figure 5N:
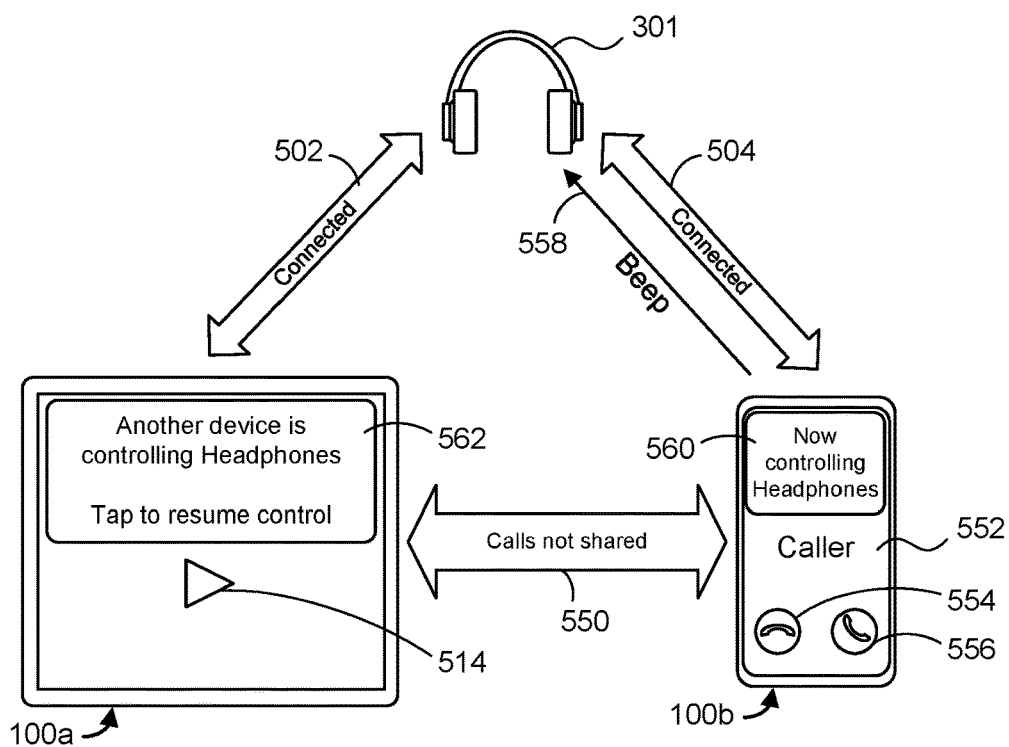
Figure 5O:
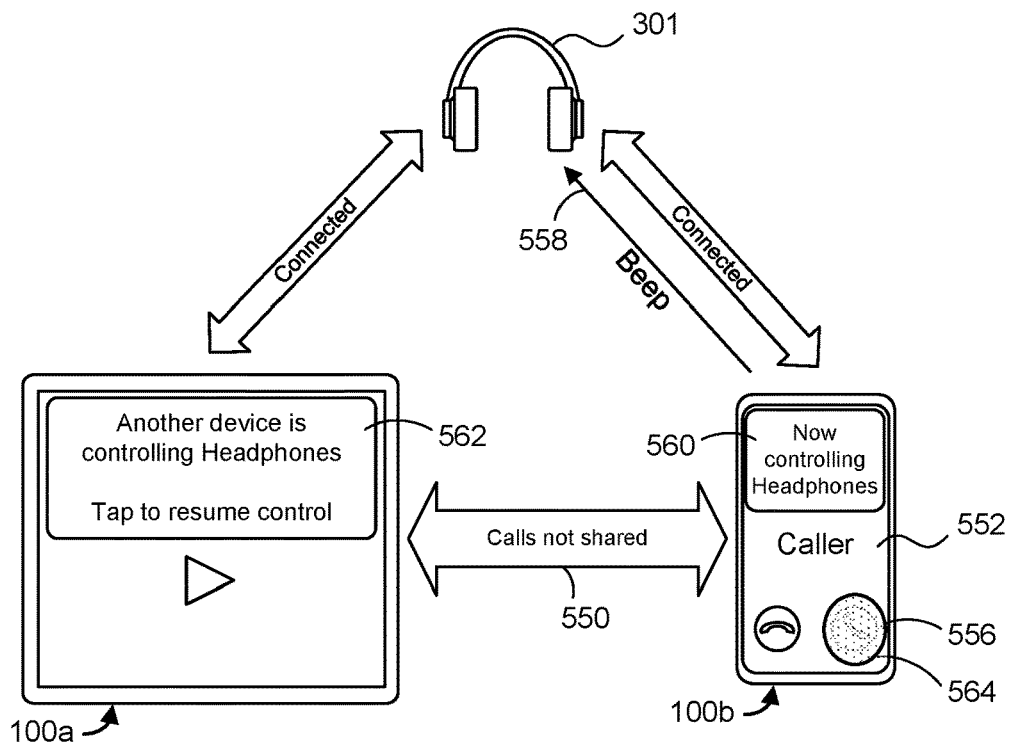
Figure 5P:
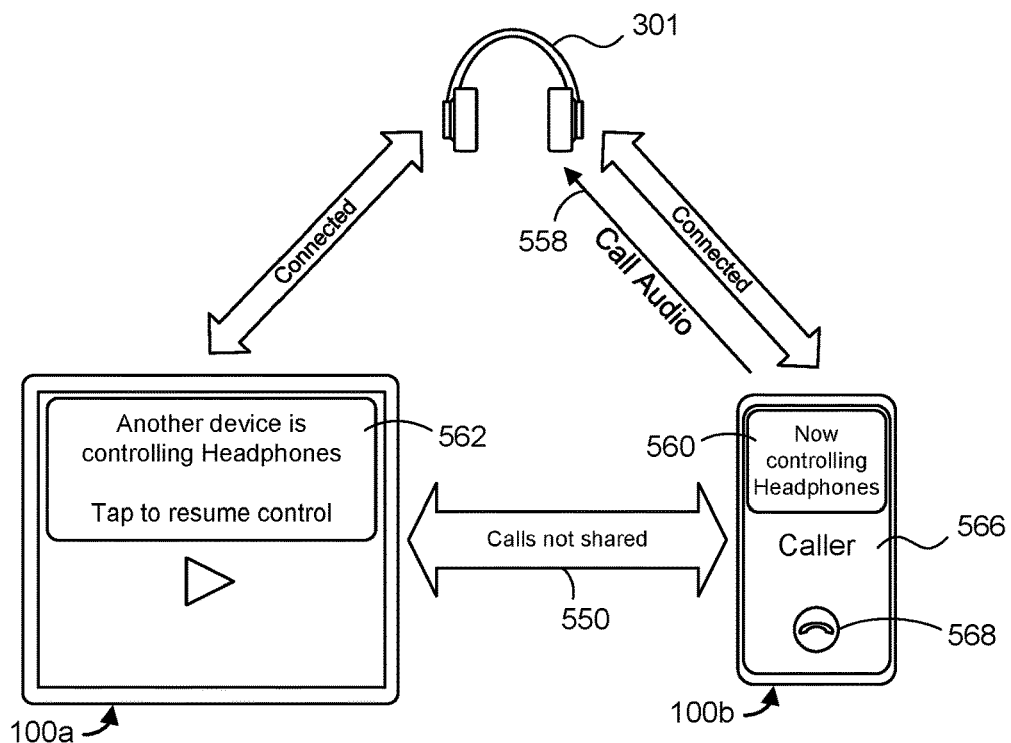
Figure 5Q:
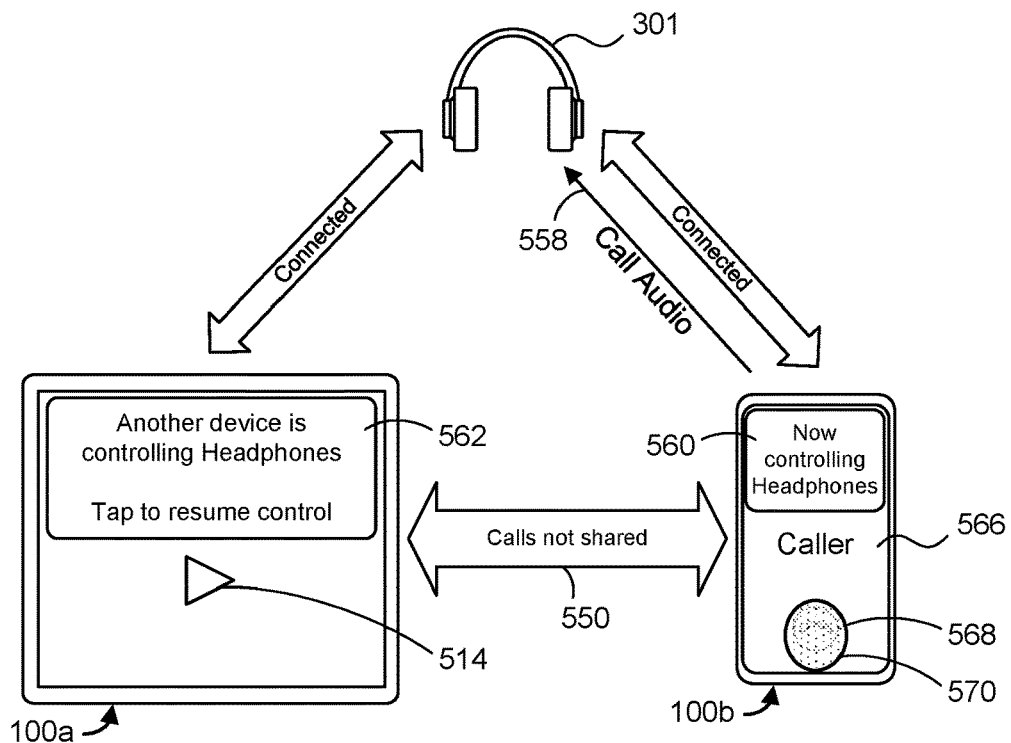
Figure 5R:
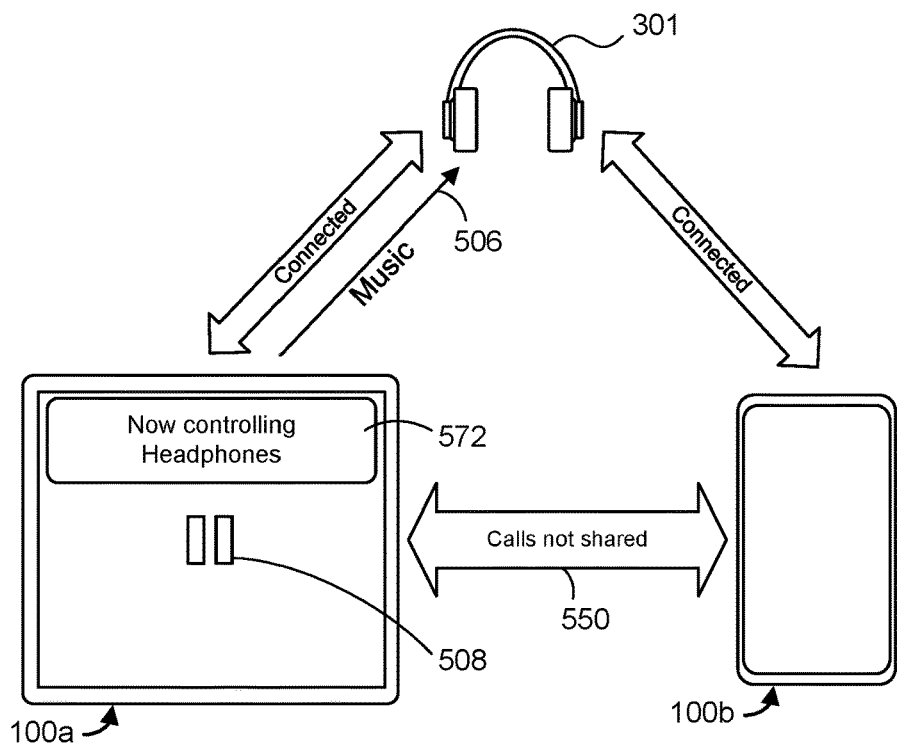
Figure 5S:
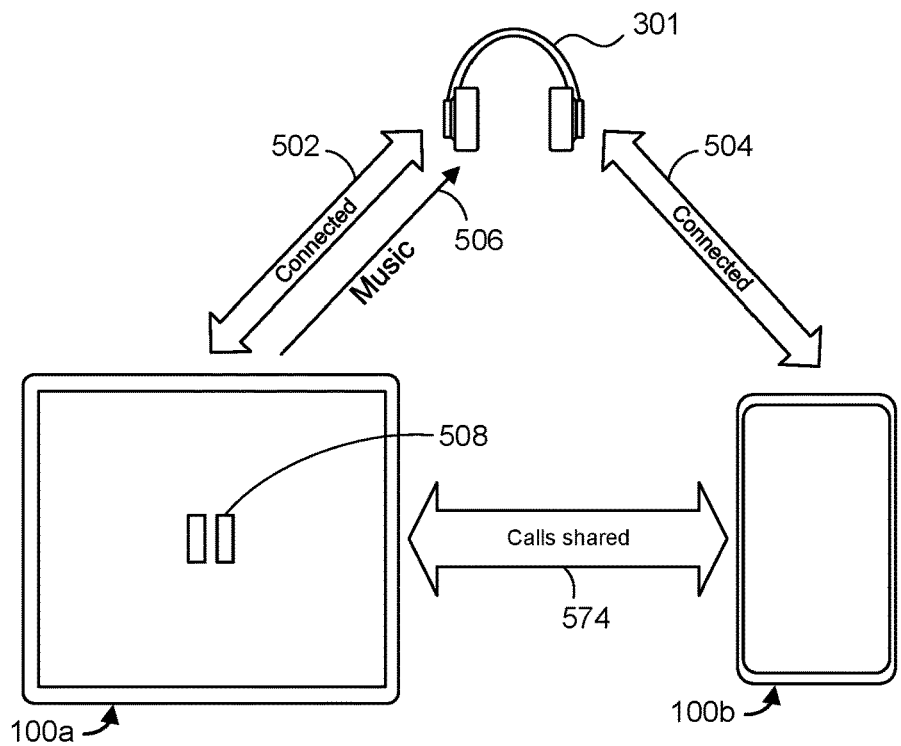
Figure 5T:
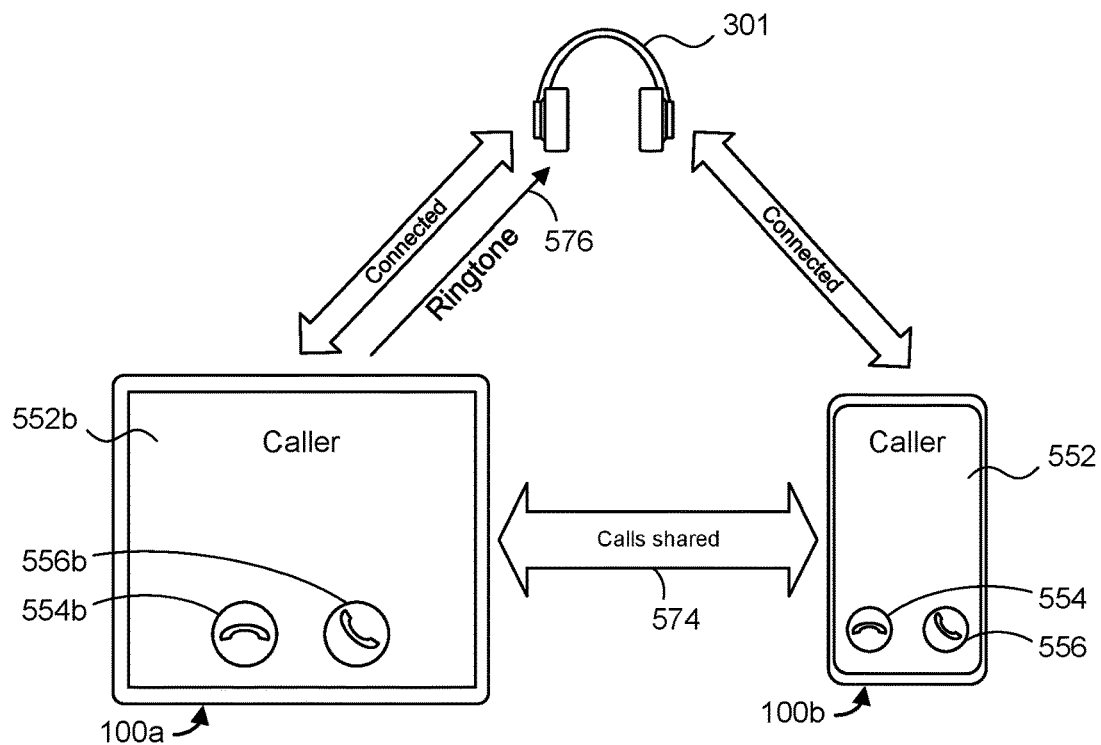
Figure 5U:
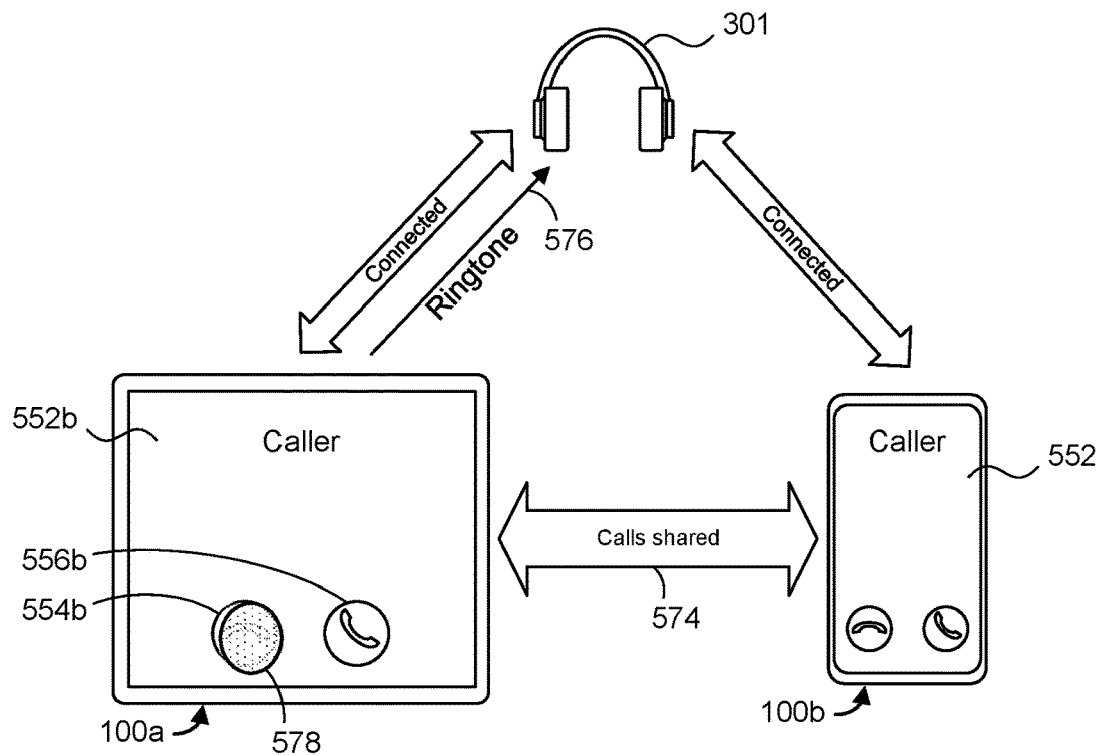
Figure 5V:
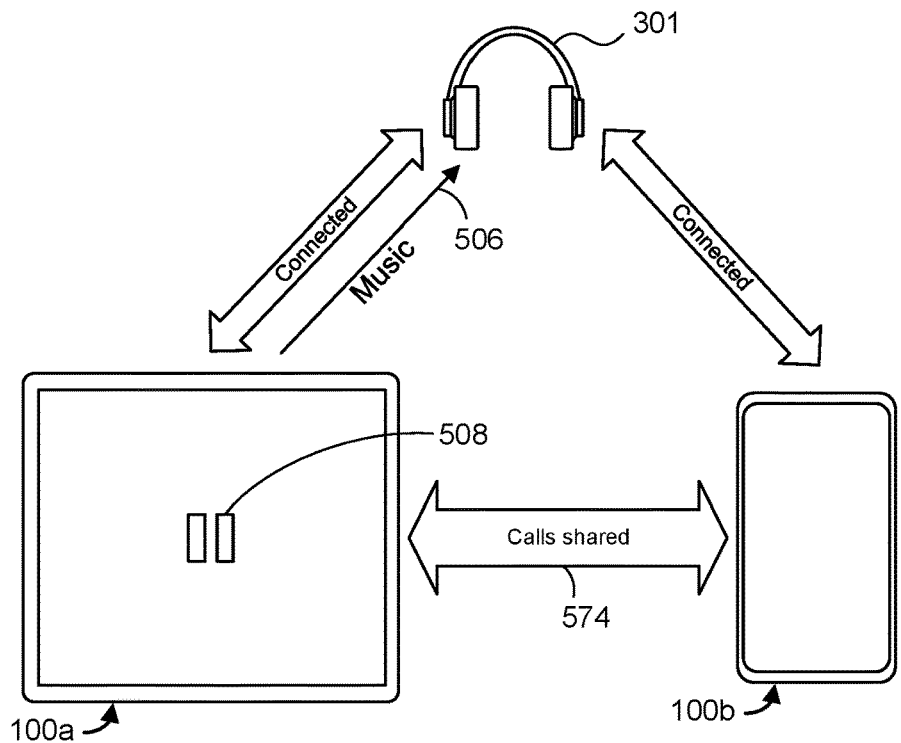
Figure 6A:
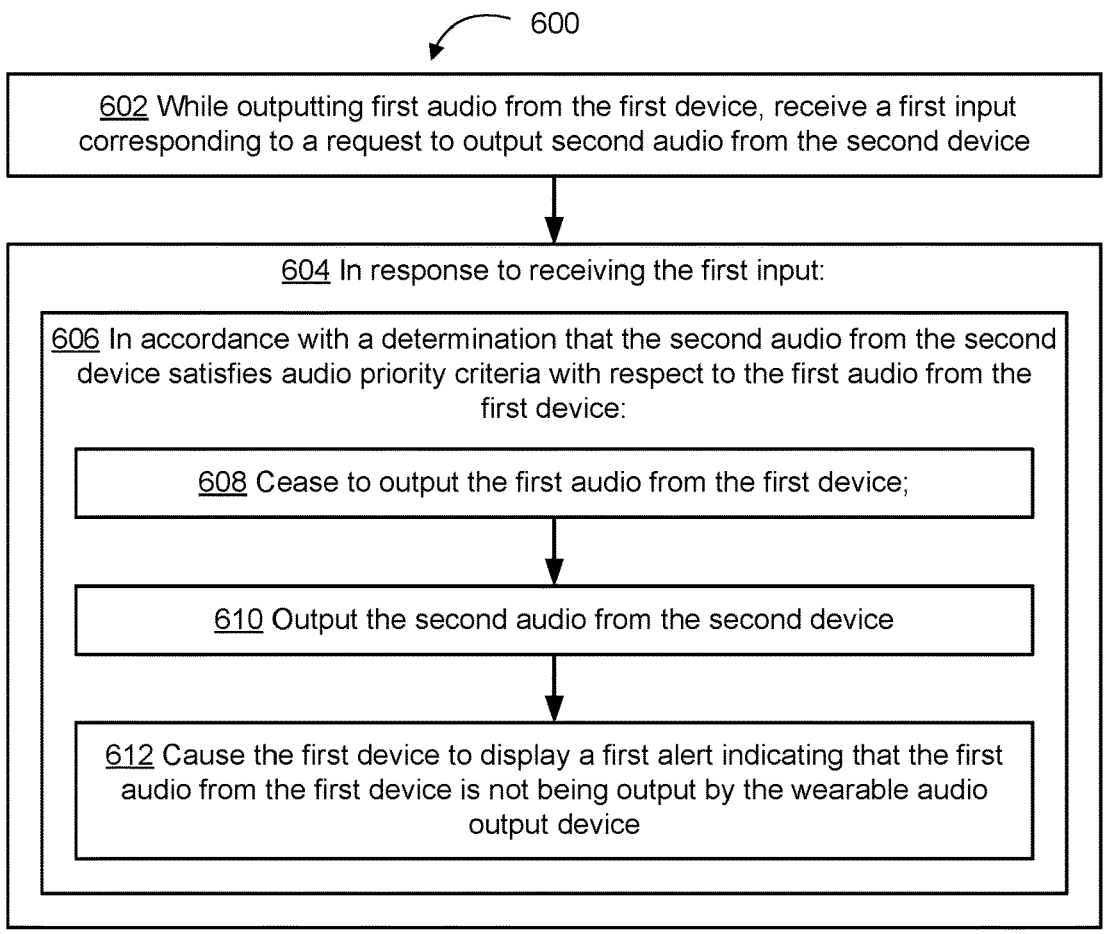

FIGS. 5A-5V illustrate example user interactions and user interfaces for establishing an audio route between a wearable audio output device and an electronic device based on the priority of the audio that the electronic device requests to be output in accordance with some embodiments.

FIGS. 5A-5G illustrate an example of audio routing for a wearable audio output device in response to a request from a second electronic device to play higher priority audio than a first electronic device.

FIG. 5A shows a wearable audio output device 301. In the example shown in FIG. 5A, wearable audio output device 301 is a set of headphones (sometimes herein called "headphones 301"). Alternatively, wearable audio output device may be a set (e.g., a pair) of earbuds or earphones. In FIG. 5A, headphones 301 are in communication with (e.g., connected to) electronic device 100a, as represented by arrow 502, and also in communication with (e.g., connected to) electronic device 100b, as represented by arrow 504. An audio route is established between device 100a and headphones 301, as represented by arrow 506 between device 100a and headphones 301. In particular, FIG. 5A shows device 100a playing music via headphones 301, as represented by arrow 506 and indicated by pause button 508 displayed on device 100a. Device 100b is not outputting audio, as indicated by play button 510 displayed on device 100b, and although device 100b is connected to headphones 301 as represented by arrow 504, an audio route is not established between device 100b and headphones 301. Pause button 508 (and corresponding play button 514) optionally represents a simplification of a music playing user interface displayed on device 100a, and play button 510 (and corresponding pause button 522) optionally represents a simplification of a music playing user interface displayed on device 100b.

Whether audio is routed between headphones 301 and a respective device (sometimes described as the device "having" or "controlling" the audio route) determines whether audio from the respective device is output via headphones 301. While a respective device "has" the audio route, audio from the respective device is output via headphones 301. While a respective device "does not have" the audio route, audio from the respective device is not output via headphones 301. In some embodiments, a respective audio output device establishes an audio route with only one connected external electronic device at a time. It is noted that an audio route between an audio output device and an electronic device is different from, and in addition to, a wireless connection between the audio output device and the electronic device. For example, device 100a is connected to headphones 301, as represented by arrow 502, and also has control over the audio route to headphones 301, as represented by arrow 506. In addition, at the same time that device 100a is connected to headphones and has control over the audio route to headphone 301, device 100b is also connected to headphones 301, as represented by arrow 504, but device 100b does not have control over the audio route to headphones 301 (e.g., as indicated by the lack of any arrow, other than arrow 504, between device 100b and headphones 301).

FIG. 5B illustrates a transition from FIG. 5A. FIG. 5B shows input 512 corresponding to pause button 508 on device 100a (e.g., a tap input on a touchscreen of device 100a at the location of displayed pause button 508).

FIG. 5C illustrates that, in response to input 512 in FIG. 5B, music playback from device 100a via headphones 301 is paused, as indicated by play button 514, instead of pause button 508, being displayed on device 100a. Although no audio from device 100a is being output via headphones 301, the audio route remains between device 100a and headphones 301, as represented by dashed line 516.

FIG. 5D illustrates a transition from FIG. 5C. FIG. 5D shows input 518 corresponding to play button 510 on device 100*b* (e.g., a tap input on a touchscreen of device 100*b* at the location of displayed play button 510), requesting that music from device 100*b* be played via headphones 301.

FIG. 5E illustrates that, in response to input 518 in FIG. 5D, the audio route to headphones 301 is transferred from device 100*a* to device 100*b*, and music from device 100*b* is played via headphones 301, as represented by arrow 520 and indicated by pause button 522, instead of play button 510, being displayed on device 100*b*. In this example, the audio route is transferred in accordance with a determination that, because no audio was being played over the audio route between headphones 301 and device 100*a*, the audio requested by device 100*b* to be played via headphones 301 (e.g., music) takes priority over an unused audio route.

In accordance with the audio route being transferred, device 100*b* displays alert 524 indicating that device 100*b* currently controls the audio route and the audio being output via headphones 301. In addition, device 100*a* displays alert 526 indicating that device 100*a* no longer controls the audio route. Alert 526 also indicates that alert 526 is selectable (e.g., via a tap input) to return control of the audio route to device 100*a* instead of device 100*b*.

FIG. 5F illustrates a transition from FIG. 5E. FIG. 5F shows input 528 corresponding to alert 526 on device 100*a* (e.g., a tap input on the touchscreen of device 100*a* at the location of displayed alert 526), corresponding to a request to resume control of headphones 301 by device 100*a*.

FIG. 5G illustrates that, in response to input 528 in FIG. 5F, the audio route to headphones 301 is transferred from device 100*b* back to device 100*a*, as represented by dashed line 516. Device 100*a* displays alert 530 indicating that device 100*a* has resumed control over the audio route. In addition, in response to the audio route being transferred away from device 100*b*, device 100*b* displays alert 532 indicating the change in audio route status, and playback of music from device 100*b* is paused, as indicated by play button 510 being redisplayed on device 100*b*, instead of pause button 522 being displayed. In the example shown in FIG. 5G, playback of music from device 100*a* is not automatically resumed when the audio route is transferred back to device 100*a*, as represented by dashed line 516 and play button 514 continuing to be displayed on device 100*a*. In some embodiments, playback of music from device 100*a* (e.g., or other audio that was being output when the audio route was transferred away) is automatically resumed when the audio route is transferred back to device 100*a* in response to an input on alert 526 in FIG. 5F.

FIGS. 5H-5L illustrate an example of audio routing for a wearable audio output device in response to a request from a second electronic device to play lower priority audio than a first electronic device.

FIG. 5H shows headphones 301 connected to electronic device 100*a*, as represented by arrow 502, and also connected to electronic device 100*b*, as represented by arrow 504. An audio route is established between device 100*a* and headphones 301, as represented by arrow 534 between device 100*a* and headphones 301. In particular, FIG. 5H shows device 100*a* engaged in a phone call and outputting audio of the phone call via headphones 301 (and in some embodiments also receiving audio for the phone call via a microphone on headphones 301), as represented by arrow 534 and by active call user interface 536 displayed on device 100*a*. Device 100*b* is not outputting audio, as indicated by play button 510 displayed on device 100*b*, and although device 100*b* is connected to headphones 301 as represented by arrow 504, an audio route is not established between device 100*b* and headphones 301.

FIG. 5I illustrates a transition from FIG. 5H. FIG. 5I shows input 538 corresponding to play button 510 on device 100*b* (e.g., a tap input on the touchscreen of device 100*b* at the location of displayed play button 510), requesting that music from device 100*b* be played via headphones 301.

FIG. 5J illustrates that, in response to input 538 in FIG. 5I, the audio route to headphones 301 is not transferred from device 100*a* to device 100*b*, and music from device 100*b* is not played via headphones 301. In this example, forgoing transferring the audio route is performed in accordance with a determination that the audio requested by device 100*b* to be played via headphones 301 (e.g., music) does not take priority over (e.g., is lower priority than) the audio being played via headphones 301 by device 100*a* (e.g., phone call audio).

In accordance with the audio route being maintained with device 100*a* and not being transferred to device 100*b*, device 100*b* displays alert 540 indicating that the audio route has not been rerouted and that device 100*b* does not control the audio route. Alert 540 also indicates that alert 540 is selectable (e.g., via a tap input) to cause device 100*b* to assert control of the audio route (e.g., to override the default behavior and transfer the audio route from device 100*a* to device 100*b*.

FIG. 5K illustrates a transition from FIG. 5J. FIG. 5K shows input 542 corresponding to alert 540 on device 100*b* (e.g., a tap input on the touchscreen of device 100*b* at the location of displayed alert 540), corresponding to a request to assert control of headphones 301 by device 100*b*.

FIG. 5L illustrates that, in response to input 542 in FIG. 5K, the audio route to headphones 301 is transferred from device 100*a* to device 100*b*, as represented by arrow 544 between device 100*b* and headphones 301, and device 100*b* outputs music via headphones 301, as indicated by pause button 522, instead of play button 510, being displayed on device 100*b*. In some embodiments, music playback from device 100*b* begins in response to input 538 and device 100*b* gaining control over the audio route (e.g., in some embodiments, although the user requested music playback via input 538 in FIG. 5I, music playback is delayed while device 100*b* does not have control over the audio route). Device 100*b* displays alert 546 indicating that device 100*b* currently controls the audio route and the audio being output via headphones 301. In addition, device 100*a* displays alert 548 indicating that device 100*a* no longer controls the audio route. In the example shown in FIG. 5L, alert 548 is not selectable to return control of the audio route back to device 100*a*. In some embodiments, alert 548 is selectable to return control of the audio route back to device 100*a* (e.g., similar to alert 526 in FIG. 5E). In some embodiments, because device 100*a* cannot output the call audio using headphones 301 while device 100*b* controls the audio route to headphones 301, device 100*a* displays one or more alternative options that may be selected for outputting call audio (e.g., using a built-in speaker of device 100*a*, using another audio output device to which device 100*a* is connected, etc.).

FIGS. 5M-5R illustrate an example of audio routing for a wearable audio output device while calls to or from one electronic device are not shared with nearby devices.

FIG. 5M shows headphones 301 connected to electronic device 100*a*, as represented by arrow 502, and also connected to electronic device 100*b*, as represented by arrow 504. An audio route is established between device 100*a* and headphones 301, as represented by arrow 506 between device 100*a* and headphones 301. In particular, FIG. 5M shows device 100*a* playing music via headphones 301, as represented by arrow 506 and indicated by pause button 508 displayed on device 100*a*. Device 100*b* is not outputting audio, and although device 100*b* is connected to headphones 301 as represented by arrow 504, an audio route is not established between device 100*b* and headphones 301.

In some embodiments, where a device supports making and receiving cellular calls, other devices may be permitted to share the cellular capabilities of the cellular device to also make and receive calls using the cellular information of the cellular device (e.g., if the other devices are on the same communications network and/or authenticated to a same user account). In the example in FIG. 5M, call sharing between device 100*a* and device 100*b* is not enabled (e.g., device 100*a* is not enabled to make or receive calls using device 100*b*'s cellular capabilities), as represented by arrow 550.

FIG. 5N illustrates a transition from FIG. 5M. FIG. 5N shows a phone call being received at device 100*b*, as indicated by incoming call user interface 552 displayed on device 100*b*. Incoming call user interface 552 includes decline call button 554 (which, when selected, declines the incoming call) and accept call button 556 (which, when selected, answers the incoming call). Because device 100*b* and device 100*a* do not share calls, an incoming call user interface for the incoming call to device 100*b* is not displayed on device 100*a*. In addition, because the audio requested by device 100*b* to be played via headphones 301 (e.g., incoming call audio) takes priority over the audio being played via headphones 301 by device 100*a* (e.g., music), the audio route is transferred from device 100*a* to device 100*b*, as represented by arrow 558. However, because device 100*b* and device 100*a* do not share calls, the audio that is played to indicate the incoming call at device 100*b* is an audio alert other than a ringtone, such as a beep, as represented by arrow 558. In addition, in the example shown in FIG. 5N, music playback at device 100*a* is paused in response to the audio route being transferred away from device 100*a*, as indicated by play button 514, instead of pause button 508, being displayed on device 100*a*.

In accordance with the audio route being transferred from device 100*a* to device 100*b*, device 100*b* displays alert 560 indicating that device 100*b* currently controls the audio route and the audio being output via headphones 301. In addition, device 100*a* displays alert 562 indicating that device 100*a* no longer controls the audio route. Alert 562 also indicates that alert 562 is selectable (e.g., via a tap input) to return control of the audio route to device 100*a* instead of device 100*b*.

FIG. 5O illustrates a transition from FIG. 5N. FIG. 5O shows input 564 corresponding to accept call button 556 on device 100*b* (e.g., a tap input on the touchscreen of device 100*b* at the location of displayed accept call button 556).

FIG. 5P illustrates that, in response to input 564 in FIG. 5O, the incoming call at device 100*b* is answered and is ongoing, as indicated by active call user interface 566 displayed on device 100*b*. Active call user interface 566 includes end call button 568 (which, when selected, ends the ongoing phone call). In addition, audio of the call is output via the audio route between device 100*b* and headphones 301, as represented by arrow 558.

FIG. 5Q illustrates a transition from FIG. 5P. FIG. 5Q shows input 570 corresponding to end call button 568 in active call user interface 566 on device 100*b* (e.g., a tap input on the touchscreen of device 100*b* at the location of displayed end call button 568). Input 570 is received while the phone call at device 100*b* is ongoing, as indicated by active call user interface 566 displayed on device 100*b*, and while call audio is routed from device 100*b* to headphones 301, as represented by arrow 558.

FIG. 5R illustrates that, in response to input 570 in FIG. 5Q, the ongoing call at device 100*b* is ended, as indicated by active call user interface 566 no longer being displayed on device 100*b*. The audio route to headphones 301 is transferred from device 100*b* back to device 100*a*, as represented by arrow 506 (e.g., because the audio route with headphones 301 was transferred from device 100*a* to device 100*b* in response to the call at device 100*b* and in accordance with the call audio from device 100*b* being higher priority than the music from device 100*a*, as described herein with reference to FIG. 5N, the audio route is returned to device 100*a* in response to the call at device 100*b* being terminated). Accordingly, device 100*a* displays alert 572 indicating that device 100*a* has resumed control over the audio route. In addition, music playback from device 100*a* via headphones 301 is resumed, as represented by arrow 506 and indicated by pause button 508 being redisplayed on device 100*a*, instead of play button 514 being displayed.

FIGS. 5S-5V illustrate an example of audio routing for a wearable audio output device while calls to or from one electronic device are shared with nearby devices.

FIG. 5S is similar to FIG. 5M and shows headphones 301 connected to electronic device 100*a*, as represented by arrow 502, and also connected to electronic device 100*b*, as represented by arrow 504. An audio route is established between device 100*a* and headphones 301, as represented by arrow 506 between device 100*a* and headphones 301. In particular, similar to FIG. 5M, FIG. 5S shows device 100*a* playing music via headphones 301, as represented by arrow 506 and indicated by pause button 508 displayed on device 100*a*. Device 100*b* is not outputting audio, and although device 100*b* is connected to headphones 301 as represented by arrow 504, an audio route is not established between device 100*b* and headphones 301.

Unlike FIG. 5M, however, in the example in FIG. 5S, call sharing between device 100*a* and device 100*b* is enabled (e.g., device 100*a* can make or receive calls using device 100*b*'s cellular capabilities), as represented by arrow 574.

FIG. 5T illustrates a transition from FIG. 5S. FIG. 5T shows a phone call being received at device 100*b*, as indicated by incoming call user interface 552 displayed on device 100*b*. Incoming call user interface 552 includes decline call button 554 (which, when selected, declines the incoming call) and accept call button 556 (which, when selected, answers the incoming call). In addition, because device 100*b* and device 100*a* share calls, incoming call user interface 552*b* (including corresponding decline call button 554*b* and accept call button 556*b*) for the incoming call to device 100*b* is displayed on device 100*a*, and a ringtone for the incoming call is output to headphones 301 by device 100*a* using the existing audio route between device 100*a* and headphones 301 (e.g., the audio route need not be transferred from device 100*a* to device 100*b* in order to provide an audio alert of the incoming call), as represented by arrow 576. In some embodiments, because the audio route need not be, and is not, transferred from device 100*a* to device 100*b*, alerts indicating the audio route status are not displayed on device 100*a* or device 100*b*. In some embodiments, as in the example in FIG. 5T, the audio that is played to indicate the incoming call at device 100*a* is a ringtone for the incoming call (e.g., because the call is being received at the same device, device 100*a*, that currently controls the audio route to headphones 301, due to call sharing being enabled), in contrast to the example described in FIG. 5N. In some embodiments, if the call is answered (e.g., at device 100*a*, or in some embodiments at either device 100*a* or device 100*b*), audio for the ongoing call is also output to headphones 301 by device 100*a*, using the existing audio route between device 100*a* and headphones 301.

FIG. 5U illustrates a transition from FIG. 5T. FIG. 5U shows input 578 corresponding to decline call button 554*b* in incoming call user interface 552*b* on device 100*a* (e.g., a tap input on the touchscreen of device 100*a* at the location of displayed decline call button 554*b*).

FIG. 5V illustrates that, in response to input 578 in FIG. 5U, the incoming call at device 100*b* is declined, as indicated by incoming call user interface 552*b* no longer being displayed on device 100*a* and by incoming call user interface 552 no longer being displayed on device 100*b*. In addition, music playback from device 100*a* via headphones 301 is resumed, as represented by arrow 506 and indicated by pause button 508 being redisplayed on device 100*a*.

FIGS. 6A-6C are flow diagrams illustrating method 600 of routing audio between an audio output device and multiple connected electronic devices based on the priority of the audio that an electronic device requests to be output in accordance with some embodiments. Method 600 is performed at a wearable audio output device (e.g., a wearable audio output device 301 (FIG. 3B) such as headphones 301 (FIG. 5A) or a pair of earbuds) that is in communication with a first device (e.g., an electronic device such as portable multifunction device 100 (FIG. 1A) or device 300 (FIG. 3A), such as device 100*a* (FIG. 5A)) and with a second device that is different from the first device (e.g., another of portable multifunction device 100 (FIG. 1A) or device 300 (FIG. 3A), such as device 100*b* (FIG. 5A)). Some operations in method 600 are, optionally, combined and/or the order of some operations is, optionally, changed.

As described herein, method 600 determines whether to continue outputting audio from a first device or to switch to outputting audio from a second device in response to a request, received while outputting audio from the first device, to output audio from the second device, based on whether the audio requested by the second device takes priority over the audio from the first device. Method 600 further displays one or more visual alerts indicating which device currently controls audio output (e.g., which device has the audio output route) and/or whether the control over audio output has changed. Performing an operation (e.g., automatically) when a set of conditions has been met without requiring further user input, and providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

While outputting first audio from the first device (e.g., while an audio route is established between the first device and the wireless audio output device) (602), the wearable audio output device receives (e.g., from the second device) a first input corresponding to a request to output second audio from the second device (e.g., a request to transfer the audio route to the second device). For example, in FIG. 5D, while an audio route is established between headphones 301 and device 100*a*, headphones 301 receive a request from device 100*b* to output audio from device 100*b*, in response to input 518 at device 100*b*. In another example, in FIG. 5I, while an audio route is established between headphones 301 and device 100*a*, headphones 301 receive a request from device 100*b* to output audio from device 100*b*, in response to input 538 at device 100*b*.

In response to receiving the first input (604): in accordance with a determination that the second audio from the second device satisfies audio priority criteria with respect to the first audio from the first device (606), the wearable audio output device performs a plurality of operations. The operations include ceasing (608) to output the first audio from the first device (e.g., by transmitting to the first device instructions to cease transmitting the first audio (e.g., data for the first audio) to the wearable audio output device). The operations further include outputting (610) the second audio from the second device (e.g., by transmitting to the second device instructions to transmit the second audio (e.g., data for the second audio) to the wearable audio output device for output). In some embodiments, ceasing to output the first audio from the first device and outputting the second audio from the second device are collectively referred to as rerouting the audio route with the wearable audio output device from the first device to the second device (e.g., so that the audio route is between the second device and the wearable audio output device, instead of between the first device and the wearable audio output device). For example, in FIG. 5E, in response to receiving a request from device 100*b* to output audio from device 100*b* (e.g., in response to input 518 at device 100*b* (FIG. 5D), the audio route with headphones 301 is rerouted from device 100*a* to device 100*b*. In another example, in FIG. 5N, in response to receiving a request from device 100*b* to output audio from device 100*b* (e.g., in response to device 100*b* receiving an incoming call), headphones 301 cease to output music from device 100*a* and begin to output audio associated with the call received at device 100*b*.

The operations further include causing (612) the first device to display a first alert indicating that the first audio from the first device is not being output by the wearable audio output device (e.g., by the wearable audio output device transmitting to the first device information indicating that the first audio is not being output by the wearable audio output device). For example, FIG. 5E shows alert 526 displayed on device 100*a* in accordance with the audio route being transferred away from device 100*a*. In another example, FIG. 5N shows alert 562 displayed on device 100*a* in accordance with the audio route being transferred away from device 100*a*.

In some embodiments, the second audio satisfies the audio priority criteria with respect to the first audio when the second audio is a type of audio that has a higher priority (or, in some embodiments, a same or higher priority) than the type of audio of the first audio. In some embodiments, the second audio does not satisfy the audio priority criteria with respect to the first audio when the second audio is a type of audio that has a same or lower priority (or, in some embodiments, a lower priority) than the type of audio of the first audio. In some embodiments, in accordance with a determination that the second audio from the second device does not satisfy the audio priority criteria with respect to the first audio from the first device, the wearable audio output device forgoes outputting the second audio from the second device, and, in some embodiments, continues to output the first audio from the first device.

In some embodiments, the first alert displayed on the first device is distinct from a user interface, displayed on the first device, that is used to output (e.g., to control output of) the first audio.

In some embodiments, certain types of audio have higher priority than other types of audio. In some embodiments, the types of audio include music, podcasts, audiobooks, videos (e.g., the audio accompanying videos), games (e.g., game audio, the audio accompanying games), voicemail, ringtones, notifications, timers, alarms, navigation (e.g., audible turn-by-turn directions), audio calls, video calls (e.g., the audio accompanying video calls), and the like. In some embodiments, two priority levels are used (e.g., low priority and high priority). In some embodiments, any number of priority levels are used (e.g., low priority, medium priority, high priority, and critical priority, as one example). In some embodiments, different types of audio, such as the aforementioned types, are assigned respective priorities (e.g., notifications are low priority; music, podcasts, audiobooks, videos, game audio, voicemail, timers, alarms, and navigation audio are medium priority; ringtones are high priority; and audio and/or video calls are critical priority, as one example).

In some embodiments, the wearable audio output device receives (614) (e.g., from the first device) a second input corresponding to an input received at the first device, wherein the input received at the first device corresponds to selection of the first alert (e.g., in response to the first device receiving the input corresponding to selection of the first alert, the first device transmits to the wearable audio output device a request to reroute the audio route back to the first device, to override what in some embodiments is the default behavior). In some embodiments, in response to the second input (e.g., the request to reroute the audio route back to the first device), the wearable audio output device: ceases to output the second audio from the second device (e.g., by transmitting instructions to the second device to cease transmitting the second audio (e.g., data for the second audio) to the wearable audio output device); and outputs the first audio from the first device (e.g., by transmitting instructions to the first device to transmit (e.g., resume or continue transmitting) the first audio (e.g., data for the first audio) to the wearable audio output device). For example, in response to receiving a request from device 100*a* to resume control over the audio route with headphones 301 (e.g., in response to input 528 at device 100*a* (FIG. 5F)), the audio route with headphones 301 is rerouted from device 100*b* back to device 100*a* (FIG. 5G).

In some embodiments, ceasing to output the second audio from the second device and outputting the first audio from the first device are collectively referred to as rerouting the audio route with the wearable audio output device from the second device (e.g., back) to the first device (e.g., so that the audio route between the second device and the wearable audio output device is disconnected, and the audio route between the first device and the wearable audio output device is restored). In some embodiments, the wearable audio output device causes (e.g., transmits instructions to cause) the second device to display an alert that the second audio from the second device is (e.g., no longer) being output by the wearable audio output device (e.g., alert 532 in FIG. 5G).

Where control over audio output has been taken over by a second device that meets priority criteria over a first device, and where the change in control is indicated with a displayed alert on the first device, allowing the first device to reclaim control over audio output in response to selection of the displayed alert enables the user to quickly revert the change in control when the default behavior is not appropriate or desired. Providing additional control options while reducing the number of inputs needed to access such control options enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in accordance with the determination that the second audio from the second device satisfies the audio priority criteria with respect to the first audio from the first device, the wearable audio output device causes (616) the second device to display a second alert indicating that the second audio from the second device is being output by the wearable audio output device (e.g., by transmitting to the second device information indicating that the second audio is being output by the wearable audio output device). For example, FIG. 5E shows alert 524 displayed on device 100*b* in accordance with the audio route being transferred to device 100*b*. In another example, FIG. 5N shows alert 560 displayed on device 100*b* in accordance with the audio route being transferred away to device 100*b*.

Where control over audio output has been taken over by a second device that meets priority criteria over a first device, displaying an alert on the second device to indicate the change in control provides the user with visual feedback about the current state of control over audio output. Performing an operation (e.g., automatically) when a set of conditions has been met without requiring further user input, and providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the first input, in accordance with a determination that the second audio from the second device does not satisfy the audio priority criteria with respect to the first audio from the first device (e.g., the second audio is a type of audio that has a lower priority than the type of audio of the first audio), the wearable audio output device (618): forgoes outputting the second audio from the second device (e.g., and, in some embodiments, continues to output the first audio from the first device); and causes the second device to display a third alert indicating that the second audio from the second device is not being output by the wearable audio output device (e.g., by transmitting to the second device information indicating that the second audio is not being output by the wearable audio output device). For example, FIG. 5J shows alert 540 displayed on device 100*b* in accordance with the audio route not being transferred to device 100*b*, denying the request from device 100*b* to headphones 301 to take control over the audio route with headphones 301 (e.g., in response to input 538 at device 100*b* (FIG. 5I), due to the audio from device 100*b* having lower priority than the audio from device 100*a*.

Where control over audio output is not given to a second device, because the second device fails to meet priority criteria over a first device, displaying an alert on the second device to indicate that the requested control has not been granted provides the user with visual feedback about the current state of control over audio output. Performing an operation (e.g., automatically) when a set of conditions has been met without requiring further user input, and providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the wearable audio output device (620): receives (e.g., from the second device) a third input corresponding to an input received at the second device, wherein the input received at the second device corresponds to selection of the third alert (e.g., in response to the second device receiving the input corresponding to selection of the third alert, the second device transmits to the wearable audio output device another request to transfer the audio route to the second device); and, in response to the third input (e.g., the repeated request to transfer the audio route to the second device): ceases to output the first audio from the first device; and outputs the second audio from the second device (e.g., overriding what in some embodiments is the default behavior). In some embodiments, the wearable audio output device causes the first device to display an alert that the first audio from the first device is not being output by the wearable audio output device. For example, after the request from device 100*b* to take control over the audio route with headphones 301 is denied (FIGS. 5I-5J), in response to receiving a subsequent request from device 100*b* to assert control over the audio route with headphones 301 (e.g., in response to input 542 on alert 540 at device 100*b* (FIG. 5K), the audio route with headphones 301 is routed to device 100*b* (FIG. 5L).

Where control over audio output is not given to a second device, because the second device fails to meet priority criteria over a first device, and where the denial of the requested control is indicated with a displayed alert on the second device, allowing the second device to assert control over audio output in response to selection of the displayed alert enables the user to quickly override the default behavior when the default behavior is not appropriate or desired, without requiring the user to navigate through complex settings menu hierarchies. Providing additional control options while reducing the number of inputs needed to access such control options enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the determination that the second audio from the second device does not satisfy the audio priority criteria with respect to the first audio from the first device includes (622) a determination that the second audio from the second device has a respective priority that is the same as a priority of the first audio from the first device. In some embodiments, the respective priority is a highest priority of a plurality of priority levels. In some embodiments, the request to output the second audio from the second device is a request to output an alert of a phone call being received at the second device. In some embodiments, if both the first audio and the second audio have the same (e.g., highest) priority, a visual alert is displayed on the second device without transferring the audio route to the second device, where user selection of the visual alert transfers the audio route to the second device. In some embodiments, if both the first audio and the second audio have the same (e.g., highest) priority, the audio route is transferred to the second device, and optionally a visual alert is displayed on the first device, where user selection of the visual alert transfers the audio route back to the first device. For example, if, while headphones 301 are outputting call audio from device 100*a* for an ongoing call at device 100*a* (e.g., as shown in FIG. 5I), device 100*b* receives (e.g., and answers) an incoming call, device 100*b* displays an alert such as alert 540 (FIG. 5J) to indicate that the audio route has not been transferred to device 100*b*, and which a user can activate to switch the audio route to device 100*b*.

Denying a second device control over audio output where the second device is requesting output of audio that is a same priority level as audio that is from a first device and that is currently being played reduces the amount of disruption in audio playback by requested audio that is not more important, particularly where the audio currently being played is already of the highest importance, and implements default behavior that a user is more likely to prefer, thus reducing the chance that the user will need to interact with the device to change the behavior. Performing an operation (e.g., automatically) when a set of conditions has been met without requiring further user input and/or reducing the number of inputs needed to perform the operation enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the first input is (624) received at the wearable audio output device in accordance with a determination that the first device (e.g., device 100*a* (FIG. 5A)) and the second device (e.g., device 100*b* (FIG. 5A)) are associated with (e.g., paired with or authenticated to) a same respective user account (e.g., and in some embodiments, in accordance with a determination that the wearable audio output device is also associated with (e.g., paired with or authenticated to) the same respective user account). In some embodiments, in accordance with a determination that the first and second devices are not associated with the same respective user account (and in some embodiments, to which the wearable audio output device is also associated), the wearable audio output device, while outputting audio from the first device, does not receive inputs corresponding to requests to output audio from the second device (e.g., where the audio route is between device 100*a* and headphones 301, and where device 100*a* and device 100*b* are not associated with the same respective user account, headphones 301 do not receive any requests from device 100*b* to output audio from device 100*b*, such as the requests corresponding to input 518 (FIG. 5D), input 538 (FIG. 5J), input 542 (FIG. 5K), or incoming calls at device 100*b*).

Requiring that both the first device and the second device be associated with the same user account in order for the devices to request or have control over audio output at the wearable audio output device provides the user with flexibility in receiving audio output from multiple devices while ensuring that control over audio output is available only to devices that the user has previously approved for use with the wearable audio output device. Providing additional control options more securely and without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in accordance with a phone call being received at the second device and a determination that the first device and the second device satisfy call sharing criteria, the wearable audio output device receives (626) from the first device a request to output a first audio alert (e.g., a ringtone) of the phone call. In some embodiments, the first input, corresponding to the request to output the second audio from the second device, is received at the wearable audio output device in accordance with the phone call being received at the second device and a determination that the first device and the second device do not satisfy the call sharing criteria, and the request to output the second audio includes a request to output a second audio alert, different from the first audio alert, of the phone call (e.g., in accordance with the determination that the first device and the second device do not satisfy the call sharing criteria). For example, in FIG. 5N, calls are not shared between device 100*b* and device 100*a*, so the audio that is played to indicate the incoming call at device 100*b* is an audio alert other than a ringtone. By contrast, in FIG. 5T, calls are shared between device 100*b* and device 100*a*, so the audio that is played to indicate the incoming call at device 100*b* is a ringtone.

In some embodiments, the call sharing criteria include a requirement that the first device and the second device are associated with (e.g., authenticated to) a same respective user account and/or connected to a same communications network (e.g., the same wireless network). In some embodiments, the call sharing criteria include (e.g., further include) a requirement that call sharing between multiple devices associated with the same respective user account is enabled (e.g., in device settings for the first device and/or the second device). In some embodiments, the call sharing criteria include (e.g., further include) a requirement that the first device and the second device are within a threshold distance of each other. In some embodiments, the second audio alert is deemphasized relative to the first audio alert (e.g., the second audio alert is an audible tone or beep that is shorter than a ringtone, quieter than a ringtone, less complex than a ringtone, and/or played with less repetition or without repetition, etc.). In some embodiments, the first audio alert or second audio alert is output in accordance with the priority determinations described herein with reference to other operations of method 600.

Where a phone call is received at a second device, playing different audio alerts based on whether the second device and a first device "share" calls (e.g., whether the first device allows other devices such as the second device to make and receive calls associated with the first device, or vice versa) and, optionally, displaying different visual alerts on one or both devices provides the user with feedback indicating which device to use to answer the call. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the first input, corresponding to the request to output the second audio from the second device, is (628) received at the wearable audio output device in accordance with a phone call being received at the second device. In some embodiments, in accordance with the determination that the second audio from the second device satisfies audio priority criteria with respect to the first audio from the first device, the wearable audio output device causes the second device to display an alert that the wearable audio output device is configured to output audio from the second device (e.g., and optionally an indication that the wearable audio output device is currently outputting the second audio (e.g., a ringtone for the phone call)). In some embodiments, the alert is displayed without regard to whether an input corresponding to a request to connect the phone call has been received at the second device (e.g., before an input corresponding to a request to connect the phone call is received at the second device). For example, in FIG. 5N, alert 560 is displayed on device 100*b* to indicate that device 100*b* controls the audio route with headphones 301, before the incoming call to device 100*b* is answered (e.g., before input 564 corresponding to accept call button 556 on device 100*b* is received).

Where control over audio output is granted to a second device that meets priority criteria over a first device, due to the second device requesting to output audio for a received phone call, displaying an alert on the second device to indicate the change in control even before the phone call is connected (e.g., during output of a ringtone for the call) provides the user with immediate feedback about the current state of control over audio output through both visual feedback on the second device and audio feedback via the wearable audio output device. Performing an operation (e.g., automatically) when a set of conditions has been met without requiring further user input, and providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 850 and 1000) are also applicable in an analogous manner to method 600 described above with respect to FIGS. 6A-6C. For example, the devices, device connections, audio routes, user interfaces, alerts, and audio outputs described above with reference to method 600 optionally have one or more of the characteristics of the devices, device connections, audio routes, user interfaces, alerts, and audio outputs described herein with reference to other methods described herein (e.g., methods 800, 850 and 1000). For brevity, these details are not repeated here.

Figure 7A:
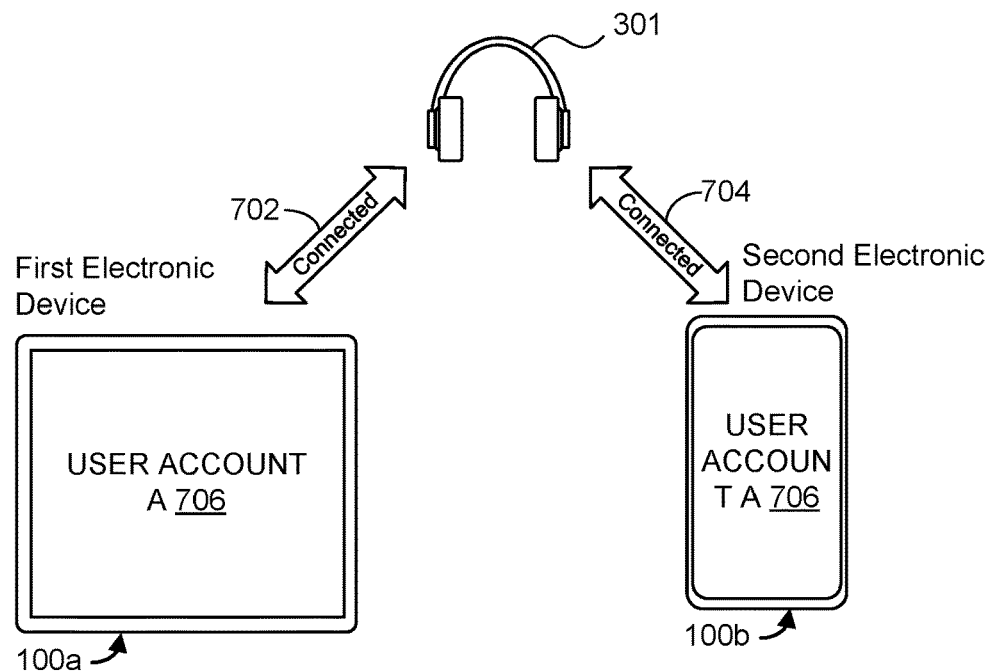
FIGS. 7A-7J-4 illustrate example user interfaces for controlling connections between an audio output device and two electronic devices, and controlling audio routing from the electronic devices to the audio output device in accordance with some embodiments.

FIG. 7A shows a wearable audio output device 301, an example of which is described above with reference to FIG. 3B. In the example shown in FIG. 7A, wearable audio output device 301 is a set of headphones (sometimes herein called "headphones 301"). Alternatively, wearable audio output device 301 may be a set (e.g., a pair) of earbuds or earphones. In FIG. 7A, headphones 301 are in communication with (e.g., wirelessly connected with) electronic device 100*a* (also referred to as the first electronic device or first device), as represented by arrow 702, and also in communication with (e.g., wirelessly connected with) electronic device 100*b* (also referred to as the second electronic device or second device), as represented by arrow 704. In particular, FIG. 7A shows that first electronic device 100a and second electronic device 100b are associated with the same (e.g., identical) user account 706. In some embodiments, the user account is an iCloud® user account owned by Apple Inc. of California. In some embodiments, the audio output device 301 is also associated with the same user account 706.

Figures 1, 7B:
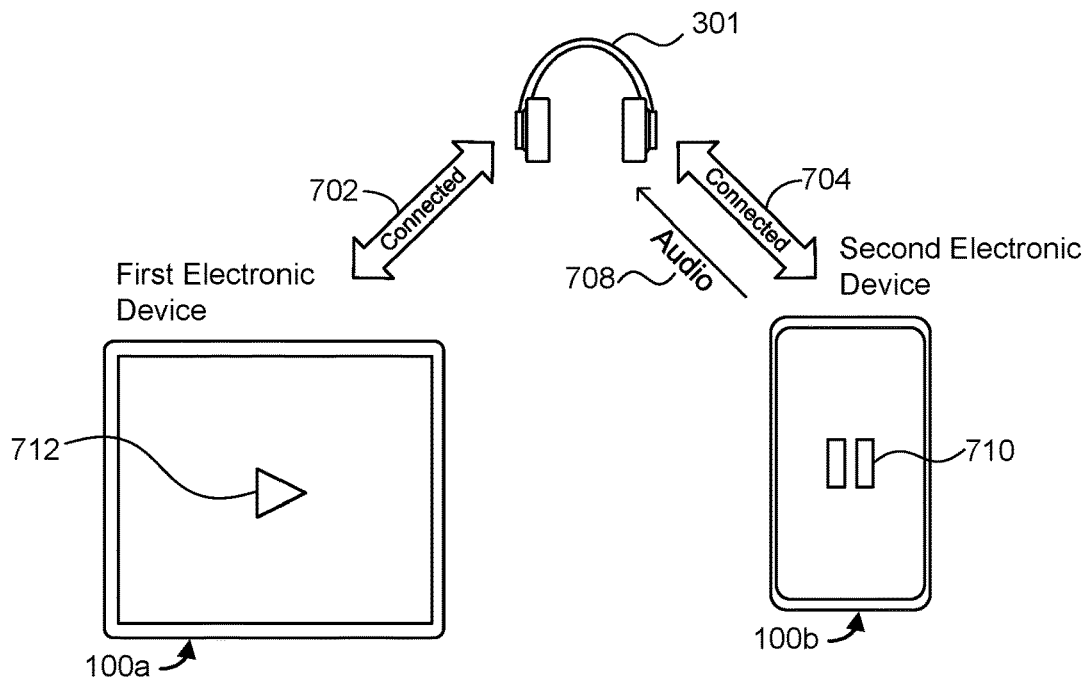
Figures 2, 7B:
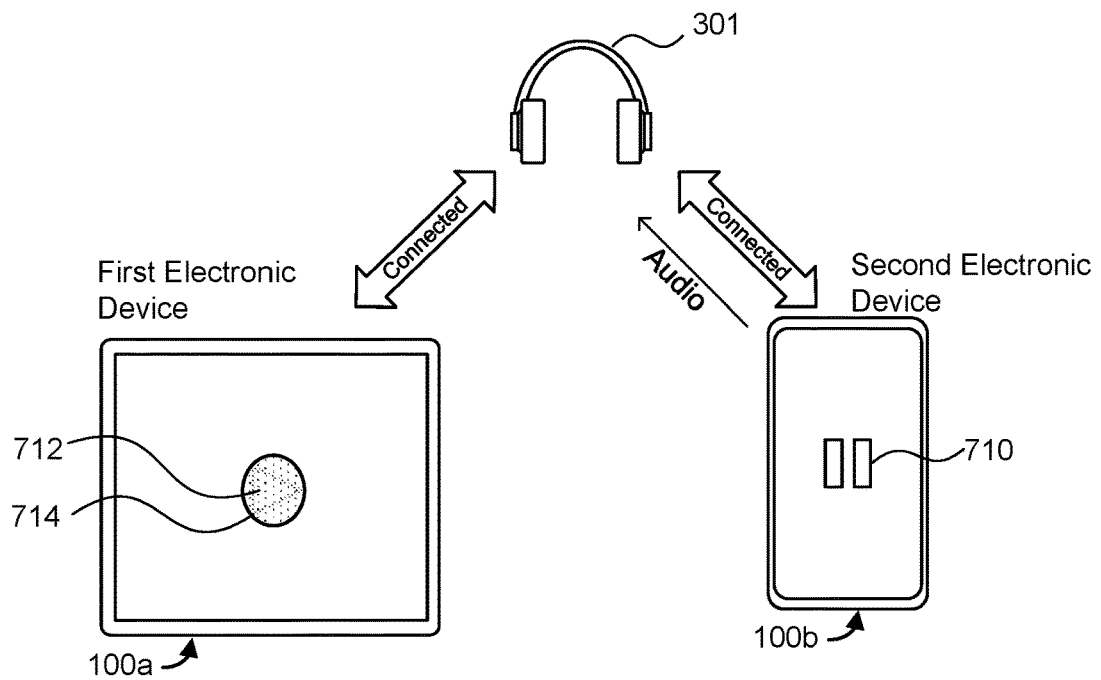
Figures 3, 7B:
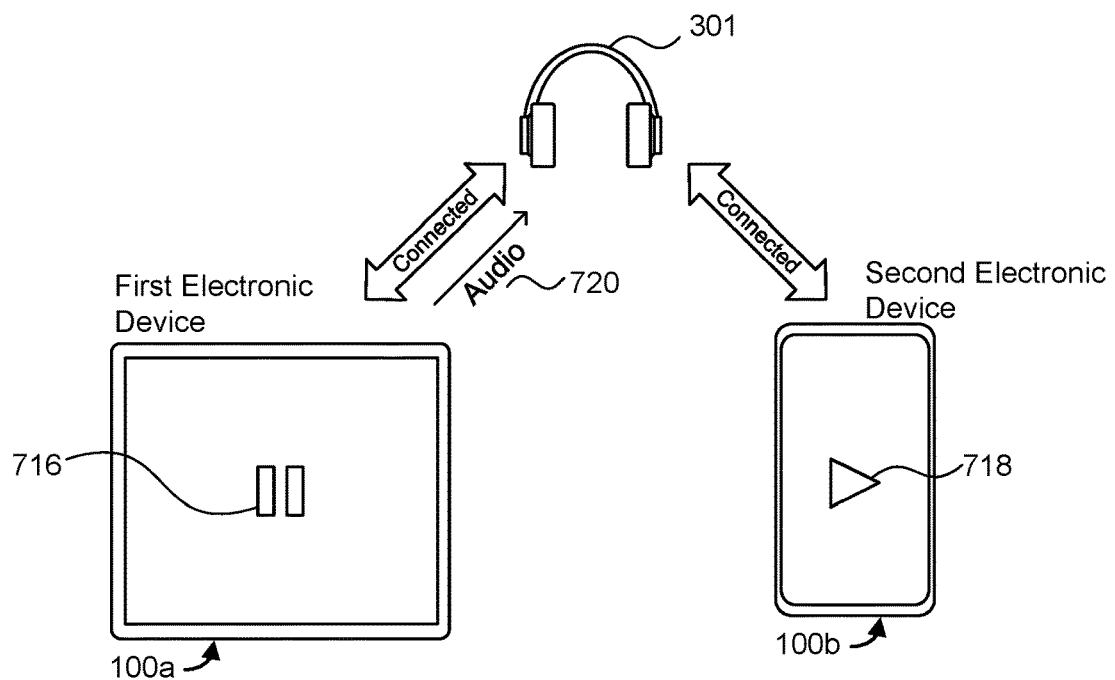

FIG. 7B-1 shows second electronic device 100b, sometimes herein called second device 100b for ease of reference, playing music via headphones 301, as represented by arrow 708 and indicated by pause button 710 displayed on device 100b. First electronic device 100a, sometimes herein called first device 100a for ease of reference, is not outputting audio, as indicated by play button 712 displayed on device 100a, and although device 100a is connected to headphones 301 as represented by arrow 702, an audio route is not established between second device 100b and headphones 301. Pause button 710 (and corresponding play button 718, FIG. 7B-3) optionally represents a simplification of audio player user interface displayed on device 100b, and play button 712 (and corresponding pause button 716, FIG. 7B-3) optionally represents a simplification of audio player user interface displayed on device 100a.

Whether audio is routed between headphones 301 and a respective device (sometimes described as the device "having" or "controlling" the audio route) determines whether audio from the respective device is output via headphones 301. While a respective device "has" the audio route, audio from the respective device is output via headphones 301. While a respective device "does not have" the audio route, audio from the respective device is not output via headphones 301. In some embodiments, a respective audio output device establishes an audio route with only one connected external electronic device at a time. It is noted that an audio route between an audio output device and an electronic device is different from, and in addition to, a wireless connection between the audio output device and the electronic device. For example, second device 100b is connected to headphones 301, as represented by arrow 704, and also has control over the audio route to headphones 301, as represented by arrow 708. First device 100a is connected to headphones 301 (e.g., concurrently with second device 100b), as represented by arrow 702, but first device 100a does not have control over the audio route to headphones 301 (e.g., as indicated by the lack of any arrow, other than arrow 702, between first device 100a and headphones 301).

FIG. 7B-2 illustrates a transition from FIG. 7B-1. In particular, FIG. 7B-2 shows input 714 (e.g., a user request) corresponding to play button 712 on device 100a (e.g., a touch input, such as a tap, on a touchscreen of first device 100a at the location of displayed pause button 712 or on a touch-sensitive surface of first device 100a at a position corresponding to the position of play button 712). To avoid needless repetition, it is noted that each input shown in FIGS. 7B-2 to 7J-3 may be a touch input by a user's finger or stylus, on a touchscreen of a respective device (e.g., first device 100a or second device 100b) at the location of displayed user interface element (e.g., a displayed play or pause button or other object) or on a touch-sensitive surface of the respective device at a position corresponding to the position of the user interface element. In some embodiments, a respective input is a single tap input or short press input (e.g., less than a predefined duration), a long press (e.g., longer than the predefined duration), a double tap or double press input, or even a triple tap or triple press input.

FIG. 7B-3 illustrates that, in response to detecting input 714 (e.g., a user request) corresponding to play button 712 on first device 100a, second electronic device 100b ceases playing audio (e.g., it no longer has control of the audio route), and first device 100a begins playing audio (e.g., it has control of the audio route). To illustrate this, first device 100a now shows a pause button 716 and second device 100b now shows a play button 718. In addition, the arrow 720 illustrates the transmission of audio data from the first device 100a to the headphones 301 for audio playback.

Figures 1, 7C:
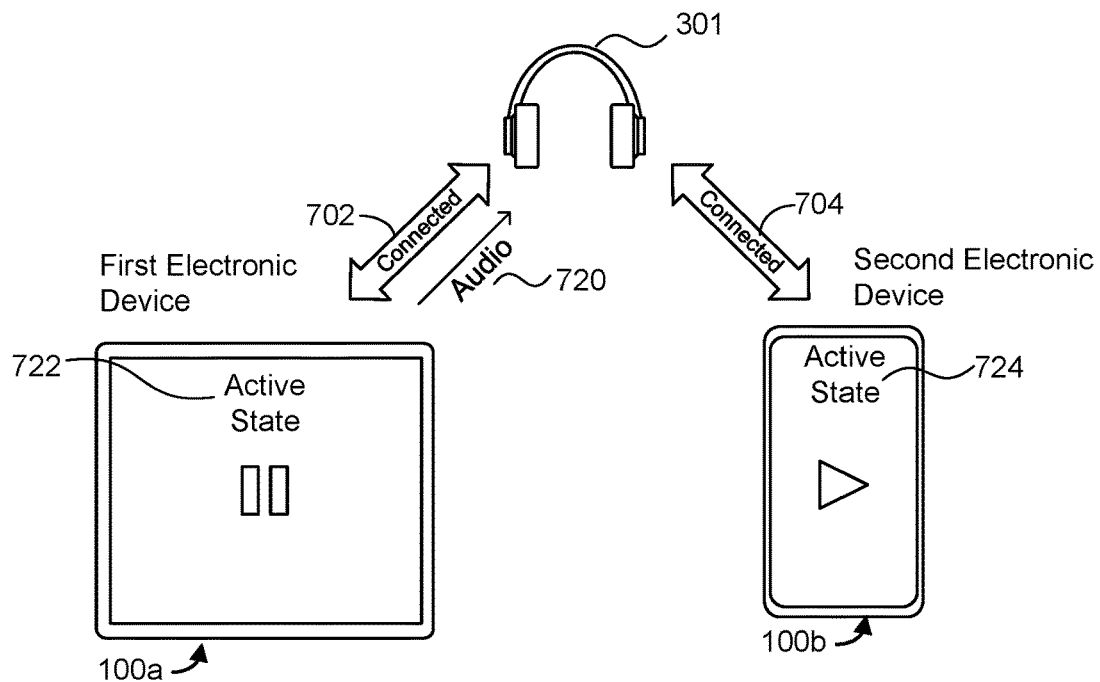
Figures 2, 7C:
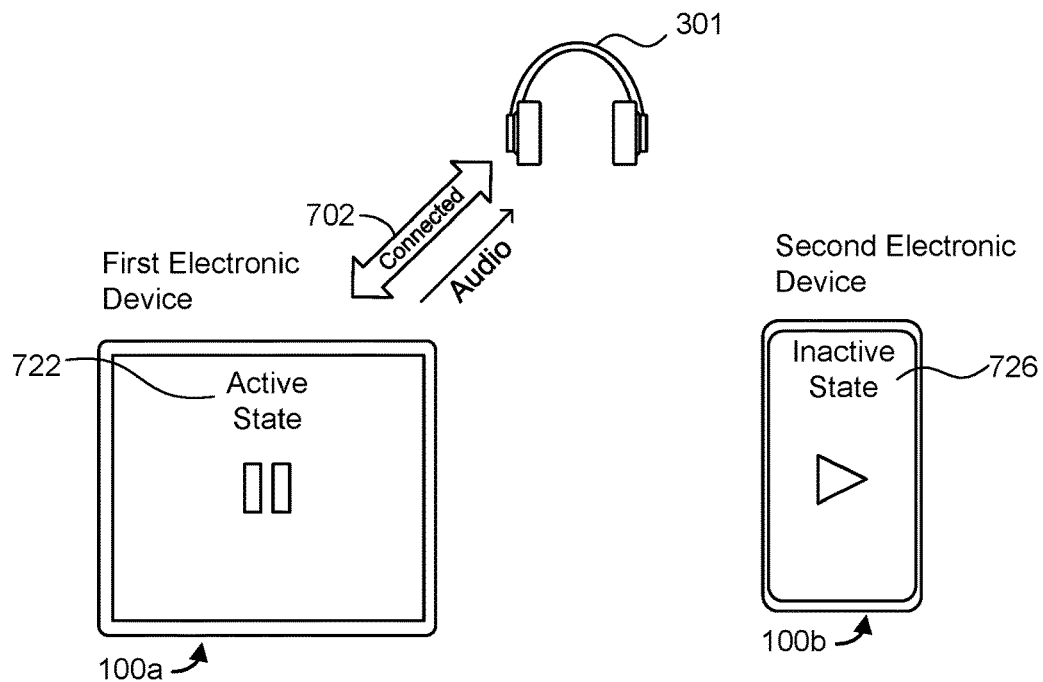
Figures 3, 7C:
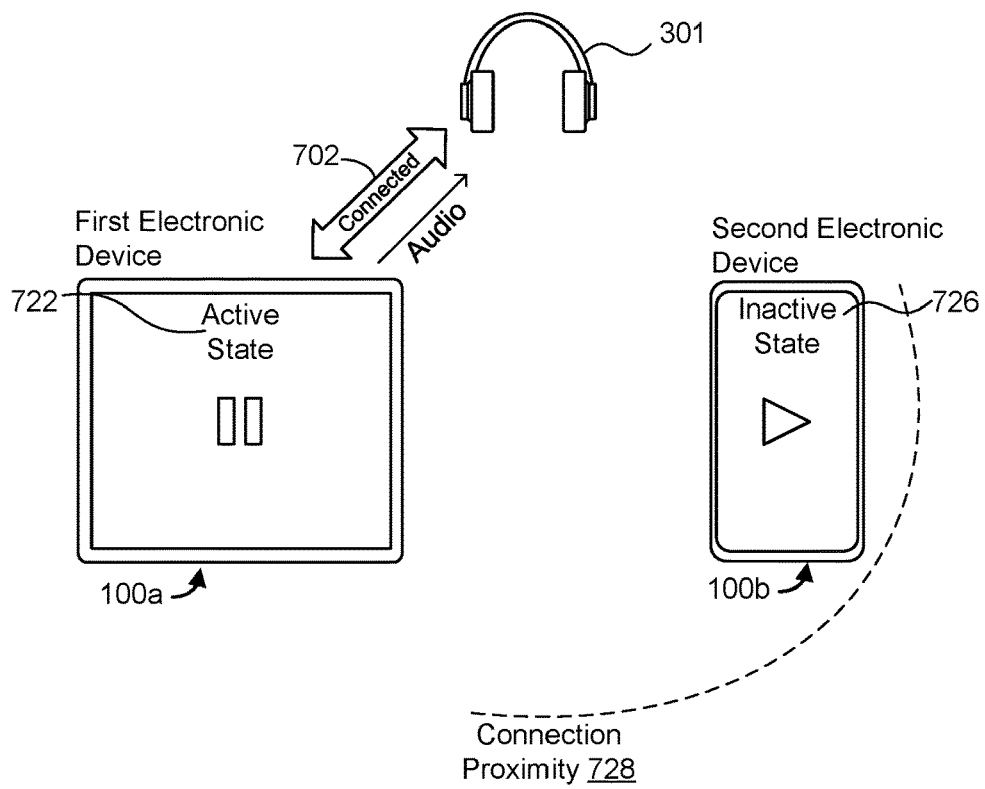
Figures 4, 7C:
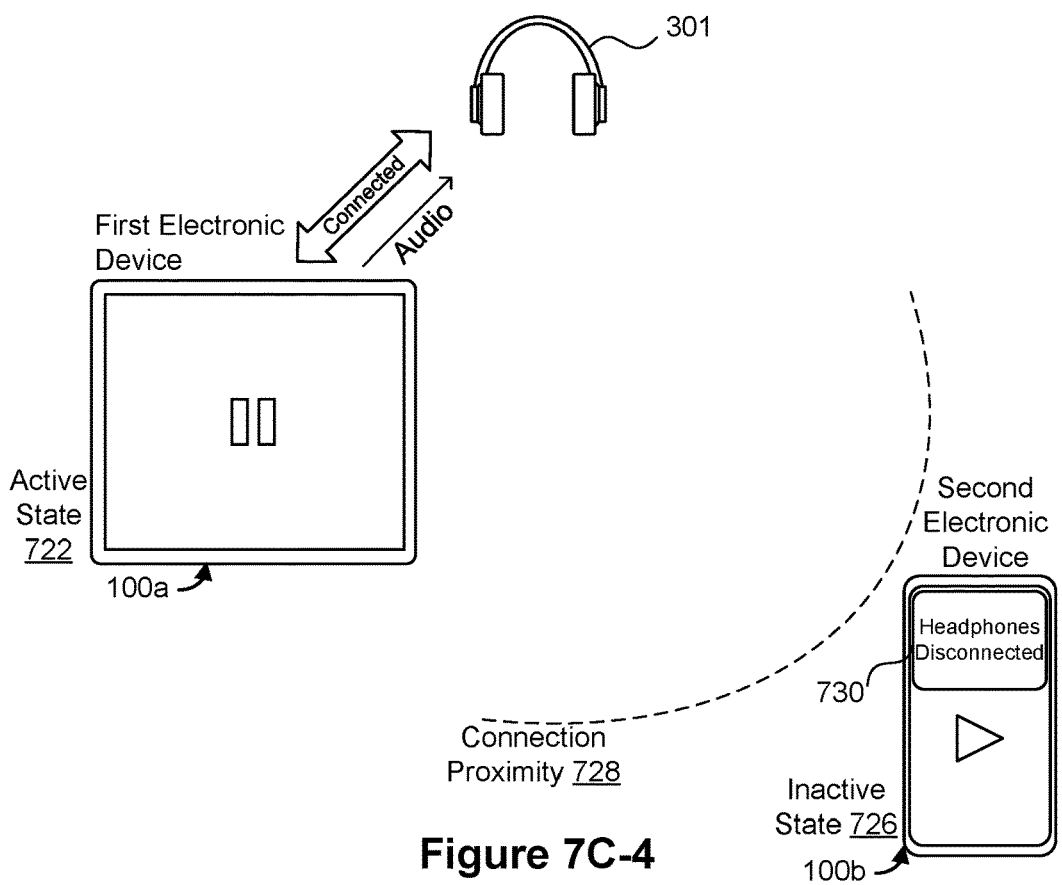

FIGS. 7C-1 to 7C-4 illustrate that when certain criteria are met, a disconnection alert is displayed on an electronic device. FIG. 7C-1 shows that both the first device 100a and the second device 100b are in an active state (indicated by "active state" 722 and 724 in FIG. 7C-1), where an active state means the device is being interacted with (e.g., the device is receiving inputs, the screen is active, the device is receiving a call (e.g., a telephone call), participating in a call, or the device is outputting audio). Since a wide variety of parameters can indicate whether a device is in an active state or not, FIG. 7C-1 has a simplified view that shows the respective device's state. FIG. 7C-1 also shows that both devices are connected to the audio output device 301, which is shown by arrows 702 and 704. FIG. 7C-1 also shows that first device 100a is transmitting audio data to the audio output device 301, as indicated by arrow 720.

FIG. 7C-2 shows that in response to the second device 100b entering an inactive state 726 from an active state 724 in FIG. 7C-1, the second device 100b disconnects from the audio output device. Despite the device 100b being in an inactive state and being disconnected from the audio output device 301, no alert is presented to the user to indicate the disconnection.

FIG. 7C-3 shows connection proximity 728, which visually illustrates at least one proximity criterion. The proximity criterion can be based on, or evaluated based on: GPS data, direct connection strength, and/or being on the same Wi-Fi network, etc. For example, in some embodiments, a device can be considered within connection proximity (e.g., satisfying proximity criteria) when a wireless connection (e.g., a Bluetooth connection) meets a certain threshold strength (e.g., strong enough to transmit/receive audio data). As shown in FIG. 7C-3, second device 100b currently satisfies the connection proximity 728 (e.g., the electronic device is not out of range of the headphones 301)

FIG. 7C-4 illustrates the response to second device 100b being in an inactive state and failing to satisfy connection proximity 728 (e.g., the electronic device is, or has been moved, out of range of the headphones 301). Specifically, FIG. 7C-4 shows that in response to (i) second device 100b falling outside the connection proximity 728 and (ii) that the second device 100b is in an inactive state 726, presenting an alert 730 (e.g., "Headphones Disconnected") indicating that the audio output device 301 is disconnected from the second device 100b. In some embodiments, the alert is presented on both the first device 100a and the second device 100b, on the audio output device 301 (via an audio alert), or on both the audio output device 301 and the second device 100b.

Figures 1, 7D:
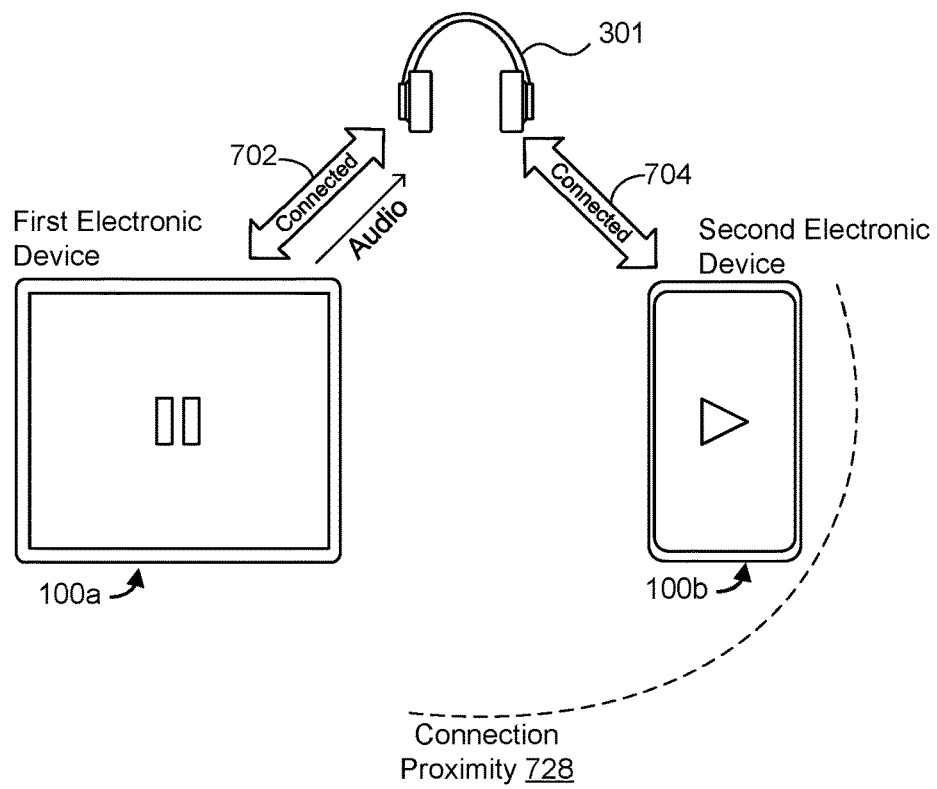
Figures 2, 7D:
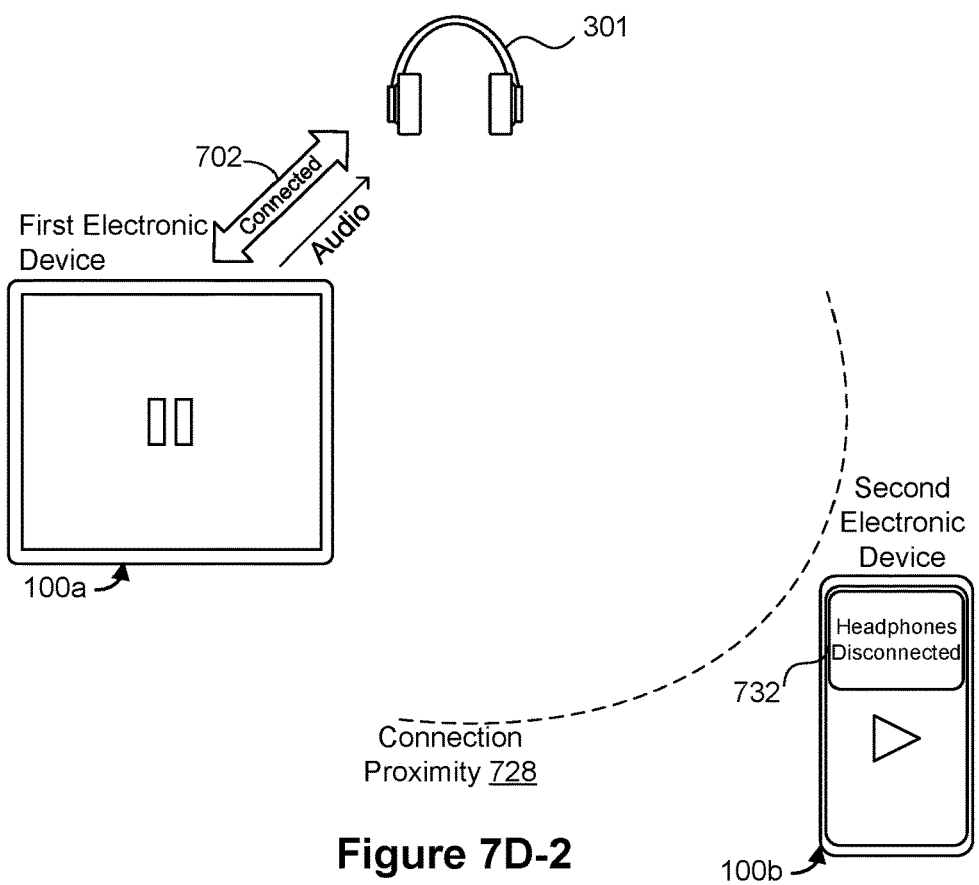

FIGS. 7D-1 to 7D-2 shows another embodiment where an alert is presented once the second device 100b no longer satisfies proximity criteria (e.g., the device is out of range of audio output device 301). FIG. 7D-1 shows connection proximity 728, which visually illustrates at least one proximity criterion, as described above. For example, in some embodiments second device 100b can be considered within connection proximity (e.g., satisfying proximity criteria) when a wireless connection (e.g., Bluetooth) meets a certain threshold strength (e.g., strong enough to transmit/receive audio data). As shown in FIG. 7D-1, second device 100b currently satisfies the connection proximity 728 (e.g., the electronic device is not out of range of the headphones 301, or equivalently, the electronic device is within range of the headphones 301). In addition, it is noted that FIG. 7D-1 does not indicate whether the second device 100b is in an active state or inactive state. In some embodiments, while the second device 100b satisfies the proximity criteria with respect to the headphones 301, the connection 704 between second device 100b and headphones 301 is maintained regardless of whether the second device 100b is in the active state or inactive state.

FIG. 7D-2 illustrates the response to second device 100b failing to satisfy connection proximity 728 (e.g., the electronic device is, or has been moved, out of range of the headphones 301). Specifically, FIG. 7D-2 shows that in response to second device 100b falling outside the range of the connection proximity 728, an alert 732 indicating that the audio output device 301 is disconnected from the second electronic device 100b is presented. In some embodiments, the alert is presented on both the first device 100a and the second device 100b, on just the second device 100b, on the audio output device 301 (e.g., via an audio alert), or on the second device 100b and on the audio output device 301.

Figures 1, 7E:
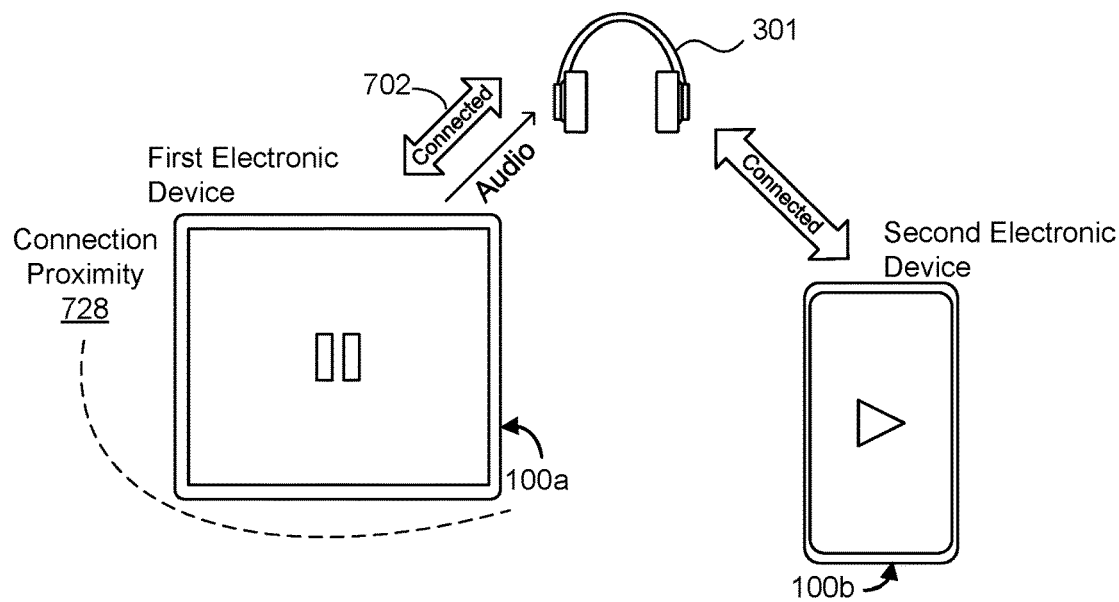
Figures 2, 7E:
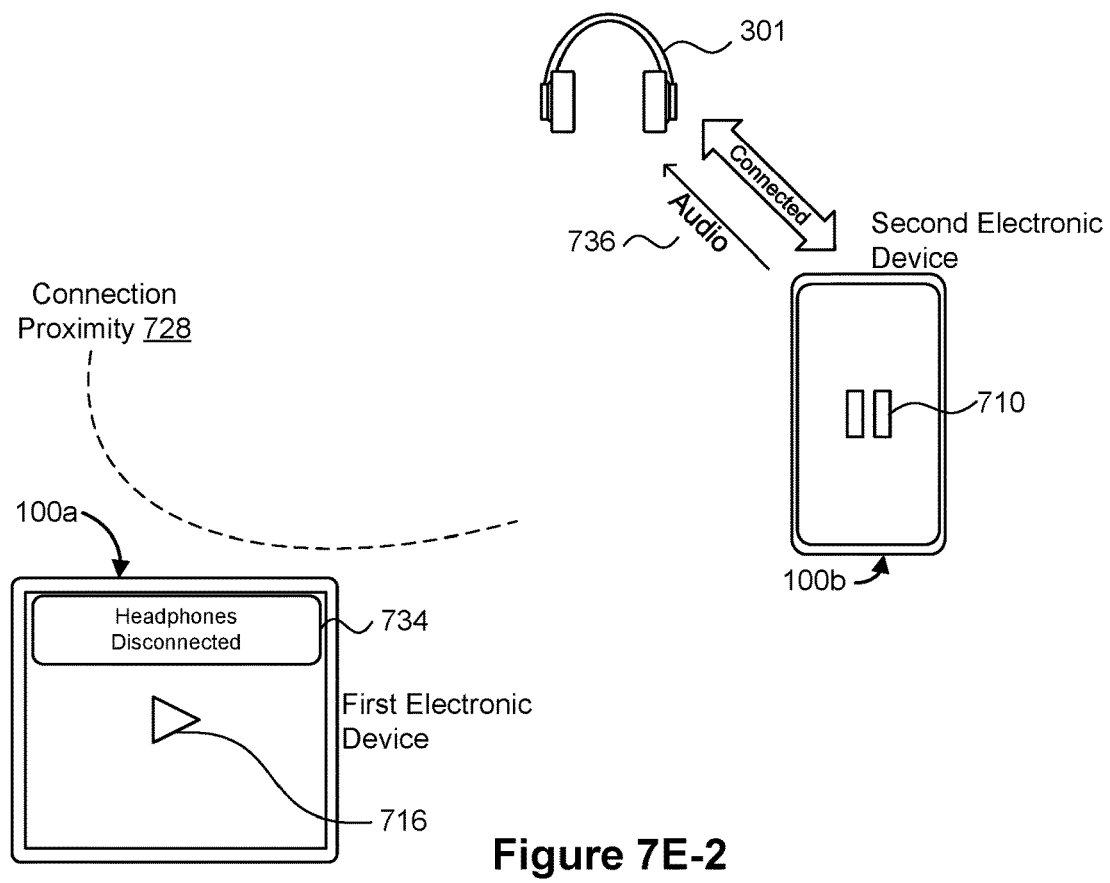

FIG. 7E-1 shows another embodiment where an alert is presented once the first device 100a no longer satisfies proximity criteria (e.g., the device is out of range of audio output device 301).

FIG. 7E-1 shows connection proximity 728, which visually illustrates at least one proximity criterion. Examples of the proximity criterion are described above. As shown in FIG. 7E-1 first device 100a currently satisfies the connection proximity 728 (e.g., the electronic device is not out of range of the headphones 301).

FIG. 7E-2 illustrates the response to first device 100a failing to satisfy connection proximity 728 (e.g., the electronic device is, or has been moved, out of range of the headphones 301). Specifically, FIG. 7E-2 shows that in response to first electronic device 100a falling outside the range of the connection proximity 728, an alert 734 indicating that the audio output device 301 is disconnected from the first electronic device 100a is presented. In some embodiments, the alert is presented on both the first electronic device 100a and the second electronic device 100b, on just the second electronic device 100b, on the audio output device 301 (via an audio alert), or on the second electronic device 100b and the audio output device 301. Optionally, FIG. 7E-2 also shows that in response first device 100a to first electronic device 100a falling outside the range of the connection proximity 728, the first electronic device 100a ceases playing audio, and the audio route 736 switches to the second electronic device 100b. To illustrate this, the second electronic device now shows pause button 710 indicating that it is outputting audio data to the headphones 301 for playback. First device 100a also shows a play button 712, which indicates that the first device 100a is not outputting audio data to the headphones 301. It is noted that FIGS. 7E-1 and 7E-2 do not indicate whether the first device 100a is in an active state or inactive state. In some embodiments, while the first device 100a satisfies the proximity criteria with respect to the audio output device 301, e.g., as shown in FIG. 7E-1, the connection 702 between first device 100a and audio output device 301 is maintained regardless of whether the first device 100a is in the active state or inactive state.

Figures 1, 7F:
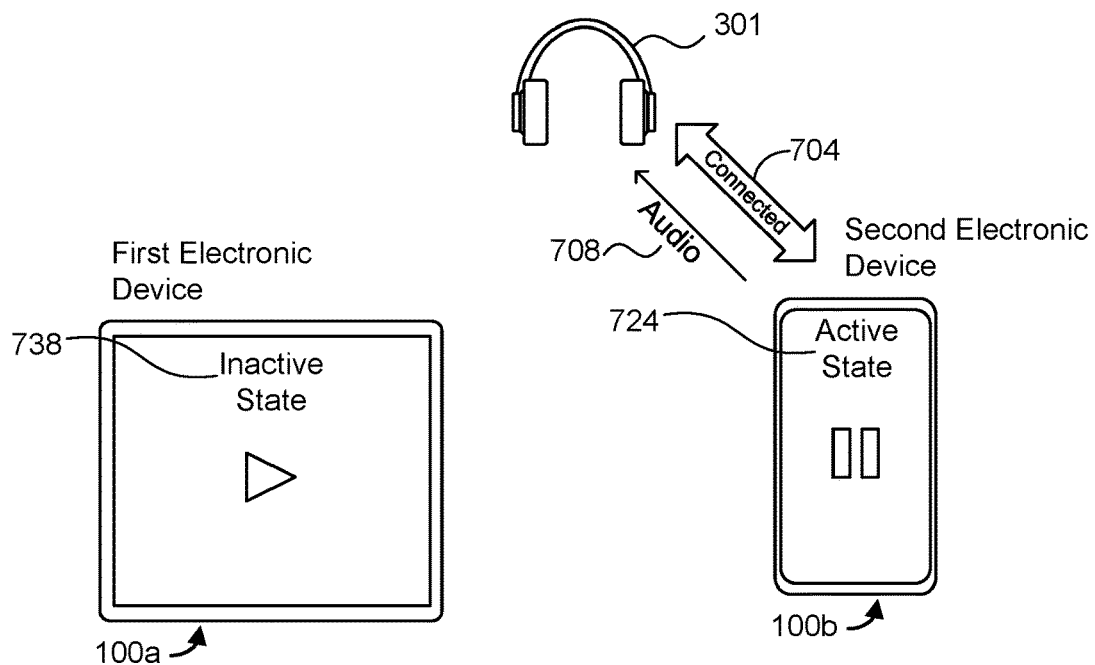
Figures 2, 7F:
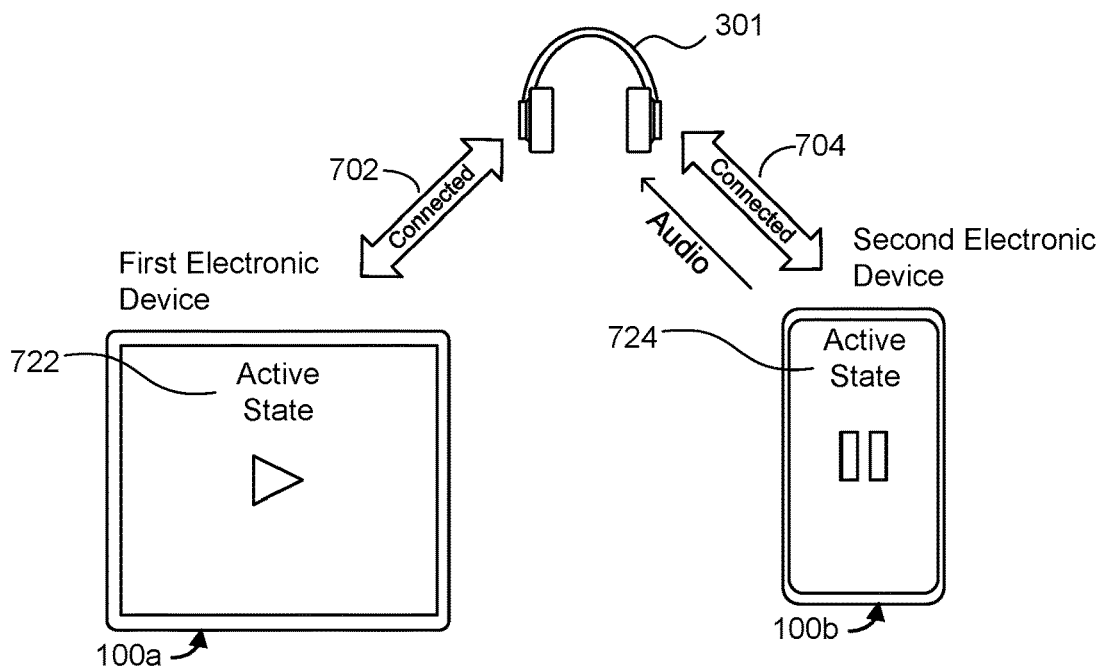

FIGS. 7F-1 to 7F-2 shows another embodiment where the first electronic device 100a automatically connects to the headphones 301 when it transitions from an inactive state to an active state. Specifically, FIG. 7F-1 shows the first electronic device 100a in an inactive state 738, and the second electronic device 100b in an active state 724. While first electronic device 100a is in (or remains in) an inactive state 738, it is not connected to the headphones 301. Second electronic device 100b, however, is connected to the headphones (indicated by arrow 704) and is routing audio to the headphones 301 (indicated by arrow 708).

FIG. 7F-2 shows that in response to the first electronic device 100a transitioning from an inactive state 738 to an active state 722, the first electronic device 100a establishes a connection with the headphones 301, which is indicated by arrow 702. After the connection with the first electronic device 100a is established, the headphones 301 are then concurrently connected to both the first electronic device 100a and the second electronic device 100b. In some embodiments, the audio route switches once the connection is established.

Figures 1, 7G:
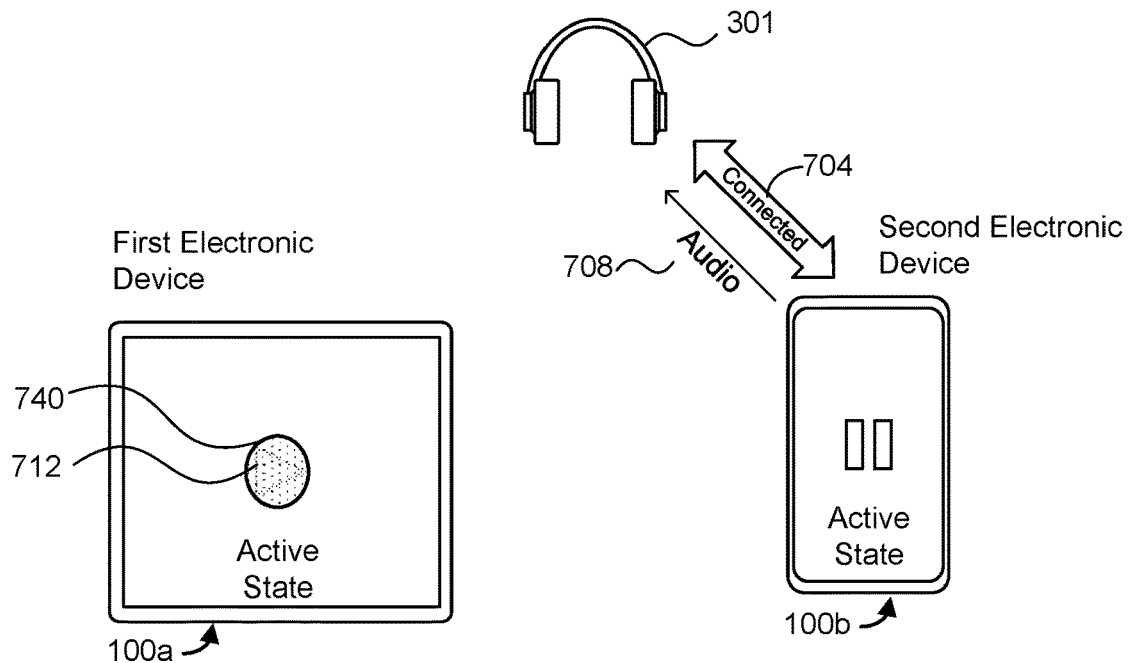
Figures 2, 7G:
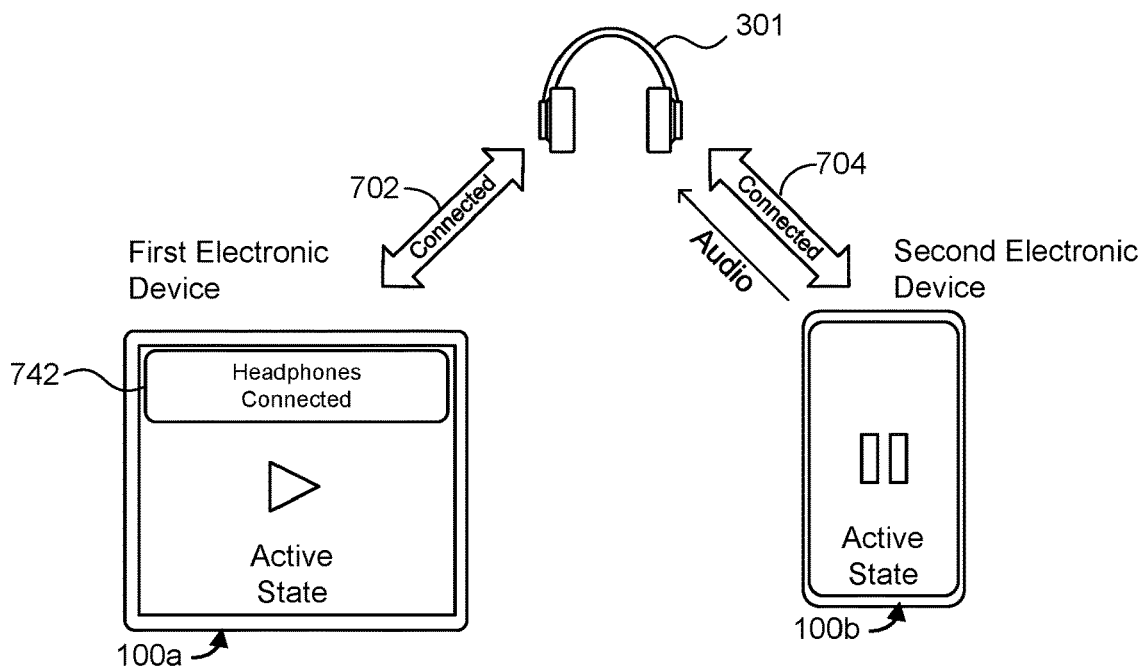
Figures 3, 7G:
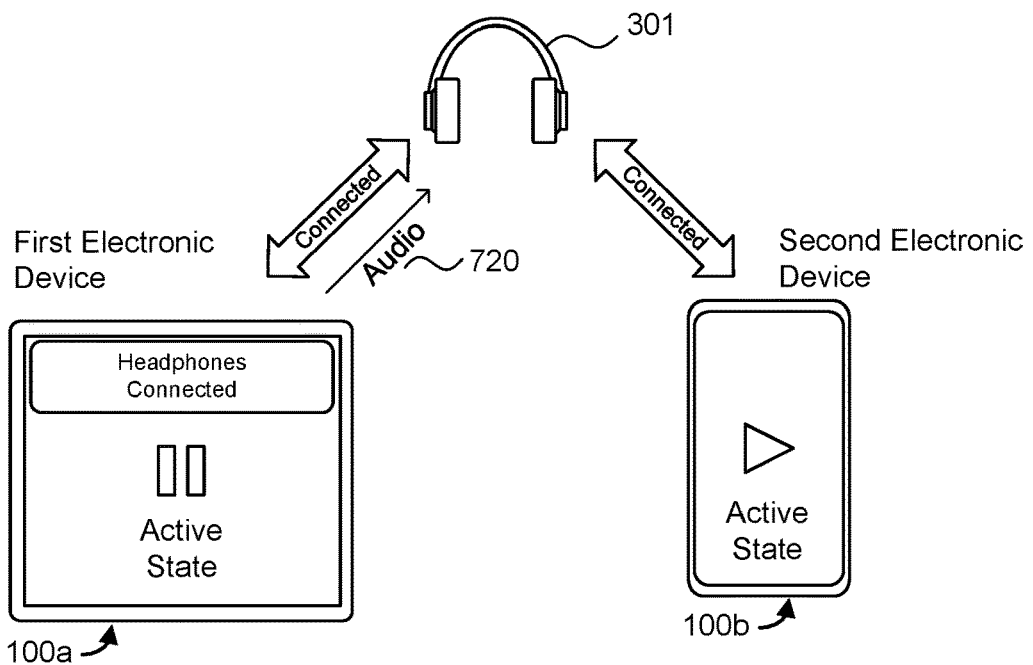

FIG. 7G-1 to 7G-3 shows the first electronic device 100a connecting to and routing audio to headphones 301 in response to receiving (e.g., detecting) a user input (e.g., an input on the display) on the first electronic device 100a to play audio. In particular, FIG. 7G-1 shows the first electronic device 100a not connected to the headphones 301, but shows the second electronic device 100b connected to the headphones 301 (indicated by arrow 704). Second electronic device 100b is also routing audio data to the headphones 301, which is indicated by arrow 708. FIG. 7G-1 also shows an input 740 being received at play button 712. In some embodiments, the request to play the audio can be received at the headphones 301, or other input device controlling the first electronic device 100a (e.g., mouse, keyboard, or wearable device input controls).

FIG. 7G-2 shows that, optionally, in response to input 740 being received at play button 712 (e.g., detecting the user request), but before playing the requested audio (e.g., by transmitting audio data to headphones 301) device 100a conveys an alert 742 to the user indicating that the headphones 301 are connected to the first electronic device 100a. In some embodiments, the alert is presented when the first electronic device is in an active state. In some embodiments, the alert is presented when the first electronic device is in an active state, and the first electronic device was previously inactive for at least a predetermined amount of time (e.g., 1, 2, 5, 8, 15 or 30 minutes, or an amount of time between 1 and 30 minutes, inclusive). In some embodiments, the alert can be presented on the first electronic device 100a (e.g., displayed on a display of the first electronic device 100a), on the audio output device 301 (e.g., via audio alert), on both the first electronic device 100a and the second electronic device 100b (e.g., in some implementations, the alert presented on the second electronic device 100b (e.g., "headphones connected to your iPhone") may differ from the alert presented on the first electronic device 100a (e.g., "headphones connected"), or on both the first electronic device 100a and the audio output device 301 (via an audio alert).

FIG. 7G-3 shows that in response to input 740 being received at play button 712 (e.g., detecting the user request), the first electronic device 100a plays the requested audio, which is indicated by arrow 720 (e.g., the audio route switches from the second electronic device 100b to the first electronic device 100a). In some embodiments, there is a pause between when the audio from the second electronic device 100b stops playing and when the audio from the first electronic device 100a starts playing, and optionally, the aforementioned alert 742 is present during that pause. In some implementations, the pause has a predefined non-zero duration; or the pause has having a non-zero duration of less than a predefined duration, such as 2.5 seconds; or the pause has a duration of 0.3 seconds to 2.0 seconds.

Figures 1, 7H:
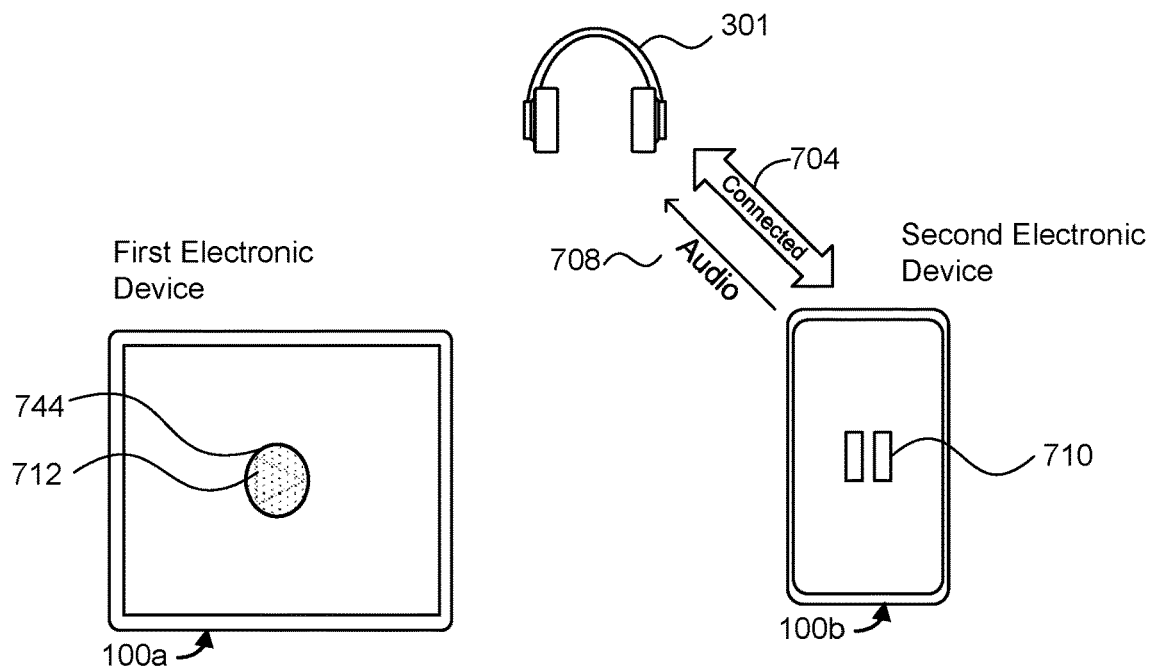
Figures 2, 7H:
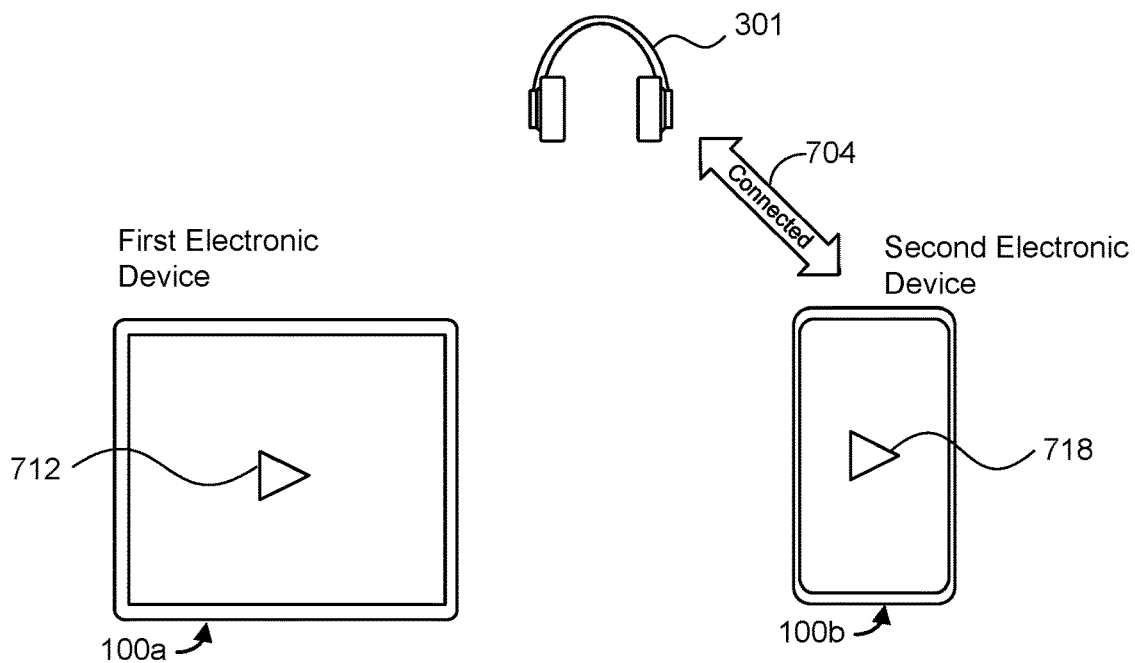
Figures 3, 7H:
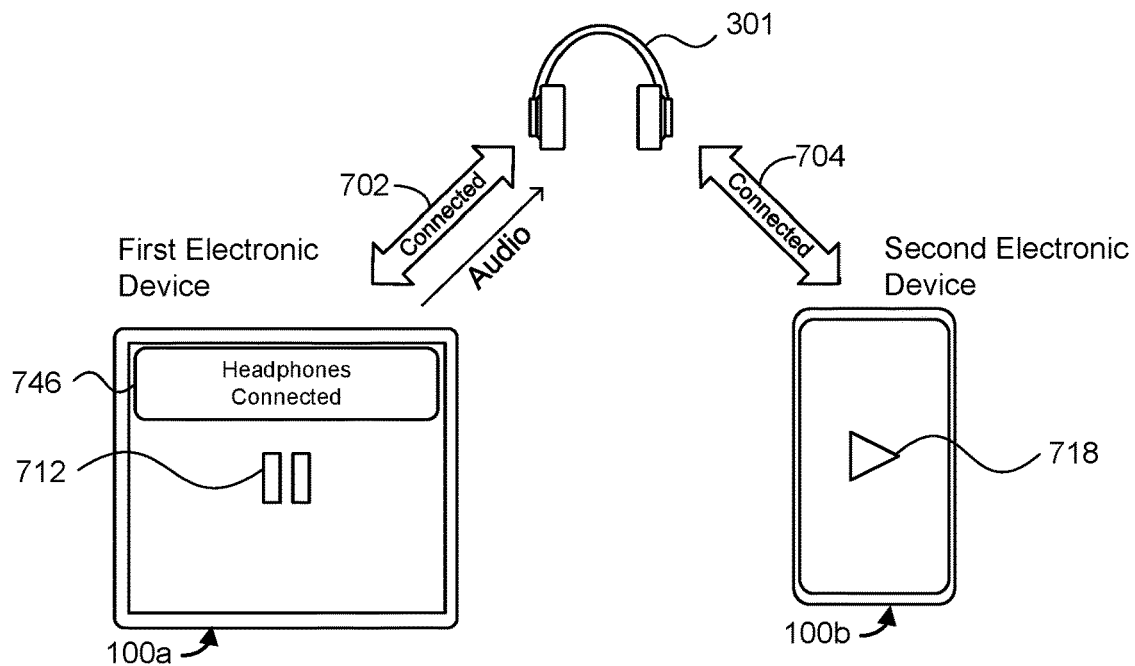

FIGS. 7H-1-7H-3 shows another embodiment where the audio is muted (e.g., audio playback is paused on both devices) until a connection between a respective electronic device 100 and the audio output device 301 is established. Specifically, FIG. 7H-1 shows that headphones 301 are connected (indicated by arrow 704) to the second electronic device 100b, and the second electronic device 100b is transmitting audio to the headphones 301 for playback (indicated by arrow 708). To further illustrate that the audio is playing on the second electronic device 100b, second electronic device 100b shows a pause button 710, which indicates that audio is playing. FIG. 7H-1 also shows an input 744 over play button 712 on the first electronic device 100a, and that there is currently no connection has been established between the first electronic device 100a and the headphones 301.

FIG. 7H-2 shows that immediately after the first electronic device 100a received input 744, it still does not an established connection (e.g., an established audio output path) to the audio output device 301. Since no connection is established between the first electronic device 100a and the headphones 301, the audio is muted on the headphones 301 until the connection can be established between the first electronic device 100a and the headphones 301 (e.g., the transmission audio data (e.g., audio data routing) is paused on both the first electronic device 100a, and the second electronic device 100b). To illustrate this, first electronic device 100a shows a play button 712 indicating the audio is paused, and second electronic device 100b shows a play button 718 also indicating that the audio is paused. In some embodiments, to accomplish the muting, the headphones 301 begin the muting upon receiving a request from the first electronic device 100a to establish a connection, because the connection has been established. In some embodiments, the second electronic device 100b, being on the same user account as the first electronic device 100a, receives a message or alert from the first electronic device 100a, and implements the muting in response to that message or alert. In some embodiments, the audio from the second electronic device is gradually muted (e.g., the volume gradually decreases until it mutes the audio from the second electronic device) by either the headphones 301 or the second electronic device.

FIG. 7H-3 shows that once the first electronic device 100a has an established audio connection (e.g., an established audio output path) with headphones 301, audio data is transmitted to the headphones 301 by the first electronic device 100a (e.g., audio data from the first electronic device 100a causes playback of corresponding audio on the headphones 301). To illustrate this, first electronic device 100a shows a pause button 716 indicating audio is playing on that device, and second electronic device 100b shows a play button 718 indicating that audio is paused on that device. In some embodiments, the audio from the second electronic device 100b can be muted or crossfaded with audio from the first electronic device 100a while the audio from the first electronic device begins to play (e.g., the audio is briefly blended together to provide a transition between audio from the different devices). In some embodiments, an alert 746 is presented (e.g., displayed on the first electronic device) to indicate that the headphones 301 are connected to the first electronic device.

Figures 1, 7I:
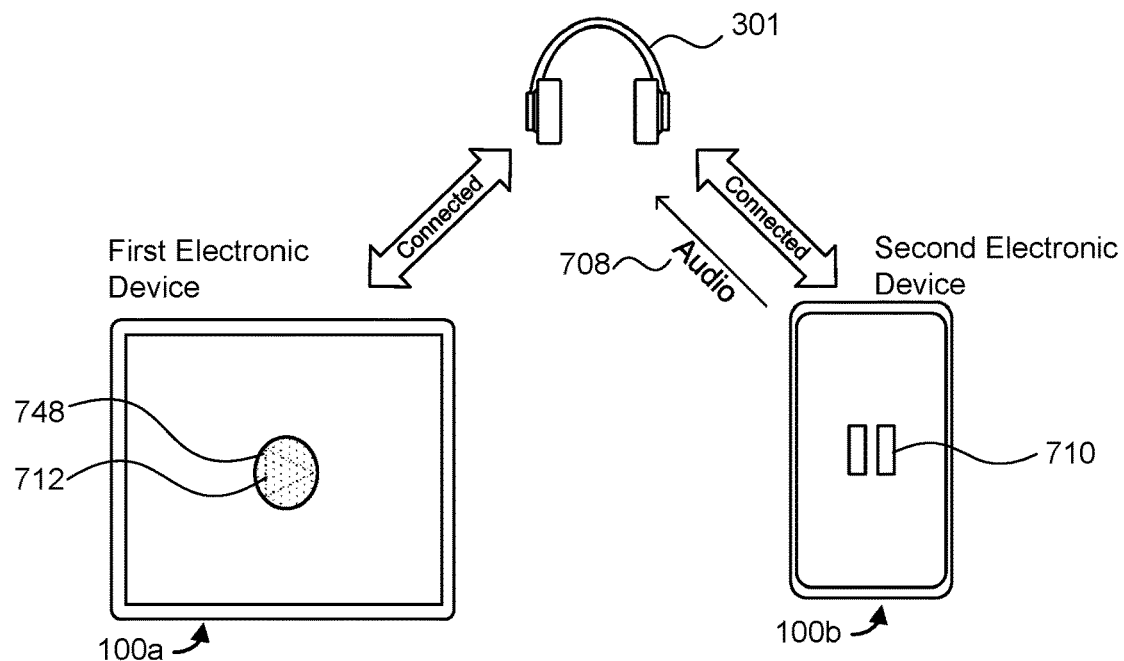
Figures 2, 7I:
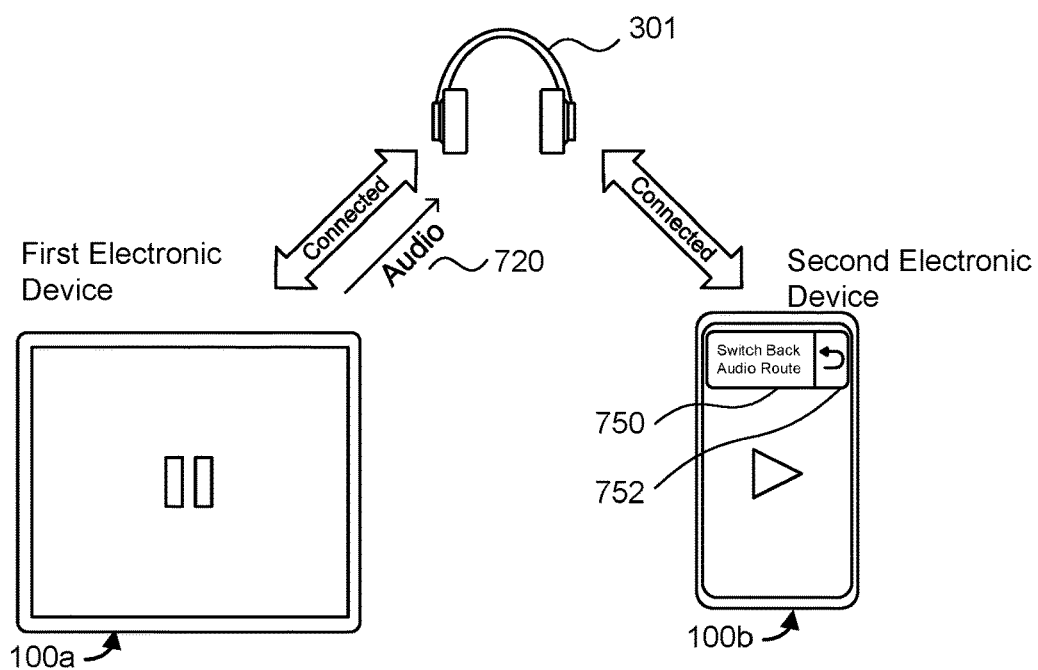
Figures 3, 7I:
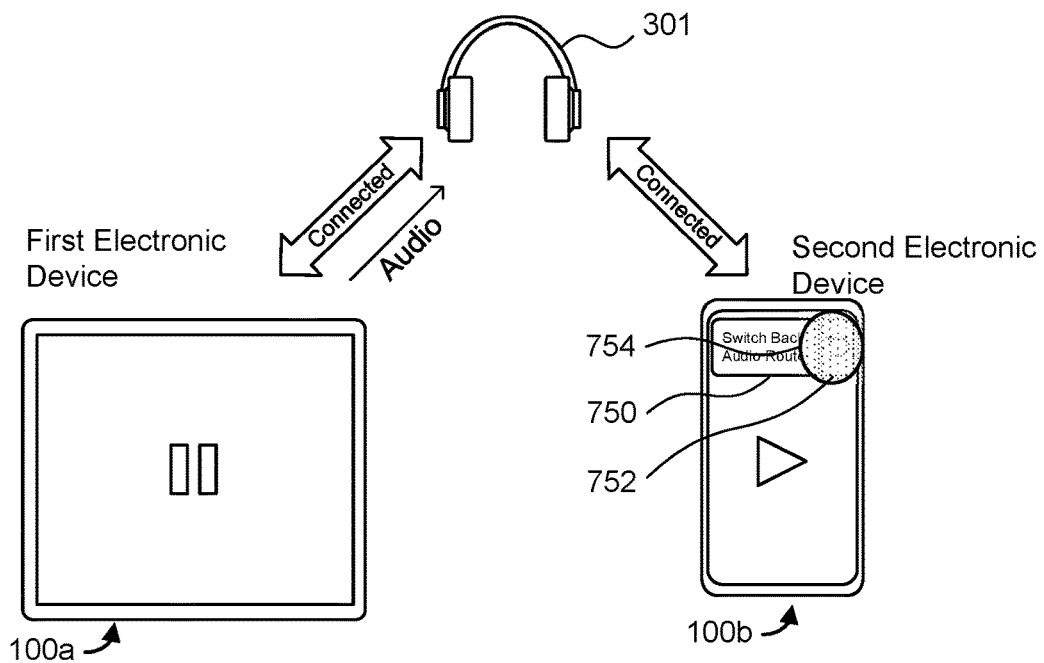
Figures 4, 7I:
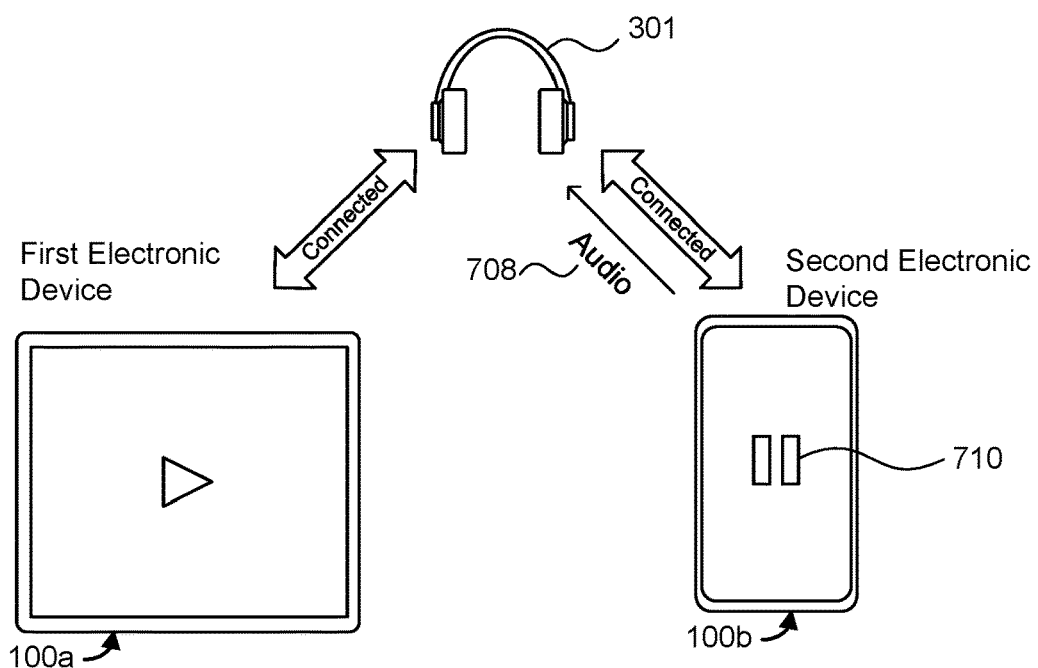

FIG. 7I-1 to FIG. 7I-4 illustrate an alert being displayed on a second electronic device after audio routing is switched from the second electronic device to the first electronic device, giving the option to switch back to playing audio from the second electronic device with a single user input. In particular, FIG. 7I-1 shows headphones 301 concurrently connected to both first electronic device 100a and second electronic device 100b. Second electronic device 100b is also transmitting audio data to the headphones 301 for playback (indicated by arrow 708 and pause button 710). In addition, FIG. 7I-1 also shows an input 748 over play button 712 to play audio from the first electronic device 100a.

FIG. 7I-2 shows that in response to input 748 over play button 712, the headphones 301 cease to play audio from the second electronic device 100b (indicated by arrow 708 no longer being displayed), and playing audio from the first electronic device 100a (indicated by arrow 720). Optionally, FIG. 7I-2 shows an alert 750 prompting a user as to whether they would like to switch back to the previous audio route (e.g., resume playing audio from the second electronic device). In some embodiments, the alert includes a selectable user interface element, such as a displayed button 752, for switching back to the previous audio route.

FIG. 7I-3 shows an input 754 over the button 752 located within the alert 750. FIG. 7I-4 shows that in response to the input 754 over the button 752, second electronic device 100b resumes or restarts transmitting audio data to the headphones 301 for playback (indicated by arrow 708 and pause button 710 on second electronic device 100b).

Figures 1, 7J:
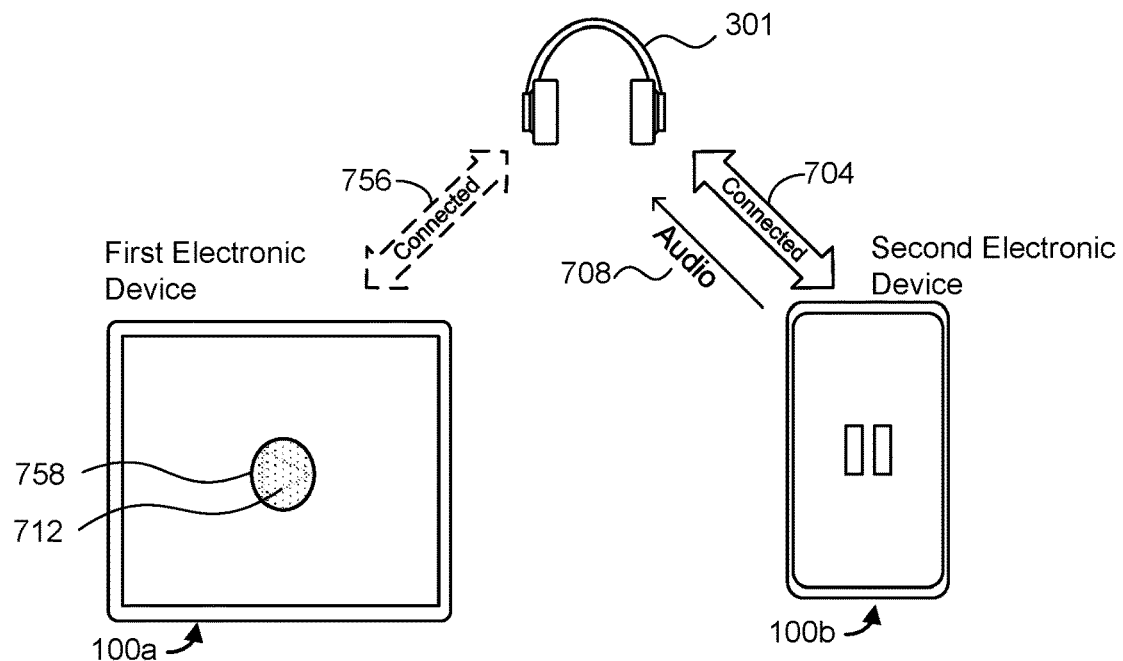
Figures 2, 7J:
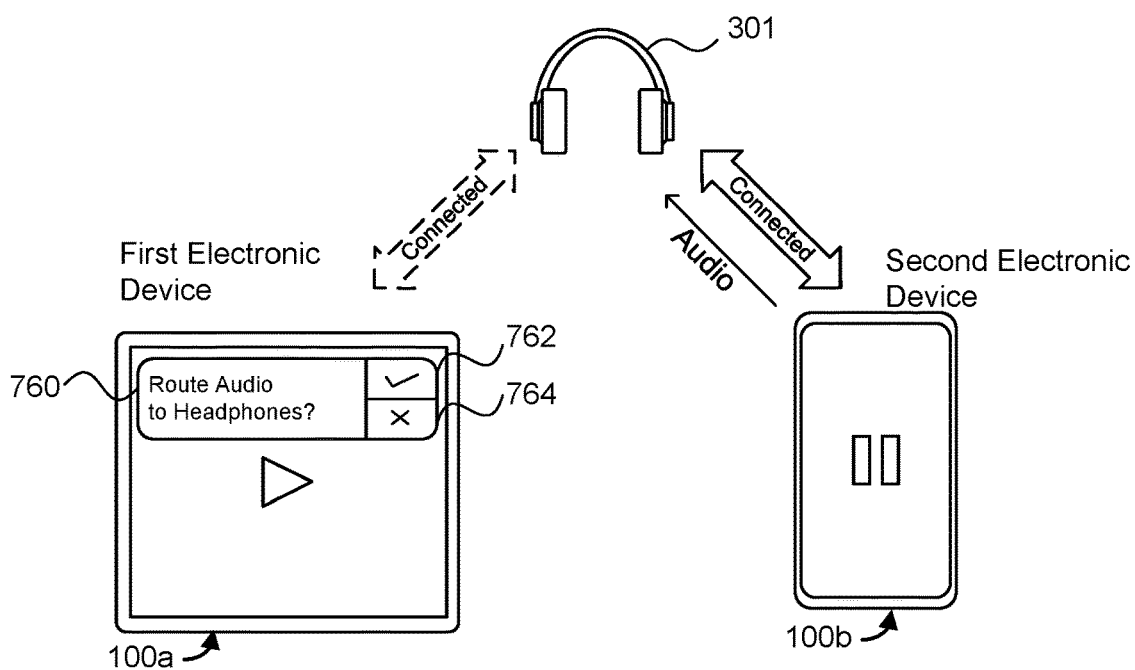
Figures 3, 7J:
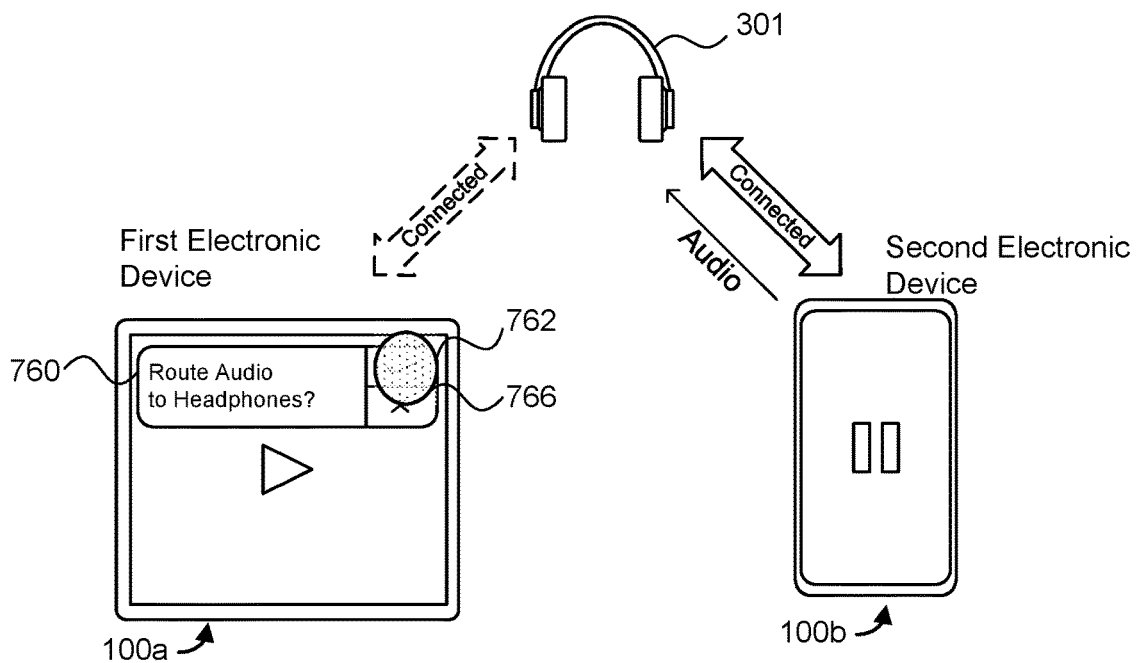
Figures 4, 7J:
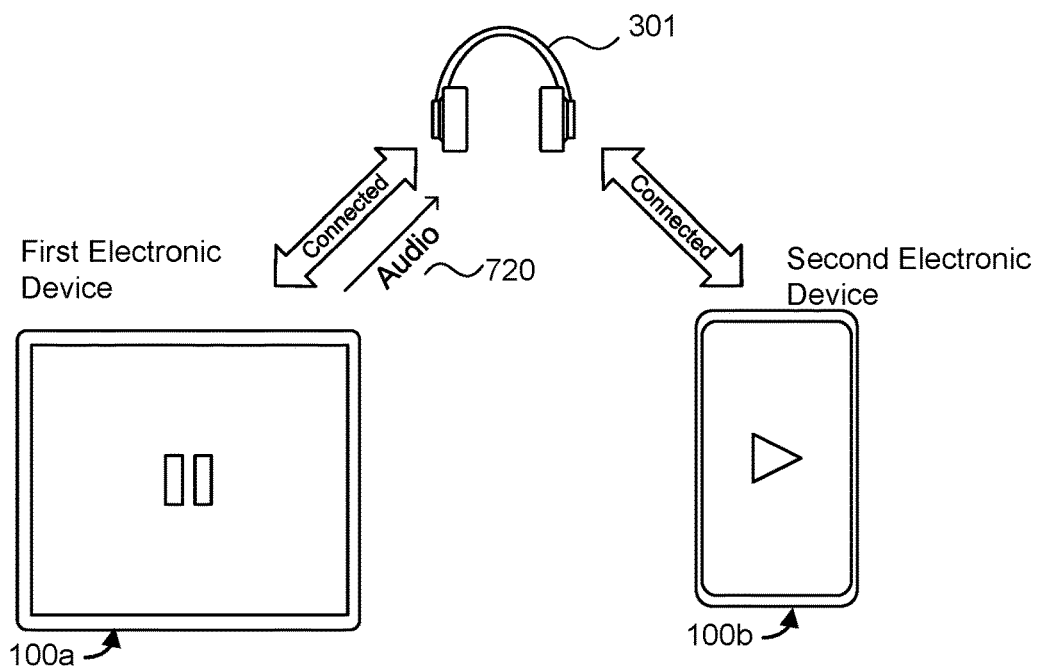

FIG. 7J-1 to FIG. 7J-4 shows another embodiment that, in response to a user input on a respective electronic device that requests the respective electronic device to play or playback audio, displays a prompt on the respective electronic device, that asks the user whether they would like to connect the respective electronic device to headphones 301, instead of the respective electronic device automatically connecting to the headphones 301 in response to the user input. In some embodiments, this prompt can appear either based on a user's preference for "manually" switching audio routing, or as a result of hardware limitations. In particular, FIG. 7J-1 shows that second electronic device 100b is connected to and is transmitting audio to the headphones 301. This is illustrated by arrow 704 showing the connection is established, and arrow 708 showing audio is being transmitted. FIG. 7J-1 also shows a dashed "connected" arrow 756 between the headphones 301 and first electronic device 100a, which indicates that the first electronic device can be either connected or not connected to the headphones 301 at the point in time illustrated in FIG. 7J-1. In other words, the interaction that occurs in FIGS. 7J-1 to 7J-4 may not require a direct connection between the first electronic device 100a and the headphones 301 prior to a user's input requesting the first electronic device 100a to play audio. Additionally, FIG. 7J-1 shows an input 758 over play button 712 on the first electronic device 100a.

FIG. 7J-2 shows that in response to input 758 over play button 712, an prompt 760 is displayed, which prompts the user to route audio from the first electronic device 100a to the headphones 301. In this example, within prompt 760 there are two buttons (e.g., two selectable user interface elements). User selection of a first button 762 requests that audio be routed from the first electronic device 100a to the headphones 301, and user selection of a second button 764 requests that audio not be routed from the first electronic device 100a to the headphones (e.g., audio played by the first electronic device 100a may be routed to internal speakers of the first electronic device 100a, or to another audio output device other than headphones 301). The use of prompt 760 allows the user to affirmatively make the audio route switch instead of having it done automatically.

FIG. 7J-3 shows an input 766 over the first button 762 indicating that the first electronic device should route audio (e.g., connect) to the headphones 301. FIG. 7J-4 shows that in response to the input 766 over the first button 762, the first electronic device 100a begins routing audio to the headphones (indicated by arrow 720). In some embodiments, the connection between the first electronic device 100a and the headphones 301 is not established until the input 766 confirming the routing is received.

FIGS. 8A-8D are flow diagrams illustrating a method 800 of controlling connections between an audio output device (e.g., a wearable audio output device, as described above with reference to FIG. 3B) and two electronic devices, and controlling audio routing from the electronic devices to the audio output device, in accordance with some embodiments. Method 800 is performed at a first electronic device (802) (e.g., a wireless device (e.g., a phone, sometimes called a smart phone or mobile phone, or tablet), a desktop computer, a laptop computer, or any other electronic device capable of wirelessly transmitting audio data to an audio output device. In some embodiments, the first electronic device is a device with a touchscreen, shown in FIG. 7A as first electronic device 100a. The same range of devices applies to the second electronic device 100b). Some operations in method 800 are, optionally, combined and/or the order of some operations is, optionally, changed. As described herein, method 800 performs, at the first electronic device, an operation that automatically routes (e.g., switches) an audio output device's audio output from a second electronic device to the first electronic device based on a request from the user to start playing audio from the first electronic device, and automatically ceasing to play audio from the second electronic device. This operation allows the user to seamlessly switch audio routing to the audio output device, between first and second electronic devices, without having to manually switch the audio output device's output each time the user switches between a first electronic device and a second electronic device. In some embodiments, the audio output device is a circumaural ('around the ear') headphone, as shown in FIG. 7A to FIG. 7J-4, while in some other embodiments the audio output device is an in ear headphone, sometimes called earbuds, a supra-aural ('over the ear') headphone, or a speaker separate from the first and second electronic devices. Performing an operation when a set of conditions has been met without requiring further user input enhances the operability of the electronic device and makes the user-device interface more efficient (e.g., by helping the user to provide proper inputs and reducing user mistakes when operating/interacting with the device) which, additionally, reduces power usage and improves battery life of the electronic device by enabling the user to use the electronic device more quickly and efficiently.

Method 800 includes a set of operations that are performed while the audio output device (e.g., headphones 301, shown in FIG. 7A to FIG. 7J-4) is concurrently wirelessly connected with both the first electronic device and a second electronic device that is different from the first electronic device, and at least initially playing (e.g., outputting sound waves for listening) first audio corresponding to first audio data (e.g., music, podcast, video, audiobook, phone call etc.) transmitted (e.g., routing) by the second electronic device to the audio output device (804). Those operations include detecting (806), at the first electronic device, a user request (e.g., input 714 over play button 712 in FIG. 7B-2) to play a second audio that is associated with a media item (e.g., music, podcast, video, audiobook, etc.). In some embodiments, a media item is not (and does not include) a phone call; in some embodiments, the media item, or an audio data stream for the media item, is capable of being paused and resumed. For example, FIG. 7B-2 shows user input 714 over the play button 712 to play or pause a media item.

In response to detecting the user request, first electronic device (e.g., device 100a) transmits (808) to the audio output device second audio data corresponding to the second audio. For example, FIG. 7B-3 illustrates audio data being transmitted from first electronic device 100a to audio output device 301 in response to a user request, input 714 on play button 712, FIG. 7B-2.

In accordance with the second audio data being transmitted to the audio output device, the audio output device ceases playing (810) (e.g., outputting) the first audio (e.g., by stopping playback of the first audio from the second electronic device). In some embodiments, in accordance with the second audio data being transmitted to the audio output device and the audio output device ceasing to play the first audio, the first audio is paused (811) (e.g., automatically paused) on the second electronic device. Stated another way, the first audio is paused (e.g., automatically paused) on the second electronic device, as shown in FIG. 7B-3, in conjunction with the first electronic device beginning to play the second audio and transmitting the second audio to the audio output device. For example, FIG. 7B-3 shows the first audio (e.g., the audio data indicated by arrow 708 in FIG. 7B-1) ceasing to be played, and the second audio (e.g., the audio data indicated by arrow 720 in FIG. 7B-3) beginning to play. In some embodiments, the audio output device ceases playing the first audio and begins playing the second audio further in accordance with the second audio having a second priority that is at least as high as a first priority of the first audio.

In some embodiments, a precondition or requirement for performance of the aforementioned operations (e.g., operations 802-810) of method 800 is that the first electronic device, the second electronic device, and the audio output device are associated with the an identical (e.g., the same) user account (812) (e.g., an iCloud® (a trademark of Apple Inc.) user account). For example, FIG. 7A shows that user account A 706 is associated with both the first electronic device 100a and the second electronic device 100b).

Having a precondition or requirement that the first electronic device, the second electronic device, and the audio output device must all be associated with same user account in order to perform the automatic audio routing described above ensures that the audio output device does not accidentally connect to other devices that are not associated with the user account. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As described above with reference to FIGS. 7I-1 to 7I-4, in some embodiments, method 800 includes, after transmitting (808) to the audio output device second audio data corresponding to the second audio, ceasing (832) to play the second audio in response to receiving a request (e.g., a switch back audio routing request, such as input 754 on button 752 or alert 750, shown in FIG. 7I-2) from the second electronic device to cease playing the second audio, wherein the request to cease to play second audio occurs in response to a user selection of a selectable user interface element (e.g., button 752 or alert 750, FIG. 7I-2) displayed on a display of the second electronic device that causes the first audio to resume playback on the audio output device. For example, FIG. 7I-1 shows first audio playing from the second electronic device 100*b*, and FIG. 7I-2 shows subsequently playing second audio from the first electronic device 100*a* in response to input 748. A request to cease to play second audio occurs in response to a user selection (e.g., an input 754 over a displayed button 752 shown in FIG. 7I-3 on the second electronic device) of a selectable user interface element (e.g., a revert option such as button 752 in FIG. 7I-3) displayed on a display of the second electronic device that causes the first audio to resume playback on the audio output device.

Displaying a selectable user interface element (e.g., a revert option) on the second electronic device that causes the first audio to resume playback on the audio output device provides the user with the ability to quickly switch back to the desired audio without having to manually pause the second audio, and resume the first audio. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As described above with reference to FIGS. 7J-1 to 7J-4, in some embodiments, method 800 includes, in response to detecting (806) (at the first electronic device) the user request (to play the second audio associate with a media item) and before transmitting to the audio output device second audio data corresponding to the second audio, displaying (834) on the first electronic device a prompt (e.g., prompt 760, FIG. 7J-2) that displays an option (e.g., button 762, FIG. 7J-2) for connecting the first electronic device to the audio output device. For example FIGS. 7J-1 to 7J-2 illustrate the prompt (e.g., alert 760) that includes an option for connecting to the audio output device (e.g., first button 762)). In some embodiments, the prompt can be a prompt other than a prompt displayed on the first electronic device. In some embodiments, the prompt is displayed on either the first electronic device, the second electronic device, or is displayed concurrently on both the first electronic device and the second electronic device. In some embodiments, the prompt is displayed in accordance with a determination that the audio output device is sufficiently close to the first electronic device for the first electronic device to form a connection with the audio output device.

Displaying an option for connecting the first electronic device to the audio output device provides the user with quick control over what audio is played at the audio output device. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the audio output device, while concurrently wirelessly connected with both the first electronic device and the second electronic device, is disconnected from the second electronic device in accordance with the second electronic device transitioning (814) from an active state to an inactive state (e.g., the transition from FIG. 7C-1 to 7C-2 shows the second electronic device 100*b* disconnecting from the audio output device 301 once it transitions from an active state 724 to an inactive state 726). In some embodiments, when the second electronic device disconnects from the audio output device, an alert is provided (e.g., an alert can be displayed on a display of the second electronic device, an alert can be displayed on a display of the first electronic device, and/or the alert can be an audible alert played through a speaker of the audio output device). For example, FIG. 7C-4 shows an alert 730 (e.g., "headphones disconnected") being shown on the display of the second electronic device 100*b* (e.g., electronic device) when the second electronic device 100*b* transitions from an active state 724 to an inactive state 726.

Having the audio output device automatically disconnect from the second electronic device when the second electronic device transitions from an active state to an inactive state, provides the user with convenience of not having to go into a settings menu and having to manually disconnect the audio output device from the second electronic device when the second device is no longer in use. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second electronic device is in the inactive state and fails to satisfy proximity criteria (e.g., a signal presence or strength and/or proximity data based on geolocation information) with respect to the audio output device, method 800 includes presenting (816) an alert indicating that the audio output device is disconnected from the second electronic device (e.g., FIG. 7C-4 shows second electronic device 100*b* in an inactive state 726, and second electronic device 100*b* failing to satisfy connection proximity criteria 728, which results in alert 730 being displayed by the second electronic device 100*b*). Similarly, in some embodiments, in accordance with a determination that the first electronic device is in (or has transitioned to) the inactive state and fails to satisfy proximity criteria (e.g., a signal presence or strength) with respect to the audio output device, method 800 includes presenting an alert to the user, e.g., in a notifications user interface on the first or second electronic device, or an audio alert presented either on the first electronic device that has become disconnected or on the audio output device, indicating that the audio output device is disconnected from the first electronic device.

In some embodiments, in accordance with a determination that the second electronic device has transitioned from the active state to the inactive state and satisfies the proximity criteria with respect to the audio output device, method 800 includes foregoing (816) presenting an alert indicating that the audio output device is disconnected from the second electronic device (e.g., FIG. 7C-3 shows second electronic device 100*b* in an inactive state 726, and the second device 100*b* satisfying connection proximity criteria 728, which results in no alert being displayed). Similarly, in some embodiments, in accordance with a determination that the first electronic device has transitioned from the active state to the inactive state and satisfies the proximity criteria with respect to the audio output device, method 800 includes foregoing conveying to the user an alert indicating that the audio output device is disconnected from the first electronic device.

Selectively alerting a user that the audio output device is disconnected based on the proximity of second electronic device to the audio device, allows the user to not be constantly interrupted/alerted every time the second electronic device enters an inactive state. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 800 includes, while the audio output device is concurrently wirelessly connected with both the first electronic device and the second electronic device (e.g., FIG. 7E-1), determining (818) whether the first electronic device fails to satisfy proximity criteria (e.g., a signal presence or strength) with respect to the audio output device (e.g., FIG. 7E-2 shows first electronic device 100*a* failing to satisfy connection proximity criteria 728); and in response to determining (818) that the first electronic device fails to satisfy the proximity criteria with respect to the audio output device, displaying a disconnection alert (e.g., first electronic device 100*a* in FIG. 7E-2 shows alert 734). Optionally, a disconnection alert is also presented (e.g., played as an audio alert) at the audio output device, indicating that the audio output device is disconnected from the first electronic device.

Selectively alerting a user that the audio output device is disconnected based on the proximity of second electronic device to the audio device allows the user to not be constantly interrupted/alerted every time the second electronic device enters an inactive state. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 800 includes, while the audio output device is wirelessly connected with the second electronic device (e.g., FIG. 7F-1 shows second electronic device 100*b* connected to headphones 301), in response to the first electronic device satisfying connection criteria, including the first electronic device transitioning from an inactive state to an active state (e.g., the first electronic device 100*a* transitions from an inactive state 738 in FIG. 7F-1 to an active state 722 in FIG. 7F-2), establishing (820) a connection between the first electronic device and the audio output device (e.g., establishing the connection is indicated by arrow 702 in FIG. 7F-2), where, after the connection between the first electronic device and the audio output device is established, the audio output device is concurrently wirelessly connected with both the first electronic device and the second electronic device (e.g., FIG. 7F-2 shows arrow 702 indicating the connection is established between the headphones 301 and the first electronic device 100*a*, and arrow 704 indicates the connection is established between the headphones 301 and the second electronic device 100*b*).

Automatically connecting the first electronic device to the audio output device while the audio output device is also connected to the second electronic device, when the first device becomes active, allows the user to experience a seamless transition of audio playback once audio playback is requested from the first electronic device, without requiring the user to go into complicated menus in order to switch between the devices manually. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 800 includes, while the audio output device is wirelessly connected with the second electronic device, in response detecting, at the first electronic device, a user request (e.g., an input 740 over a play button 712 in FIG. 7G-1) to play second audio (e.g., audio that is associated with a media item), establishing (822) (e.g., automatically establishing) a connection between the first electronic device and the audio output device (e.g., indicated by arrow 702 in FIG. 7G-2), where, after the connection between the first electronic device and the audio output device is established, the audio output device is concurrently wirelessly connected with both the first electronic device and the second electronic device (e.g., indicated by arrow 702 and 704 in FIG. 7G-2).

Automatically connecting the first electronic device to the audio output device while the audio output device is also connected to the second electronic device, when a request to play audio is made on the first device, allows the user to not have to navigate complicated menus and switch between the devices manually in order to connect the first electronic device to the audio output device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 800 includes, after establishing a connection between the first electronic device and the audio output device, and before playing the second audio, conveying (824) an alert to the user indicating that the audio output device is connected to the first electronic device. (e.g., alert 742 shown in FIG. 7G-2).

In some embodiments, the alert conveying that the audio output device is connected to the first electronic device is displayed in accordance with a determination that the first electronic device is in an active state (826) (e.g., alert 742 shown in FIG. 7G-2 is displayed when the first electronic device is in an active state). In some embodiments, the alert is displayed when the first electronic device is in an active state, and the first electronic device was previously inactive for a predetermined amount of time (e.g., 8 minutes).

Providing an alert to the user that the audio output device is connected to the first electronic device when the first electronic device is in or enters an active state (e.g., the display is turned on) informs the user what audio output device the electronic device is connected to and where audio will be output from, and allows the user to forgo navigating settings menus to determine where the audio will be output from. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, method 800 includes, in response to detecting, at the first electronic device, a user request (e.g., an input 744 over a play button 712 shown in FIG. 7H-1) to play a second audio that is associated with a media item, in accordance with a determination that the first electronic device does not have an established audio output path to the audio output device, pausing (828) the second audio (on the first electronic device) until an audio output path from the first electronic device to the audio output device is established, and playing the second audio upon establishing the audio output path from the first electronic device to the audio output device. For example, FIGS. 7H-2-7H-3 show the audio played by the second electronic device 100*b* being paused until the audio output path from the first electronic device 100*a* to the audio output device 301 is established so as to prevent audio from being output from non-headphone speakers of the first electronic device before the connection with the audio output device is established. In such embodiments, method 800 further includes, in accordance with a determination that the first electronic device has an established audio output path to the audio output device, playing (828) the second audio. For example, FIG. 7H-3 shows the first electronic device 100*a* having an established connection (indicated by arrow 702) with the audio output device 301, and, as a result, the first electronic device 100*a* playing the second audio (indicated by pause button 712).

Waiting to play the selected second audio from the first electronic device at the audio output device until the first electronic device has an established an audio output path to the audio output device, avoids the user missing part of the audio content of the media item, and in addition lets the user know that a mode or source change is in the works. This also ensures that the user does not experience a situation where the user expects the second audio to be played through the audio output device (e.g., headphones), but instead the audio plays through another device (e.g., the first electronic device's built-in speakers). Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 8A:
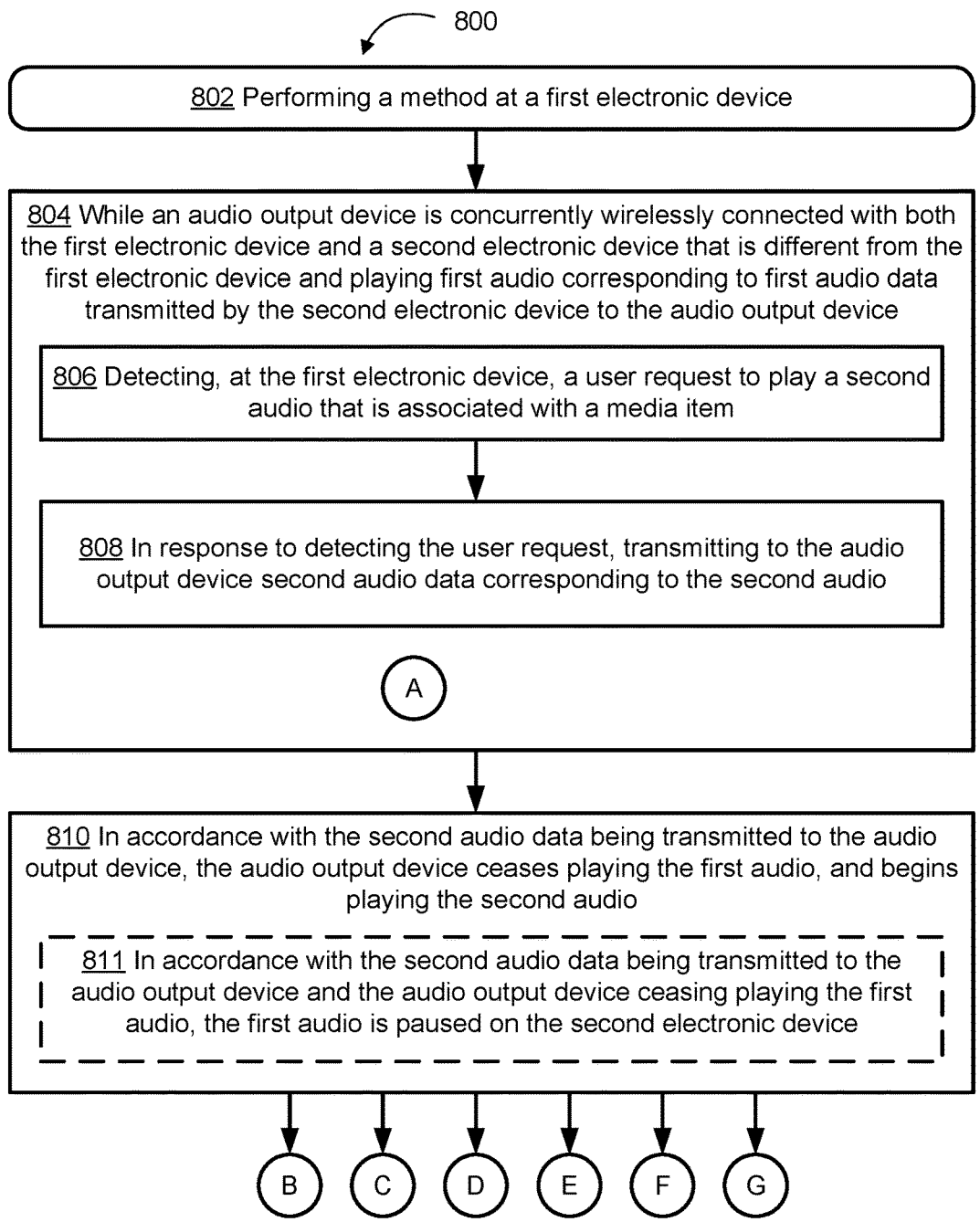
FIGS. 8A-8E are flow diagrams of a process for automatically forming wireless connections and wirelessly routing audio from first and second electronic devices to an audio output device, all associated with the same user account, in accordance with some embodiments.
Figure 8B:
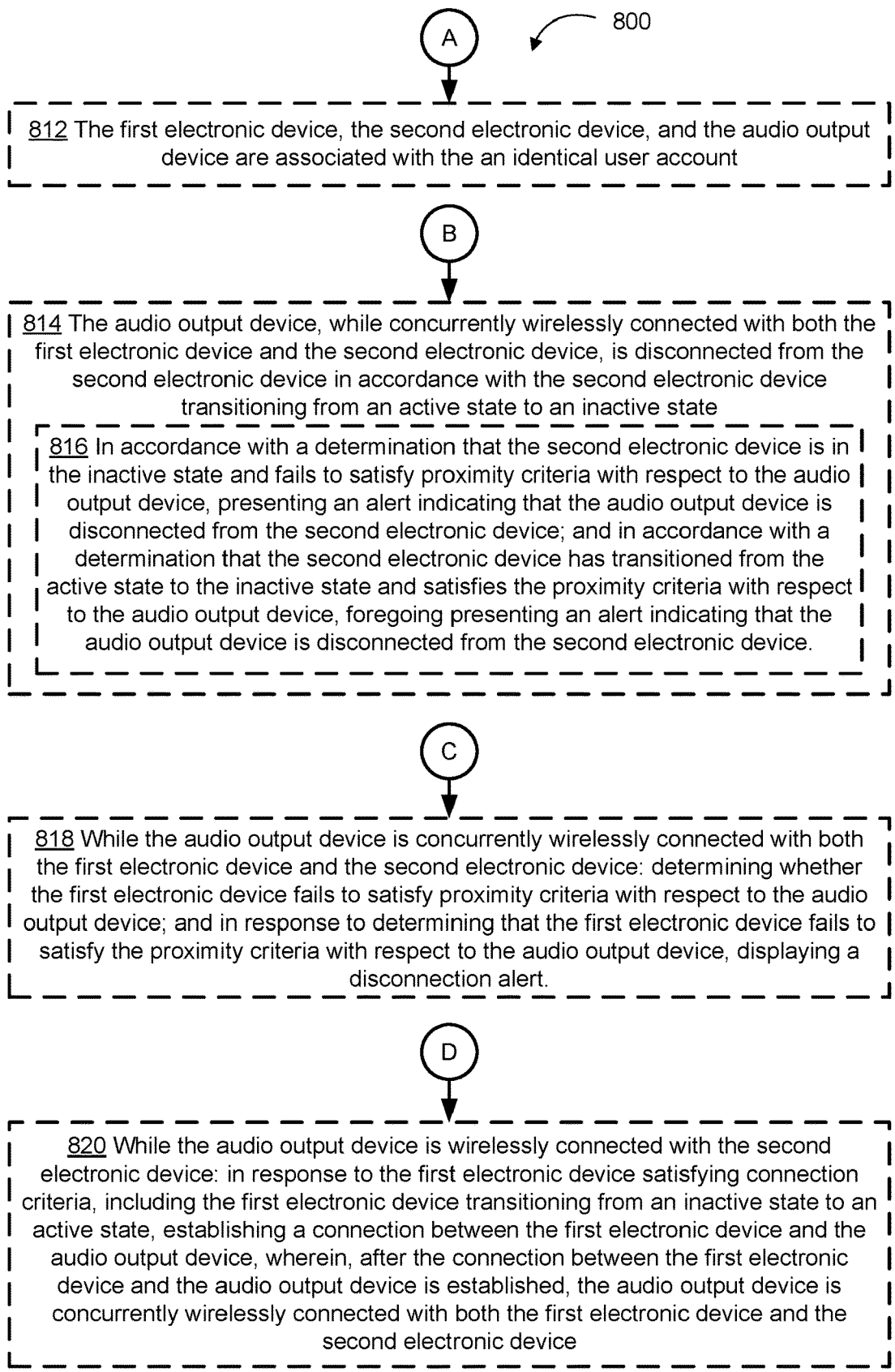
Figure 8C:
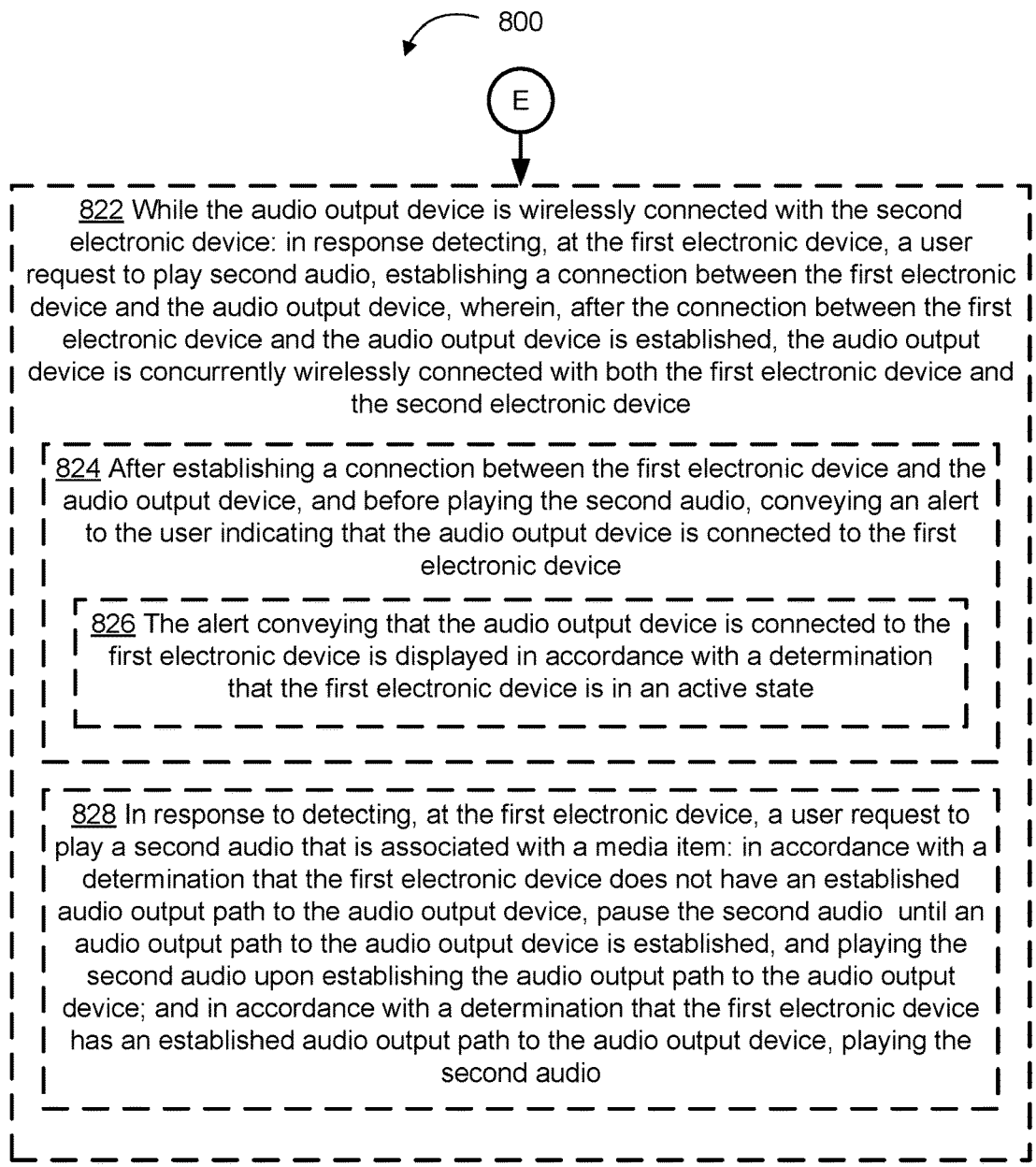
Figure 8D:
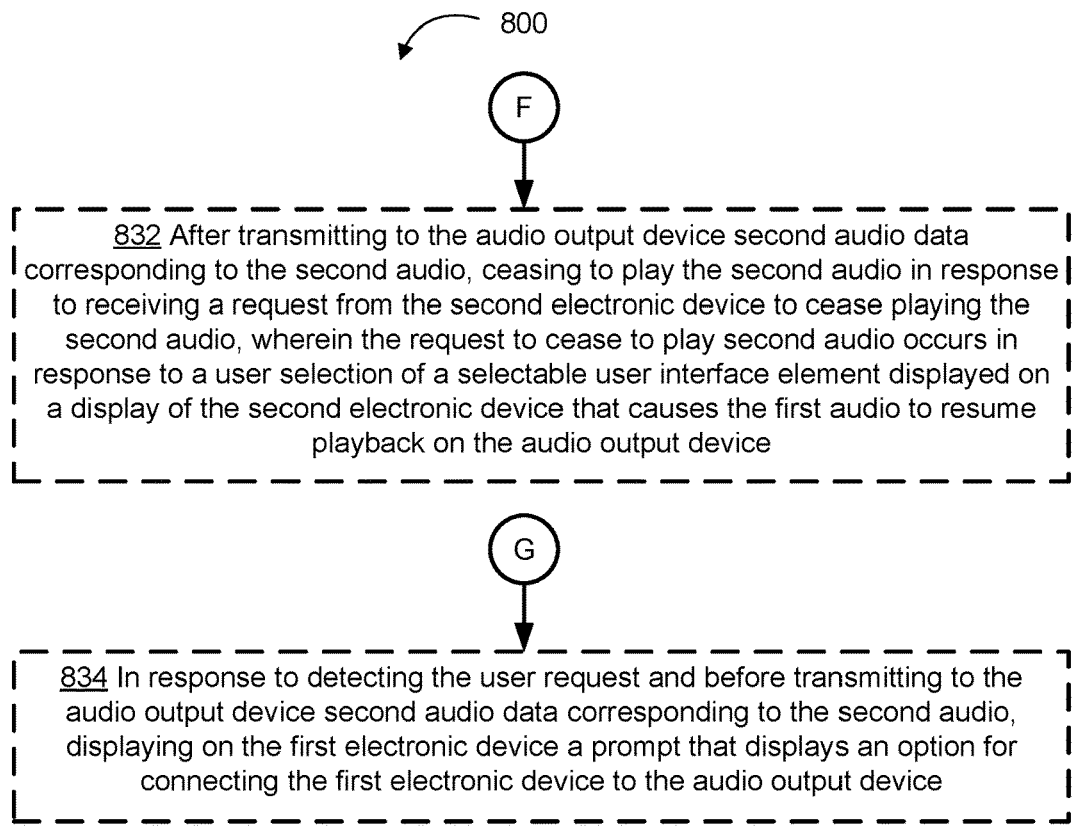
Figure 8E:
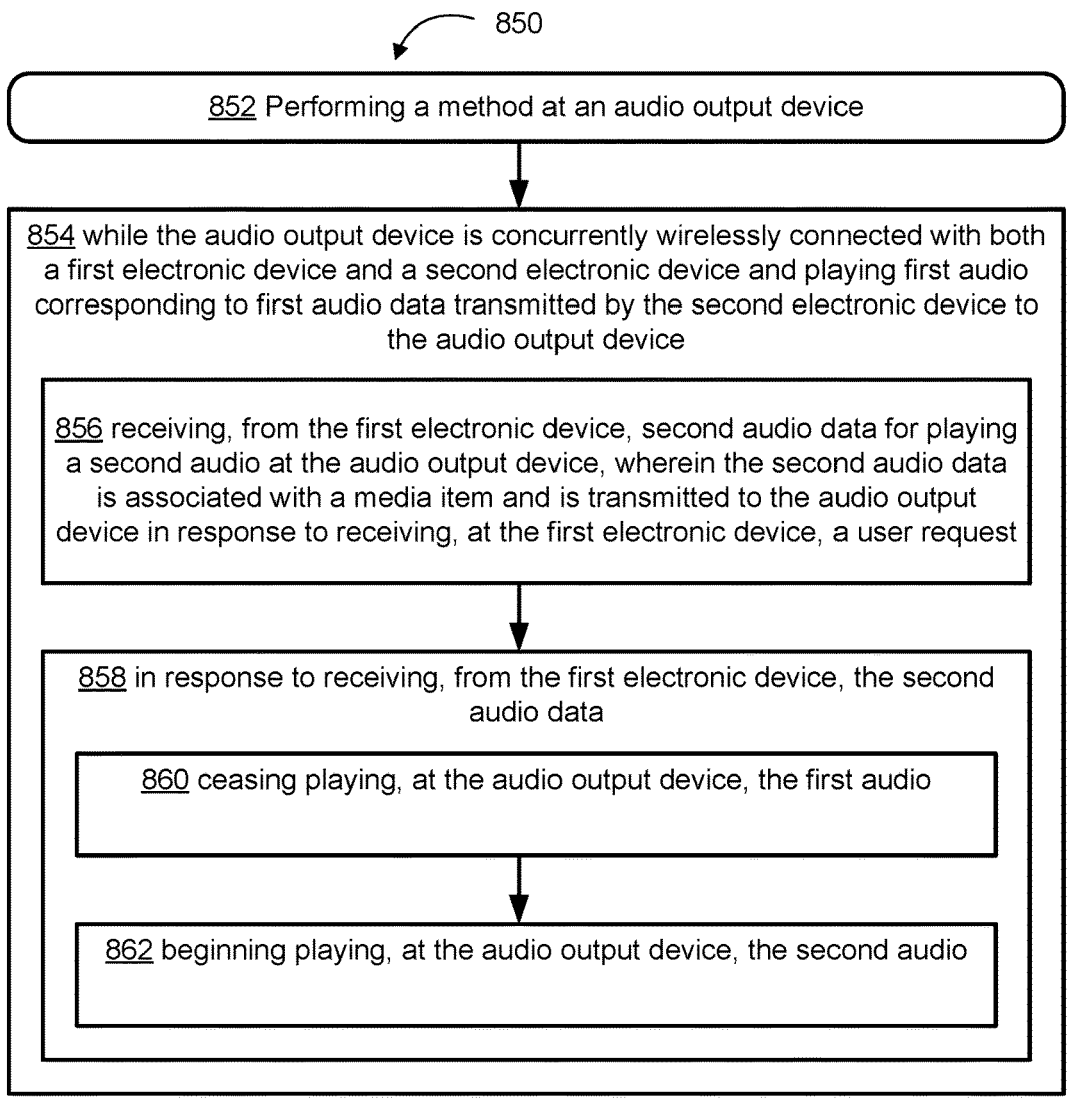

In another aspect of the present disclosure, as shown in FIG. 8E, a method 850 is performed (852) by an audio output device (e.g., a wearable audio output device, as described above with reference to FIG. 3B) that includes, while (854) the audio output device (e.g., any of the audio output devices described herein) is concurrently wirelessly connected with both a first electronic device and a second electronic device and playing (e.g., as discussed above with reference to FIG. 7B-1) first audio corresponding to first audio data (e.g., music, podcast, video, audiobook, phone call etc.) transmitted (e.g., routing) by the second electronic device to the audio output device (e.g., indicated by arrow 708), receiving (856), from the first electronic device (e.g., first electronic device 100*a* in FIG. 7B-1), second audio data (e.g., indicated by arrow 720) for playing (e.g., outputting) a second audio at the audio output device, wherein the second audio data is associated with a media item. In some embodiments, the media item does not include a phone call, and is transmitted (e.g., routed) to the audio output device in response to receiving, at the first electronic device, a user request; (e.g., input 714 over a play button 712 in FIG. 7B-2).

The method 850 performed by the audio output device includes, in response (858) to receiving, from the first electronic device, the second audio data: ceasing playing (860), at the audio output device, the first audio, and beginning playing (862), at the audio output device, the second audio (e.g., as indicated by arrow 720 in FIG. 7B-3). In some embodiments, the first audio is paused (e.g., automatically paused) on the second electronic device when the audio output device ceases playing the first audio.

An operation that automatically routes (e.g., switches) an audio output device's audio output from a second device to the first device based on a request from the user to start playing audio from the first device, and automatically ceases to play audio from the second electronic device, allows the user to seamlessly switch between first and second devices without having to pair the audio output device each time the user switches between first and second devices. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the method 850 performed by the audio output device further includes one or more operations, performed by the audio output device, described above with respect to method 800.

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 1000) are also applicable in an analogous manner to methods 800 and 850 described above with respect to FIGS. 8A-8E. For example, the devices, device connections, audio routes, user interfaces, alerts, and audio outputs described above with reference to methods 800 and 850 optionally have one or more of the characteristics of the devices, device connections, audio routes, user interfaces, alerts, and audio outputs described herein with reference to other methods described herein (e.g., methods 600 and 1000). For brevity, these details are not repeated here.

Figure 9A:
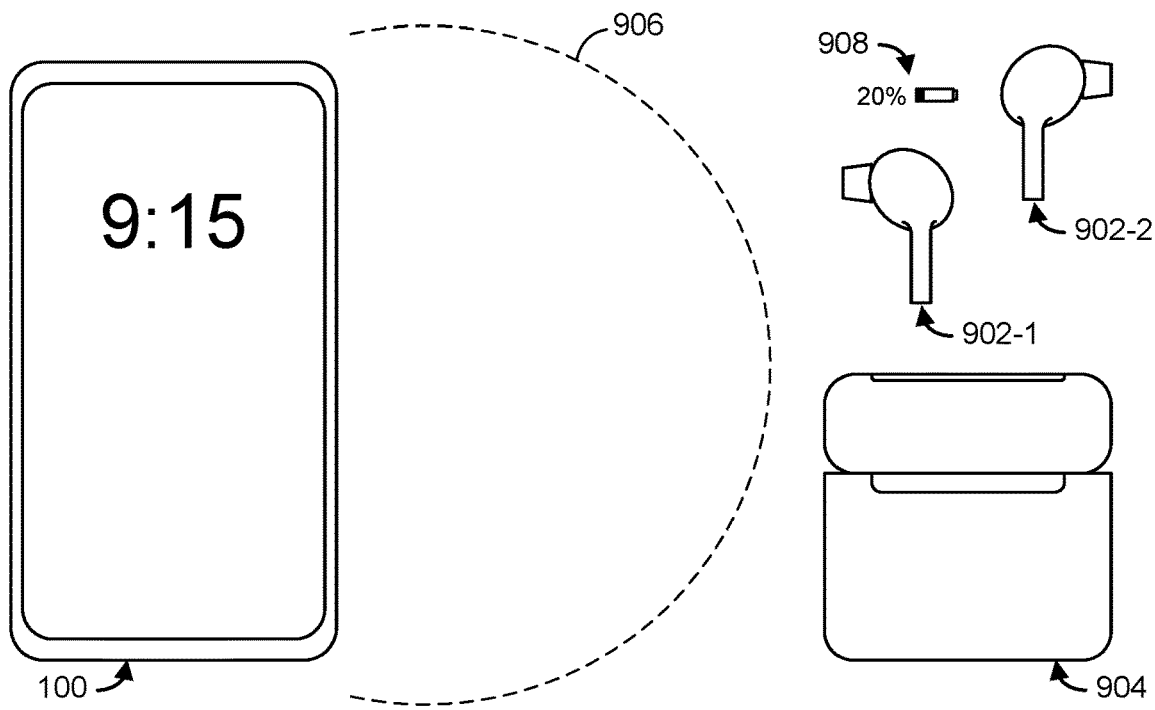
FIGS. 9A-9AD illustrate example user interactions and user interfaces for optimizing charging of batteries of electronic devices and connected peripherals in accordance with some embodiments.
Figure 10A:
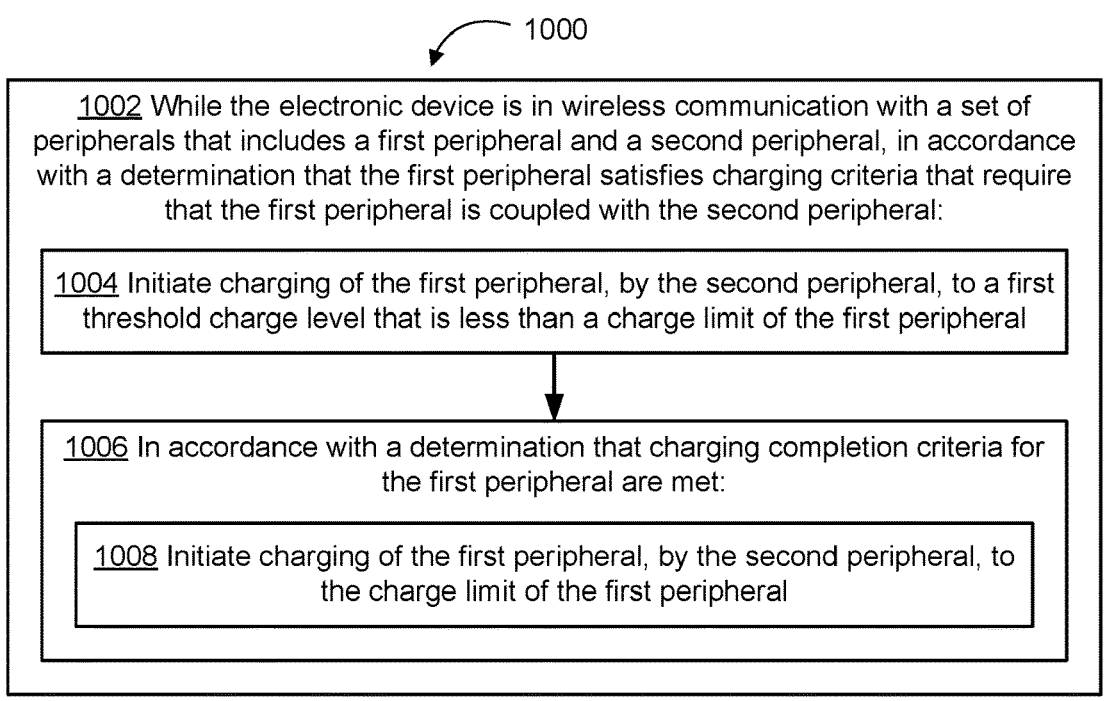

FIGS. 9A-9AD illustrate example user interactions and user interfaces for optimizing charging of batteries of electronic devices and connected peripherals in accordance with some embodiments.

FIGS. 9A-9H illustrate an example of charging a set of peripherals using optimized charging. FIG. 9A shows an electronic device 100. In the example shown in FIG. 9A, device 100 is connected to a set of peripherals including a pair of earbuds 902 (including earbud 902-1 and earbud 902-2) and a case 904 for earbuds 902. In some embodiments, case 904 is a charging case that charges the batteries of earbuds placed inside case 904. In FIG. 9A, both earbuds 902 and case 904 are positioned outside of a threshold distance 906 from device 100, and earbuds 902 are outside of case 904 (e.g., earbuds 902 are not being charged by case 904). The batteries of earbuds 902 are 20% charged, as indicated by earbud charging status 908.

Figure 9B:
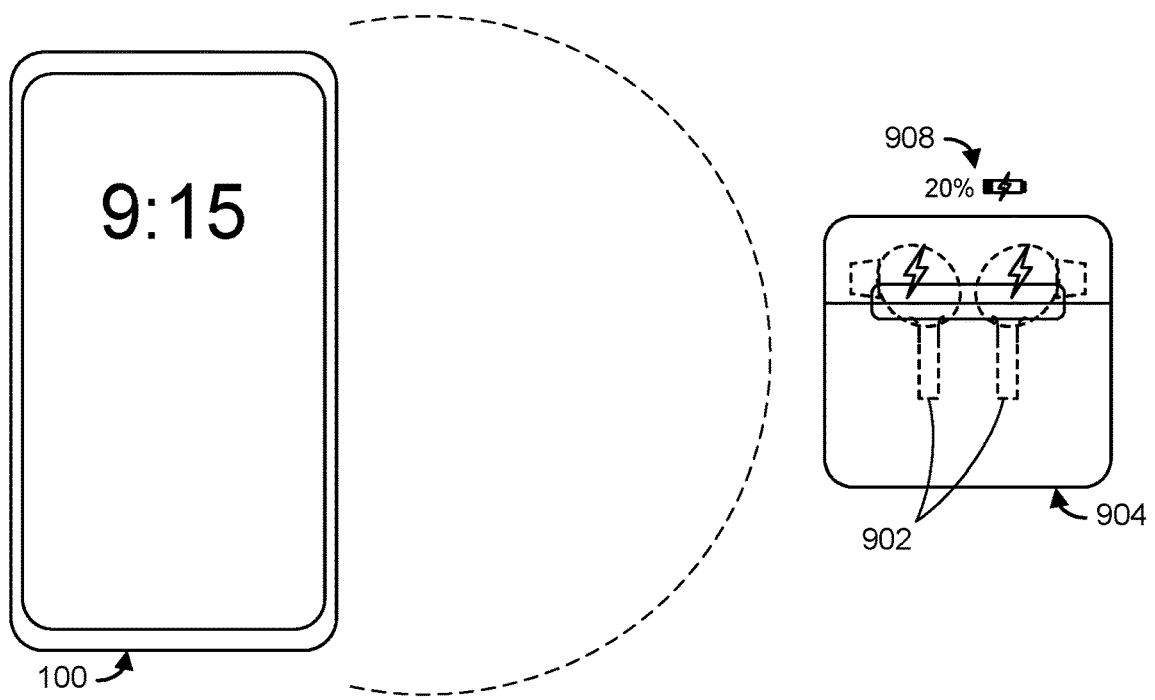

FIG. 9B shows earbuds 902 placed inside case 904, with case 904 closed. Case 904 is charging the batteries of earbuds 902, as indicated by the charging icons over earbuds 902 and earbud charging status 908. The charging icons over earbuds 902 are included in FIG. 9B for illustrative purposes, and are not necessarily displayed on earbuds 902.

Figure 9C:
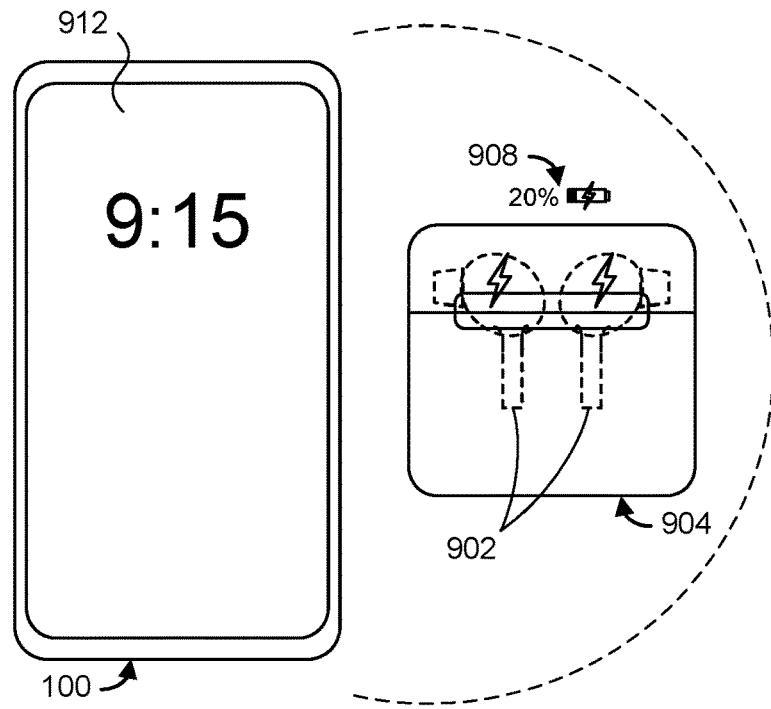

FIG. 9C illustrates a transition from FIG. 9B. FIG. 9C shows that case 904, with earbuds 902 inside and charging, has been brought into proximity with device 100 (e.g., within threshold distance 906 of device 100).

Figure 9D:
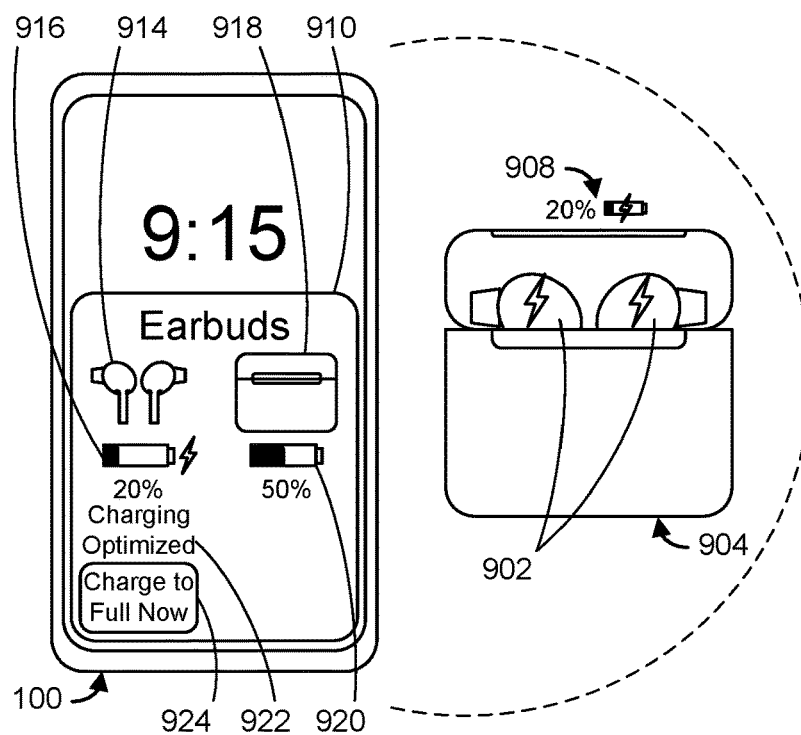

FIG. 9D illustrates a transition from FIG. 9C. FIG. 9D shows that case 904 has been opened (e.g., the lid of case 904 has been lifted). In response, device 100 displays user interface 910 (e.g., optionally displayed over a portion of another user interface, such as lock screen user interface 912 (FIG. 9C)). User interface 910 includes representation 914 of earbuds 902, and indication 916 of the charging status of earbuds 902 (e.g., as also indicated by earbud charging status 908 in FIG. 9D). In the example shown in FIG. 9D, earbuds 902 are 20% charged. User interface 910 includes representation 918 of case 904, and indication 920 of the charging status of case 904. In addition, in the example shown in FIG. 9D, optimization of the charging of earbuds 902 is enabled, as indicated by indication 922 (e.g., the text "Charging optimized") underneath representation 914 of earbuds 902. In some embodiments, charging of earbuds 902 by case 904 is performed under the control of device 100 (e.g., while device 100 is in communication with case 904 and/or earbuds 902). For example, device 100 sends instructions to case 904 and/or earbuds 902 to initiate charging of earbuds 902 by case 904, and optionally to limit charging to a threshold charge level in accordance with optimized charging being enabled, or alternatively, to permit charging to full in accordance with optimized charging being disabled. User interface 910 also includes optimized charging override button 924 (e.g., labeled "Charge to Full Now"), which, when activated, disables the optimization of the charging of earbuds 902 and, if other charging criteria are met, initiates charging of earbuds 902 to a fully charged state. In the example shown in FIG. 9D, optimized charging of case 904 is not enabled (e.g., is unavailable or has been disabled), so no optimized charging indication, nor any optimized charging override button, is displayed for case 904.

Figure 9E:
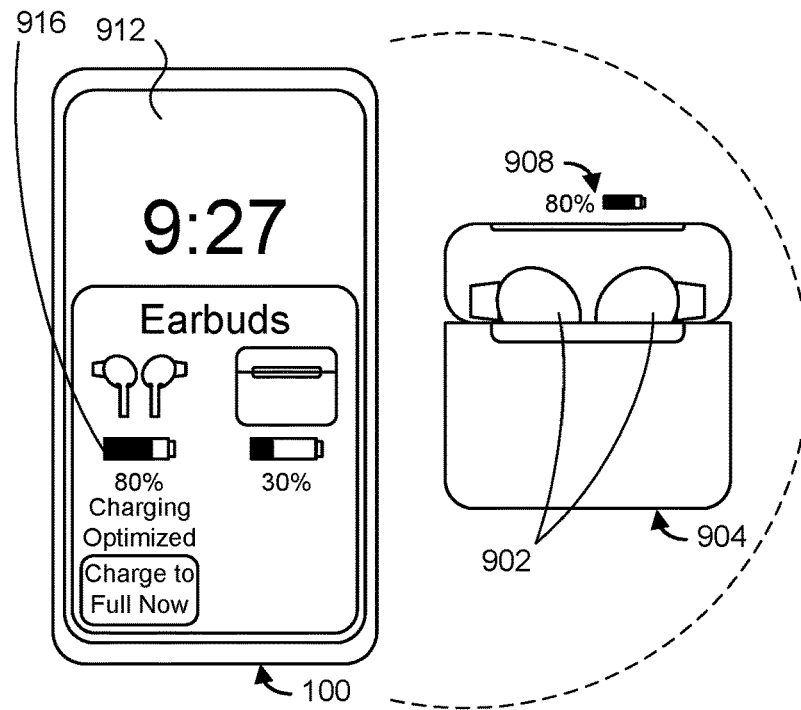

FIG. 9E illustrates a transition from FIG. 9D. FIG. 9E shows that time has elapsed since the scenario shown in FIG. 9D (e.g., as indicated by the clock in lock screen user interface 912). In the time elapsing between the scenario in FIG. 9D and the scenario in FIG. 9E, earbuds 902 were charged from 20% (FIG. 9D) to 80% (FIG. 9E). Because optimized charging of earbuds 902 is enabled, earbuds 902 are charged to a threshold charge level (e.g., 80% in the example in FIG. 9E) and not charged beyond the threshold charge level until charging completion criteria are met (e.g., as described in more detail herein with reference to method 1000). FIG. 9E shows that charging of earbuds 902 has stopped at the 80% charge level, as indicated by displayed indication 916 and by earbud charging status 908, and by the absence of the charging icons over earbuds 902 (e.g., in contrast to FIG. 9D).

Figure 9F:
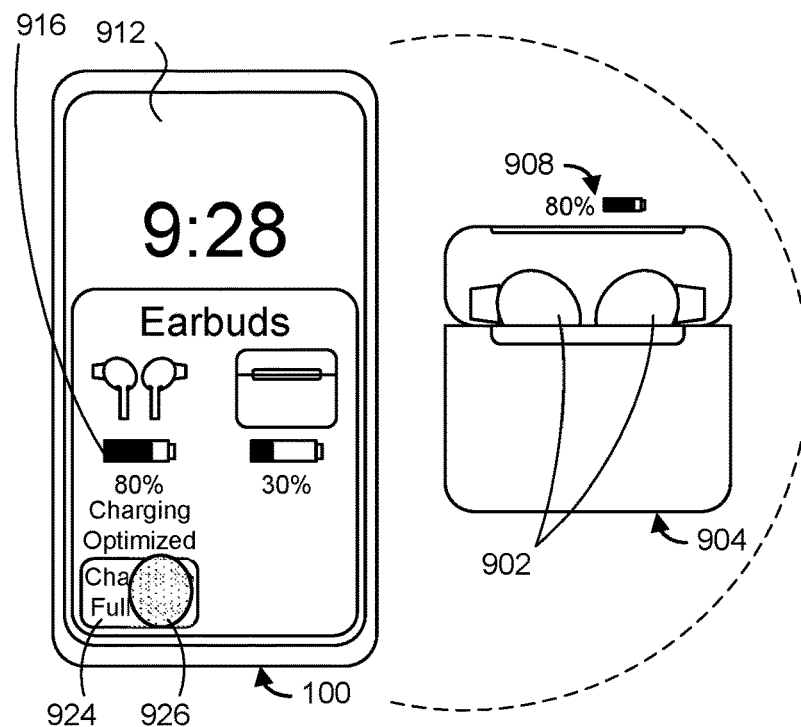

FIG. 9F illustrates a transition from FIG. 9E. In accordance with the charging of earbuds 902 being optimized, earbuds 902 have not been charged above the threshold charge level of 80% even though time has elapsed since the scenario shown in FIG. 9E (e.g., as indicated by the clock in lock screen user interface 912). FIG. 9F also shows input 926 corresponding to optimized charging override button 924 (e.g., a tap input on a touchscreen of device 100 at the location of displayed optimized charging override button 924).

Figure 9G:
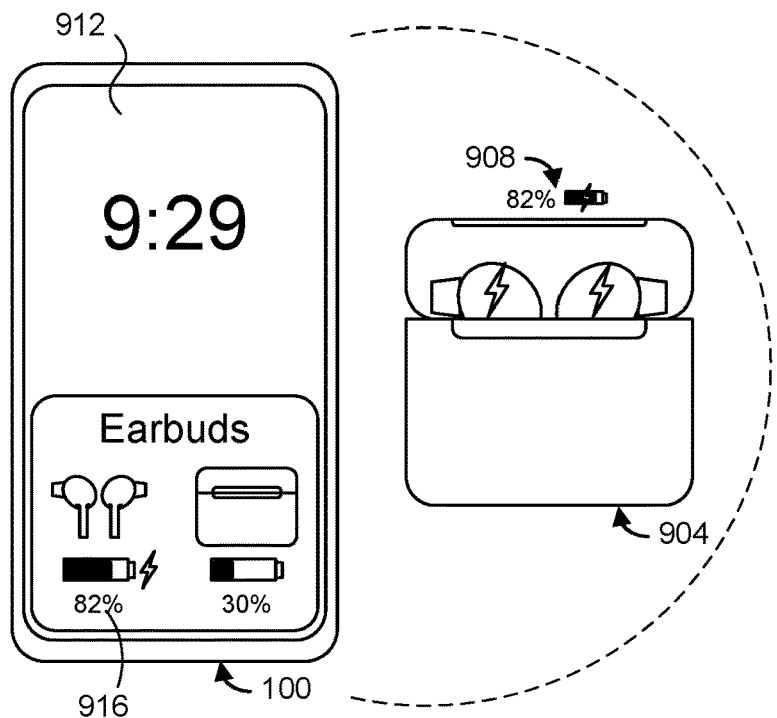

FIG. 9G illustrates a transition from FIG. 9F. In response to input 926 on optimized charging override button 924, device 100 initiates charging of earbuds 902 to full. FIG. 9G shows that case 904 is charging the batteries of earbuds 902, as indicated by the charging icons over earbuds 902, by displayed indication 916 on device 100, and by earbud charging status 908. In particular, in the time elapsing since the scenario shown in FIG. 9F (e.g., as indicated by the clock in lock screen user interface 912), earbuds 902 have been charged from 80% to 82%.

Figure 9H:
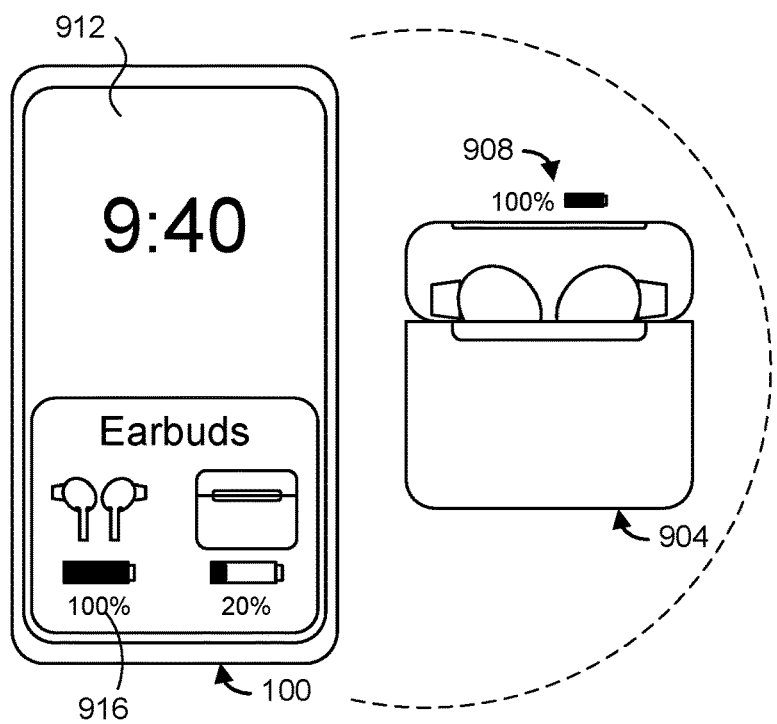

FIG. 9H illustrates a transition from FIG. 9G. FIG. 9H shows that time has elapsed since the scenario shown in FIG. 9G (e.g., as indicated by the clock in lock screen user interface 912). In the time elapsing between the scenario in FIG. 9G and the scenario in FIG. 9H, earbuds 902 were charged from 82% (FIG. 9G) to 100% fully charged (FIG. 9H). FIG. 9H shows that charging of earbuds 902 has stopped at the fully charged level of 100%, as indicated by displayed indication 916 and by earbud charging status 908, and by the absence of the charging icons over earbuds 902 (e.g., in contrast to FIG. 9G).

Figure 9I:
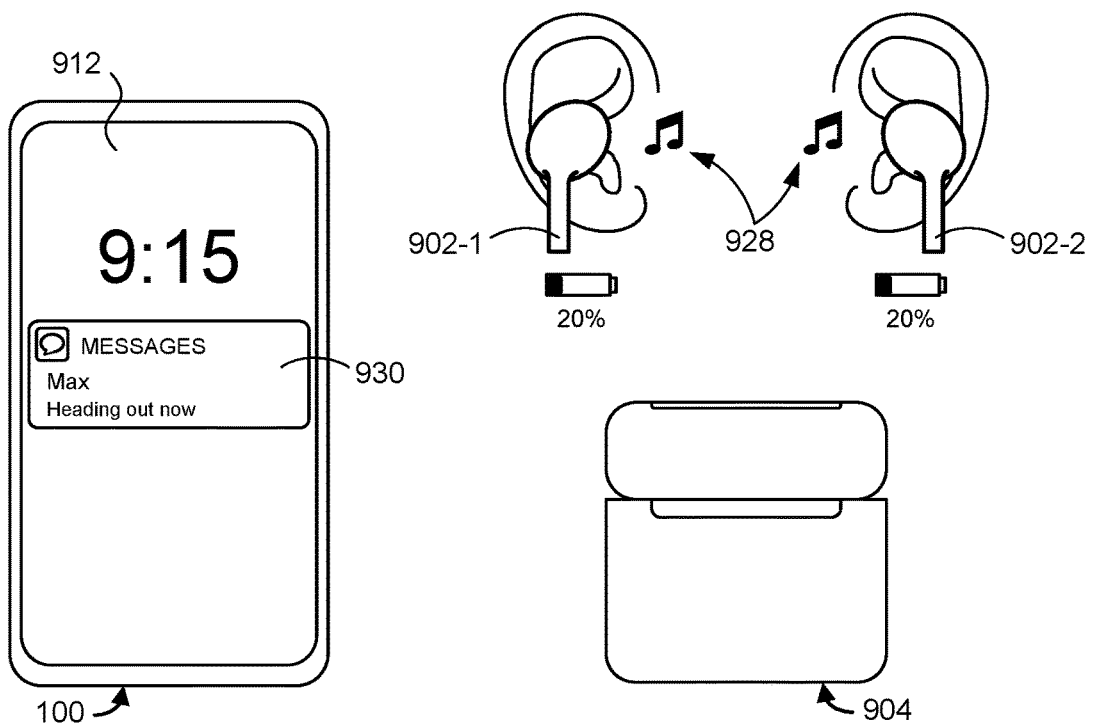

FIGS. 9I-9N illustrate example alerts for notifying a user of low battery charge levels for peripherals such as earbuds and cases. In FIG. 9I, earbuds 902 are placed in a user's ears and being used to listen to audio 928 (e.g., music). Device 100 displays lock screen user interface 912. In some embodiments, lock screen user interface 912 displays one or more notifications for events occurring at or received at device 100. In the example in FIG. 9I, lock screen user interface 912 includes a first notification 930.

Figure 9J:
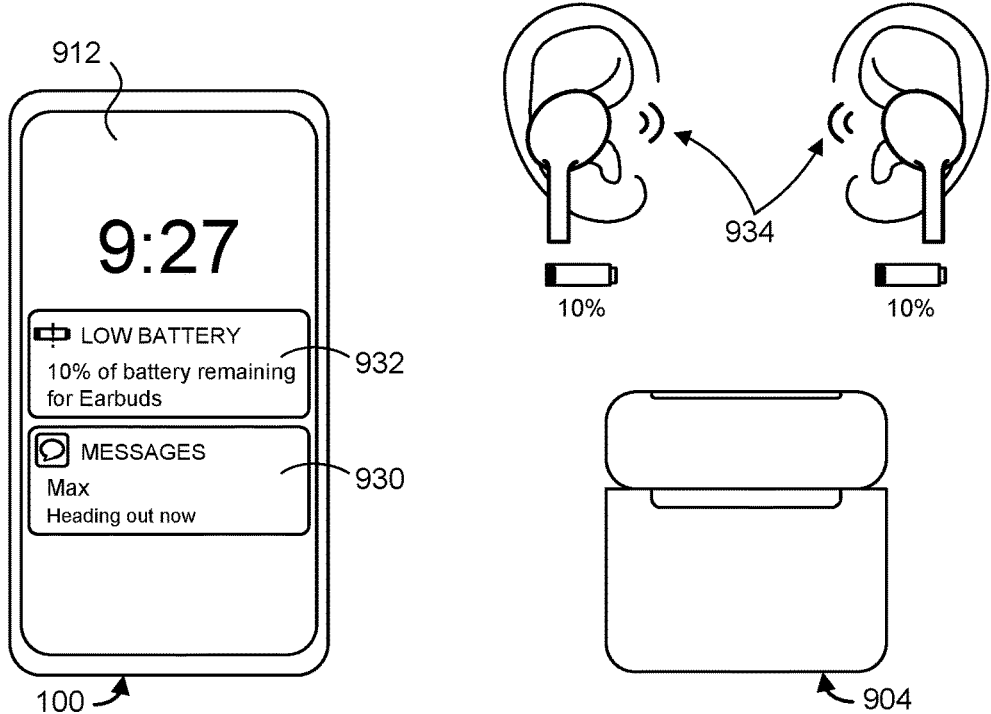

FIG. 9J illustrates a transition from FIG. 9I. FIG. 9J shows that time has elapsed since the scenario shown in FIG. 9I (e.g., as indicated by the clock in lock screen user interface 912). In the time elapsing between the scenario in FIG. 9I and the scenario in FIG. 9J, the battery of earbuds 902 decreased (e.g., through usage of earbuds 902 to play audio) from 20% (FIG. 9I) to 10% (FIG. 9J). In response to the battery level of earbuds 902 decreasing to a threshold low charge level (e.g., 10% in the example in FIG. 9J), device 100 displays second notification 932 (e.g., a low battery warning message for earbuds 902), visually alerting the user that the battery level of earbuds 902 is low and prompting the user to charge earbuds 902. Optionally, audio alert 934 is also played via earbuds 902 to alert the user that the battery level of earbuds 902 is low.

Figure 9K:
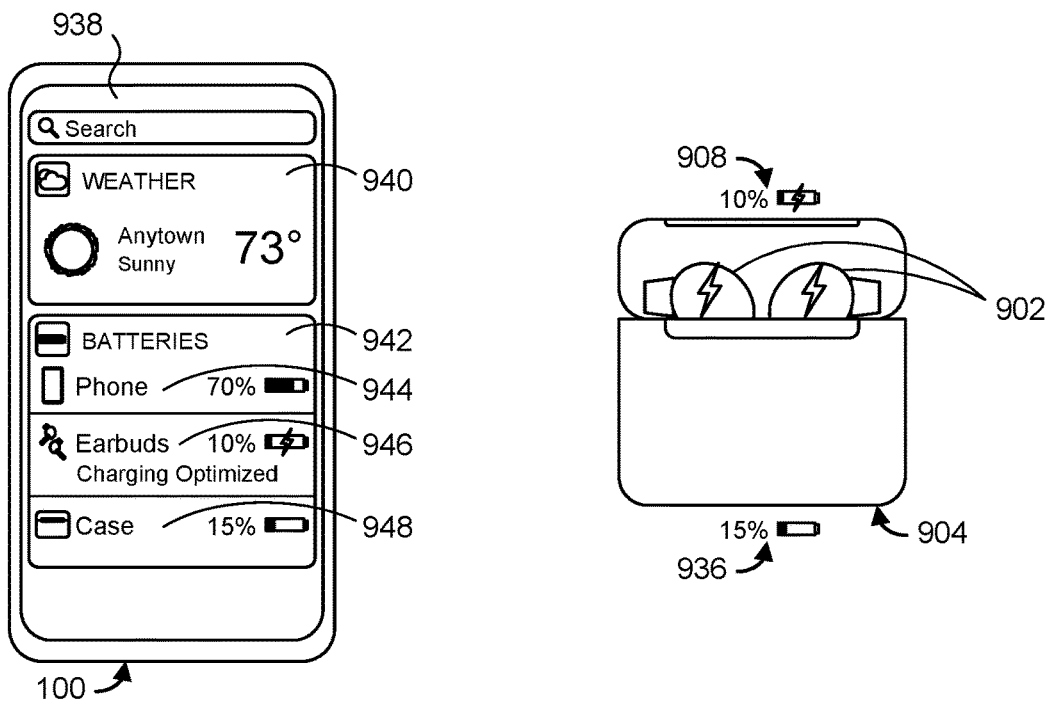

FIG. 9K illustrates a transition from FIG. 9J. FIG. 9K shows earbuds 902 placed inside case 904. Case 904 is charging the batteries of earbuds 902, as indicated by the charging icons over earbuds 902 and earbud charging status 908. The battery of case 904 is 15% charged, as indicated by case charging status 936. Device 100 displays widget user interface 938 in which different portions of the widget user interface (e.g., different widgets) display different types of information. For example, widget user interface 938 includes weather widget 940 (e.g., displaying weather information for a particular location, such as the current location of device 100) and batteries widget 942 (e.g., displaying battery information for device 100 and one or more peripherals in communication with device 100). In some embodiments, widget user interface 938 is accessible from lock screen user interface 112 using a swipe gesture (e.g., a right swipe gesture).

In FIG. 9K, batteries widget 942 includes battery status information 944 for device 100 (e.g., labeled "Phone"), battery status information 946 for earbuds 902 (e.g., labeled "Earbuds"), and battery status information 948 for case 904 (e.g., labeled "Case"). Battery status information 946 for earbuds 902 indicates the current charge level of earbuds 902, and also includes an indication that optimized charging of earbuds 902 is enabled. Battery status information 948 for case 904 indicates the current charge level of case 904.

Figure 9L:
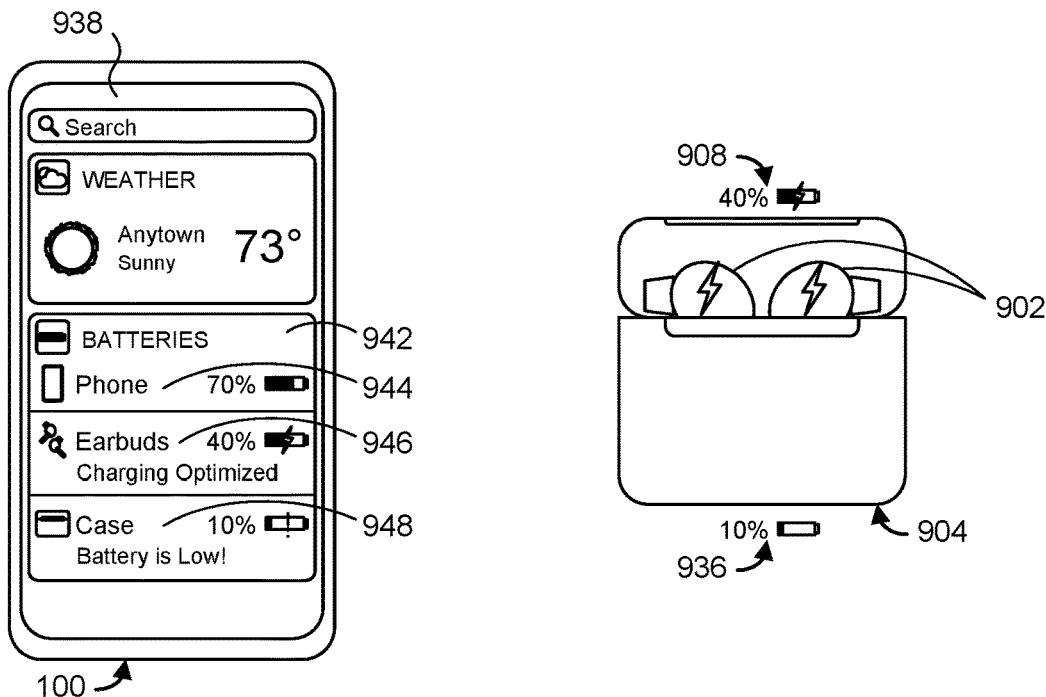

FIG. 9L illustrates a transition from FIG. 9K. FIG. 9L shows that earbuds 902 have been charged to a battery level of 40% by case 904. Because case 904 is not connected to a power source, charging earbuds 902 drains the battery of case 904. Accordingly, in the time elapsing between the scenario in FIG. 9K and the scenario in FIG. 9L, the battery level of case 904 decreased to a 10% charge level, as indicated by case charging status 936 in FIG. 9L. In response to the battery level of case 904 decreasing to a threshold low charge level (e.g., 10% in the example in FIG. 9L), battery status information 948 for case 904, displayed on device 100, is updated to include an indication that the battery level of case 904 is low, prompting the user to charge case 904.

Figure 9M:
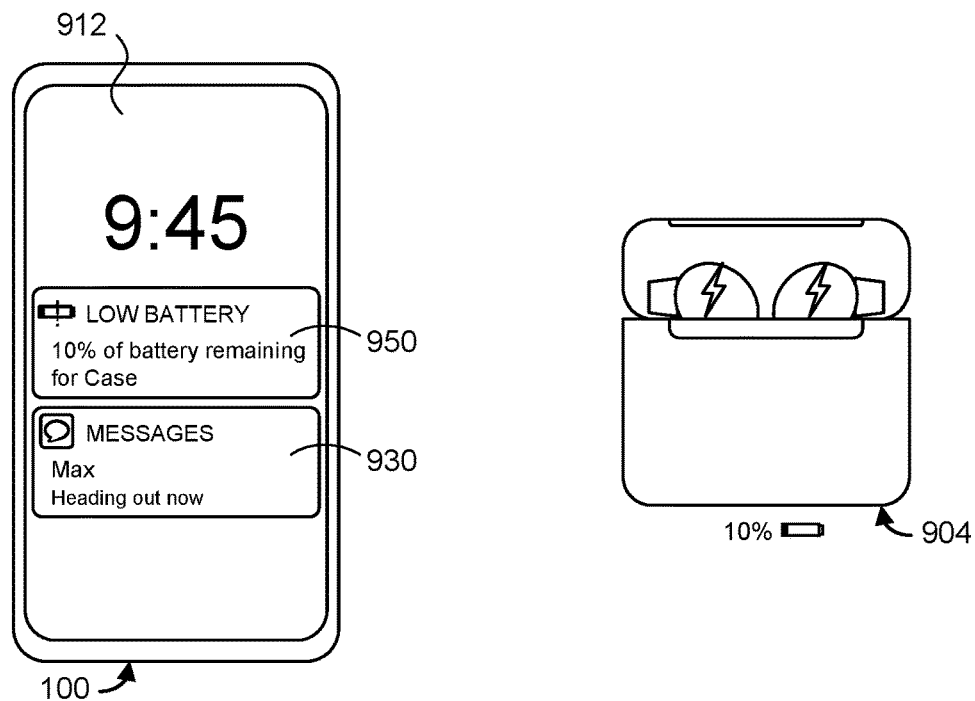
Figure 9N:
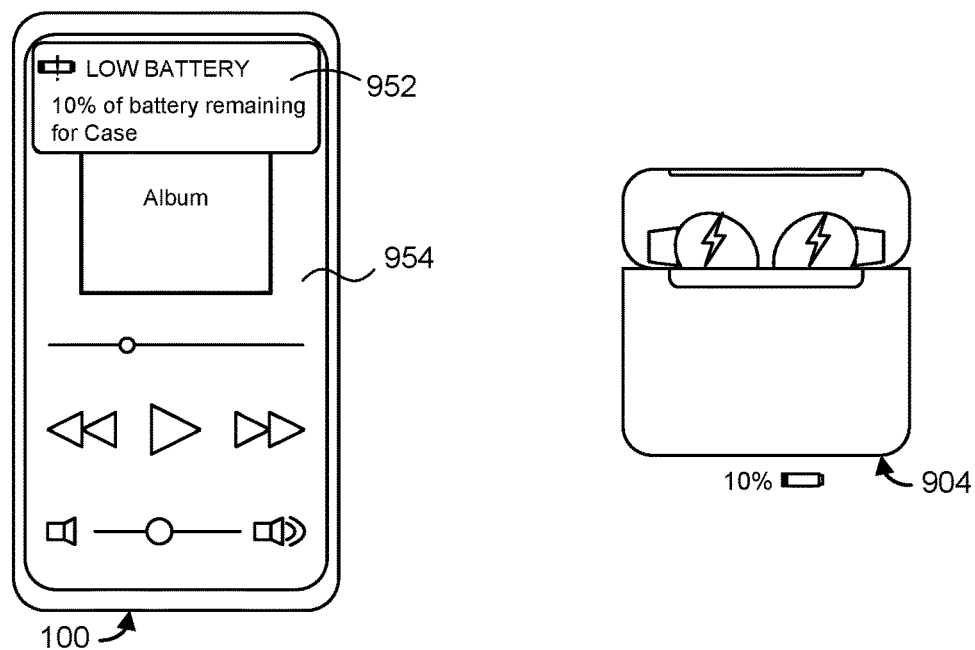

FIGS. 9M-9N illustrate other example ways of displaying a low battery alert for a peripheral (e.g., earbuds 902 or, in the example in FIGS. 9M-9N, case 904). In FIG. 9M, low battery notification 950 for case 904 is displayed in lock screen user interface 912. In FIG. 9N, low battery notification 952 is displayed over a portion of music playback user interface 954 displayed on device 100. Optionally, low battery notification 952 is displayed temporarily, and ceases to be displayed after a period of time.

Figure 9O:
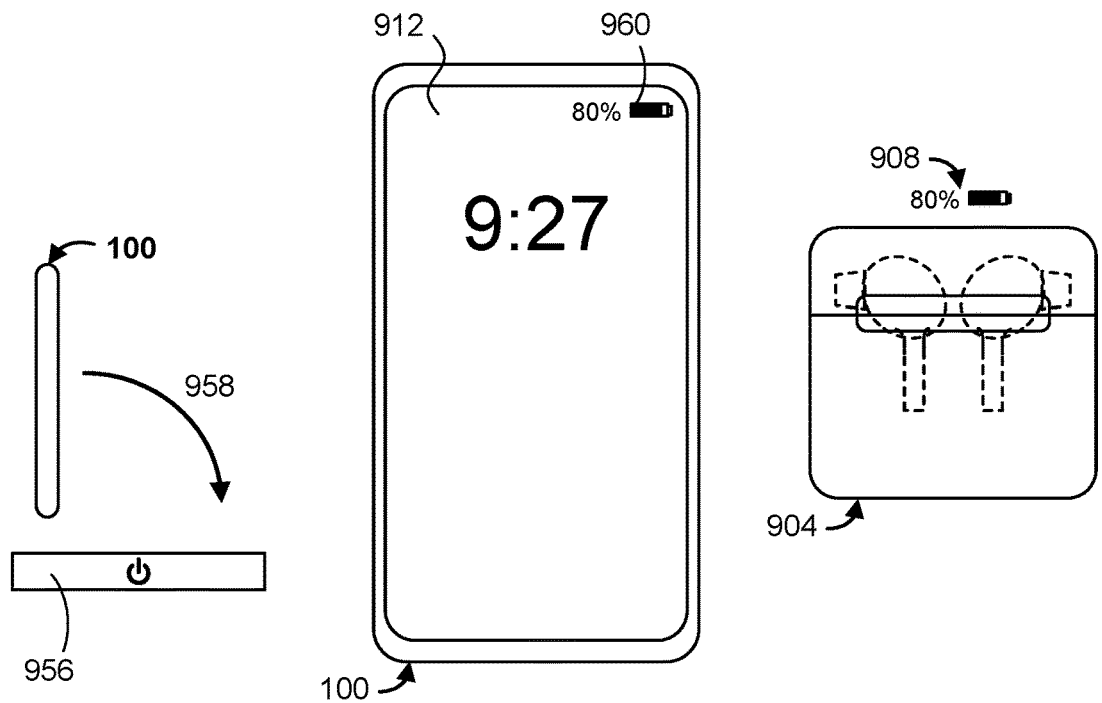

FIGS. 9O-9V illustrate example user interfaces displayed in response to connecting devices and peripherals to power sources. FIG. 9O shows a profile view of device 100 being placed on charging pad 956 (e.g., a power source for charging device 100, such as a wireless charging pad), according to the motion indicated by arrow 958. Alternatively in some embodiments, device 100 is coupled to a power source via a wired connection. FIG. 9O also shows a front view of device 100 displaying lock screen user interface 912. The battery level of device 100 is 80%, as indicated by device charging status 960 (e.g., optionally displayed in lock screen user interface 912). In addition, in FIG. 9O, earbuds 902 are in case 904. In the example in FIG. 9O, earbuds 902 are not being charged by case 904 because optimized charging of earbuds 902 is enabled, and earbuds 902 are already at the threshold charge level for optimized charging (e.g., 80% charge level, as indicated by earbud charging status 908).

Figure 9P:
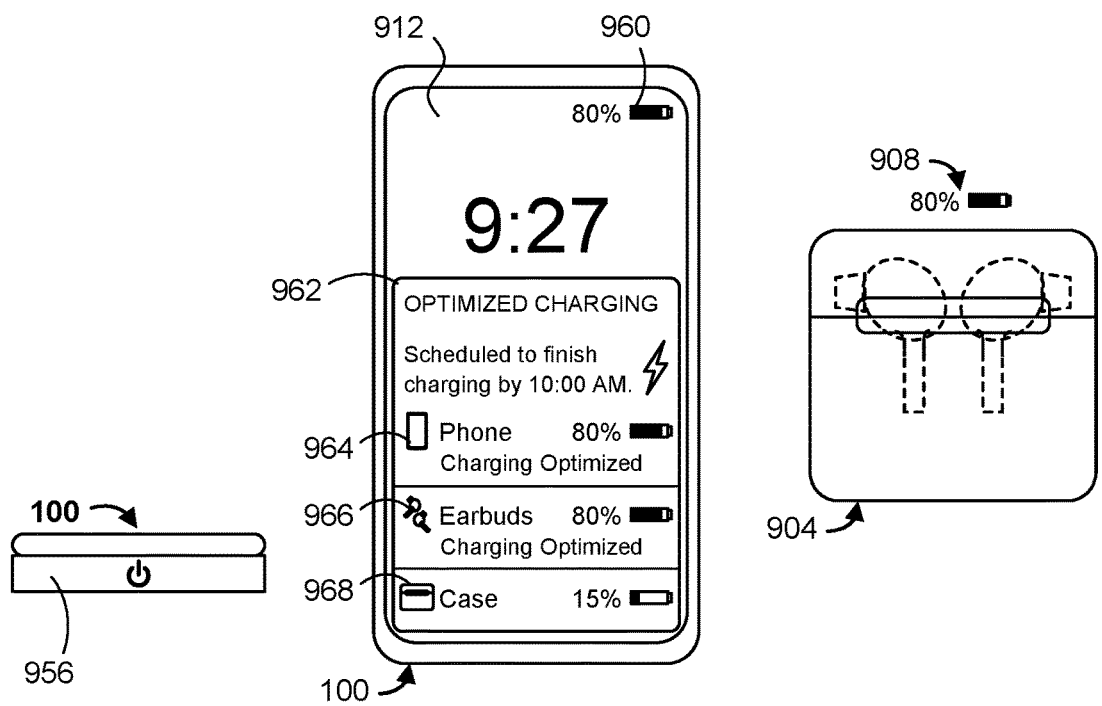

FIG. 9P illustrates a transition from FIG. 9O. In FIG. 9P, in response to device 100 being placed on charging pad 956 (e.g., coupled to a power source for charging device 100), device 100 displays optimized charging user interface 962 (e.g., optionally displayed over a portion of lock screen user interface 912). Optimized charging user interface 962 includes a brief description of the optimized charging feature (e.g., the text "Scheduled to finish charging by 10:00 AM," indicating that, for the devices for which optimized charging is enabled, charging of those devices is being controlled so that those devices finish charging to full at a particular time). Optimized charging user interface 962 also includes battery status information 964 for device 100, battery status information 966 for earbuds 902, and battery status information 968 for case 904.

Battery status information 964 for device 100 indicates that optimized charging of device 100 is enabled. Accordingly, although device 100 is placed on charging pad 956 (e.g., coupled to a power source for charging device 100), other criteria for charging device 100 to full, while optimized charging is enabled, are not met (e.g., the scheduled time for optimized charging to be completed is not yet reached, and the optimized charging has not been overridden or disabled). Thus, device 100 in FIG. 9P is not charging, and the battery level of device 100 is maintained at the threshold charge level for optimized charging (e.g., 80% charge level, as indicated by device charging status 960).

Similarly, battery status information 966 for earbuds 902 indicates that optimized charging of device 100 is enabled. Accordingly, although earbuds 902 are placed in case 904 (e.g., coupled to a power source for charging earbuds 902), other criteria for charging earbuds 902 to full, while optimized charging is enabled, are not met (e.g., the scheduled time for optimized charging to be completed is not yet reached, and the optimized charging has not been overridden or disabled). Thus, earbuds 902 in FIG. 9P are not charging, and the battery level of earbuds 902 is maintained at the threshold charge level for optimized charging (e.g., 80% charge level, as indicated by earbud charging status 908).

Figure 9Q:
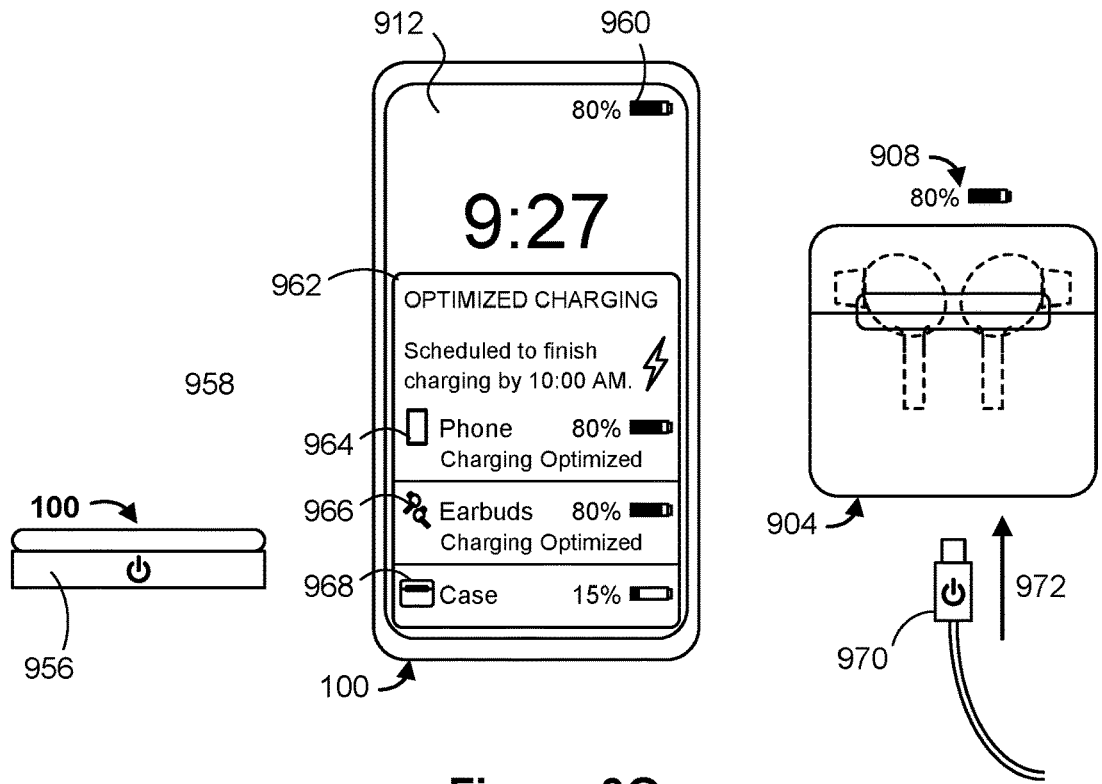

FIG. 9Q illustrates a transition from FIG. 9P. FIG. 9Q shows case 904 being connected to a power source using power cable 970, according to the motion indicated by arrow 972. Alternatively in some embodiments, case 904 can be charged wirelessly and is coupled to a power source via a wireless connection (e.g., by placing case 904 onto a charging pad, such as charging pad 956, that is capable of transmitting power to case 904 wirelessly).

Figure 9R:
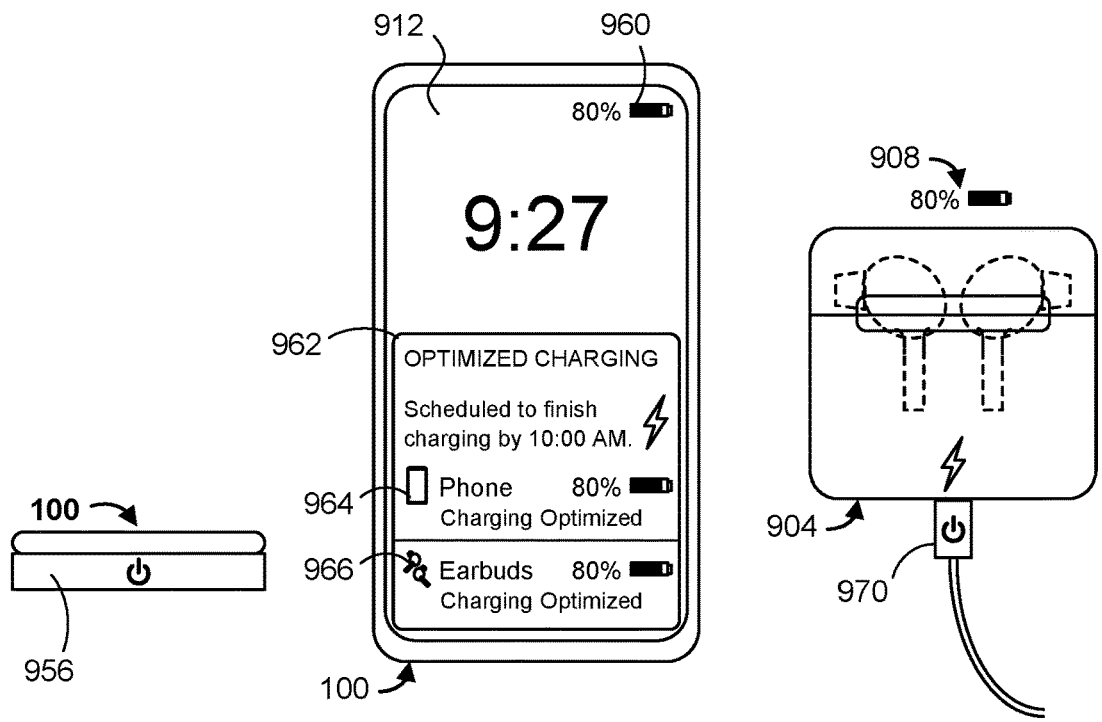

FIG. 9R illustrates a transition from FIG. 9Q. FIG. 9R illustrates an example embodiment in which, in response to case 904 being connected to a power source using power cable 970, case 904 begins charging, as represented by the charging icon at the bottom of case 904 (e.g., included in FIG. 9R for illustrative purposes, and not necessarily displayed on case 904 itself). In addition, device 100 ceases to display battery status information 968 for case 904 in optimized charging user interface 962. In some embodiments, device 100 continues to display battery status information 968 in optimized charging user interface 962, and the battery status for case 904 in battery status information 968 is updated to include a charging icon (e.g., to indicate that case 904 is charging). In some circumstances, case 904 begins charging in response to being connected to power cable 970 because optimized charging for case 904 is unavailable (e.g., in embodiments where case 904 does not support the optimized charging feature) or disabled.

Figure 9S:
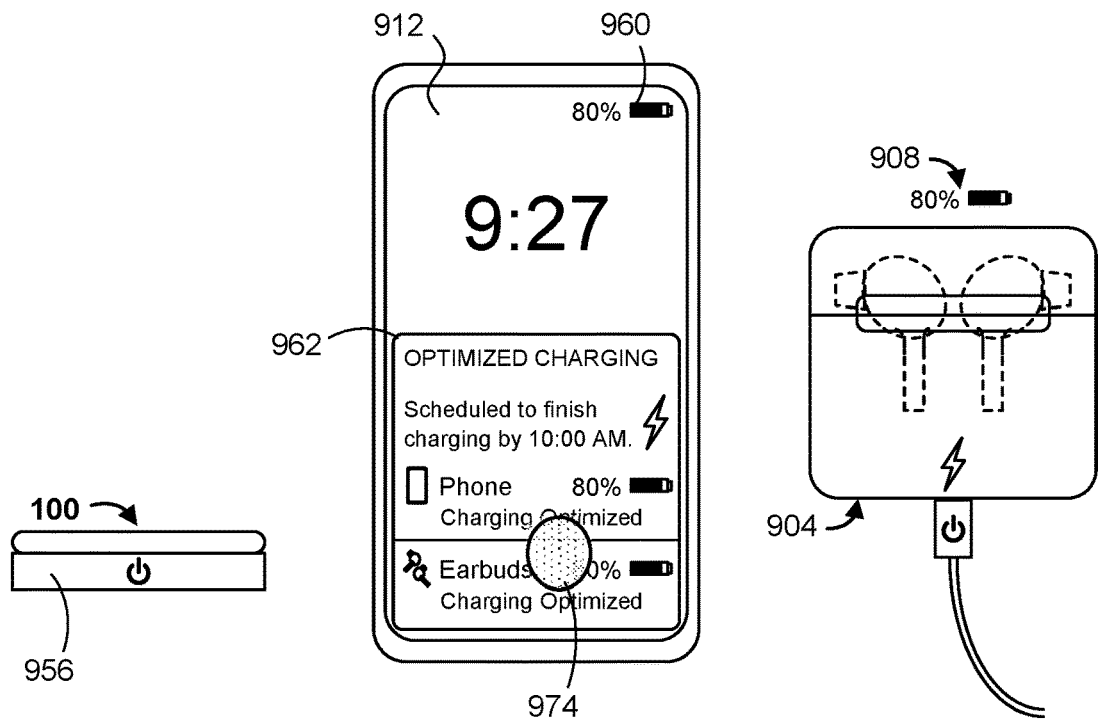

FIG. 9S illustrates a transition from FIG. 9R. In particular, FIG. 9S shows input 974 corresponding to optimized charging user interface 962 (e.g., a tap input, long press input, or intensity-based press input on a touchscreen of device 100 at the location of displayed optimized charging user interface 962).

Figure 9T:
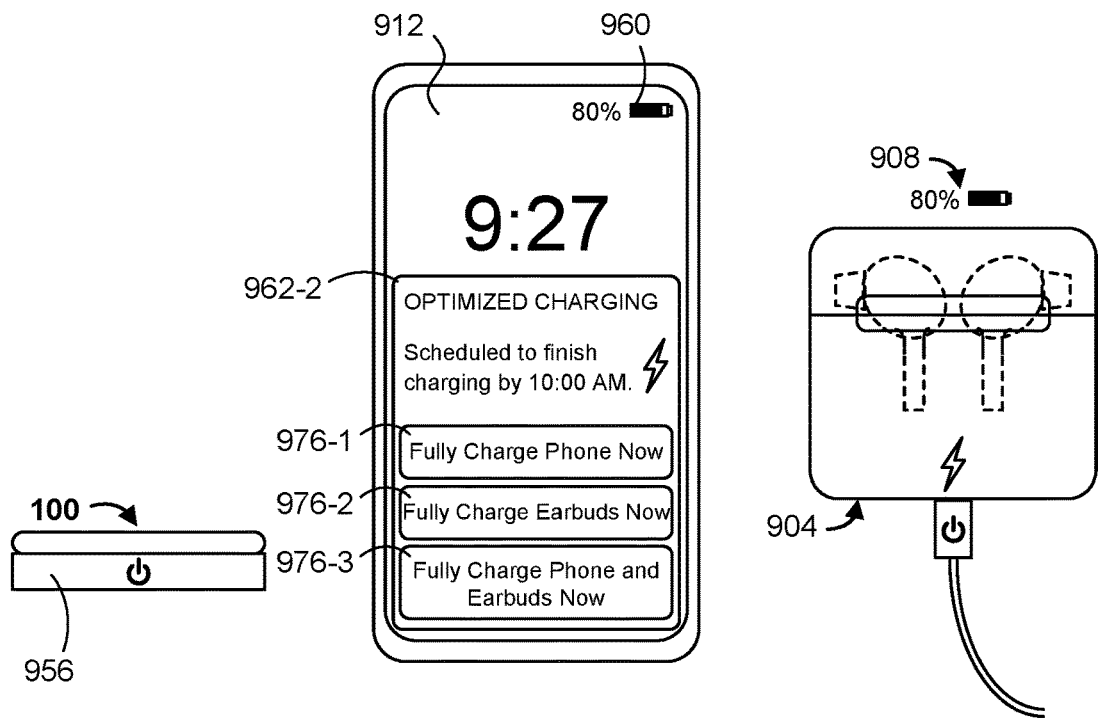

FIG. 9T illustrates a transition from FIG. 9S. In response to input 974 on optimized charging user interface 962 (e.g., which previously displayed battery status information 964 for device 100, and battery status information 966 for earbuds 902), optimized charging user interface 962 is updated to include optimized charging override options. In particular, in FIG. 9T, optimized charging user interface 962-2 includes optimized charging override button 976-1 (e.g., labeled "Fully Charge Phone Now"), which, when activated, disables the optimization of the charging of device 100 and, if other charging criteria are met, initiates charging of device 100 to a fully charged state. Optimized charging user interface 962-2 also includes optimized charging override button 976-2 (e.g., labeled "Fully Charge Earbuds Now"), which, when activated, disables the optimization of the charging of earbuds 902 and, if other charging criteria are met, initiates charging of earbuds 902 to a fully charged state. In addition, optimized charging user interface 962-2 includes optimized charging override button 976-3 (e.g., labeled "Fully Charge Phone and Earbuds Now"), which, when activated, disables both the optimization of the charging of device 100 and the optimization of the charging of earbuds 902. In some embodiments, optimized charging override button 976-1 is included in optimized charging user interface 962-2 in accordance with a determination that optimized charging for device 100 is currently enabled. Similarly, in some embodiments, optimized charging override button 976-2 is included in optimized charging user interface 962-2 in accordance with a determination that optimized charging for earbuds 902 is currently enabled; and in some embodiments, optimized charging override button 976-3 is included in optimized charging user interface 962-2 in accordance with a determination that optimized charging for both device 100 and earbuds 902 is currently enabled.

Figure 9U:
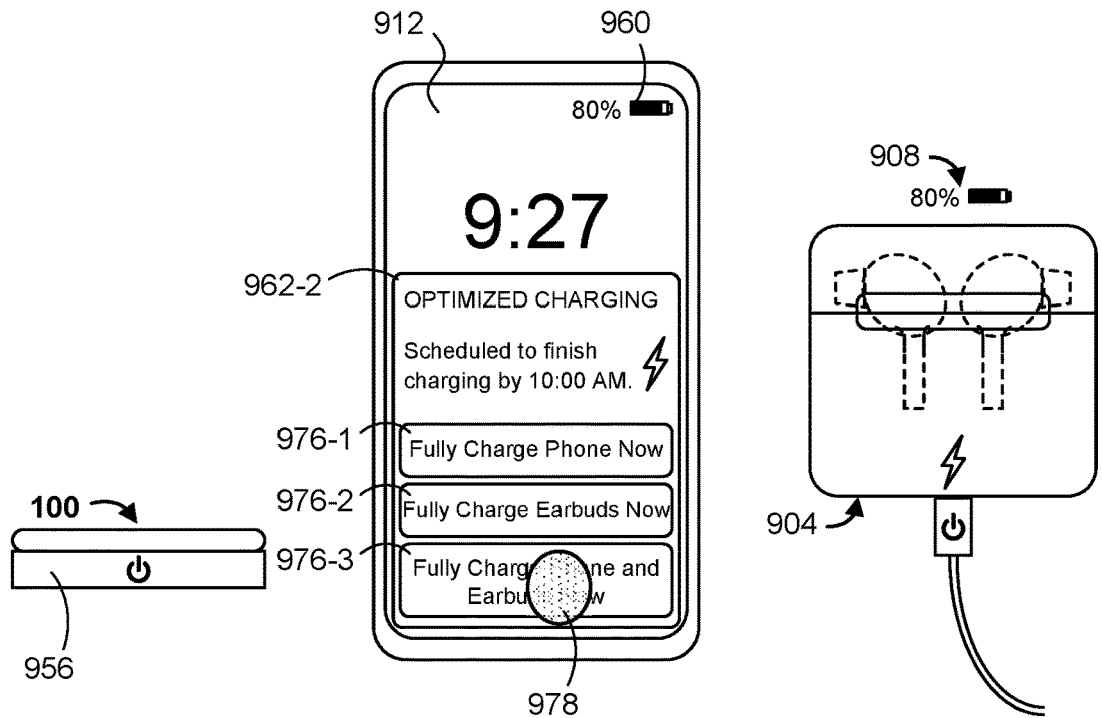

FIG. 9U illustrates a transition from FIG. 9T. In particular, FIG. 9U shows input 978 corresponding to optimized charging override button 976-3 for disabling optimized charging of device 100 and of earbuds 902 (e.g., a tap input on a touchscreen of device 100 at the location of displayed optimized charging override button 976-3).

Figure 9V:
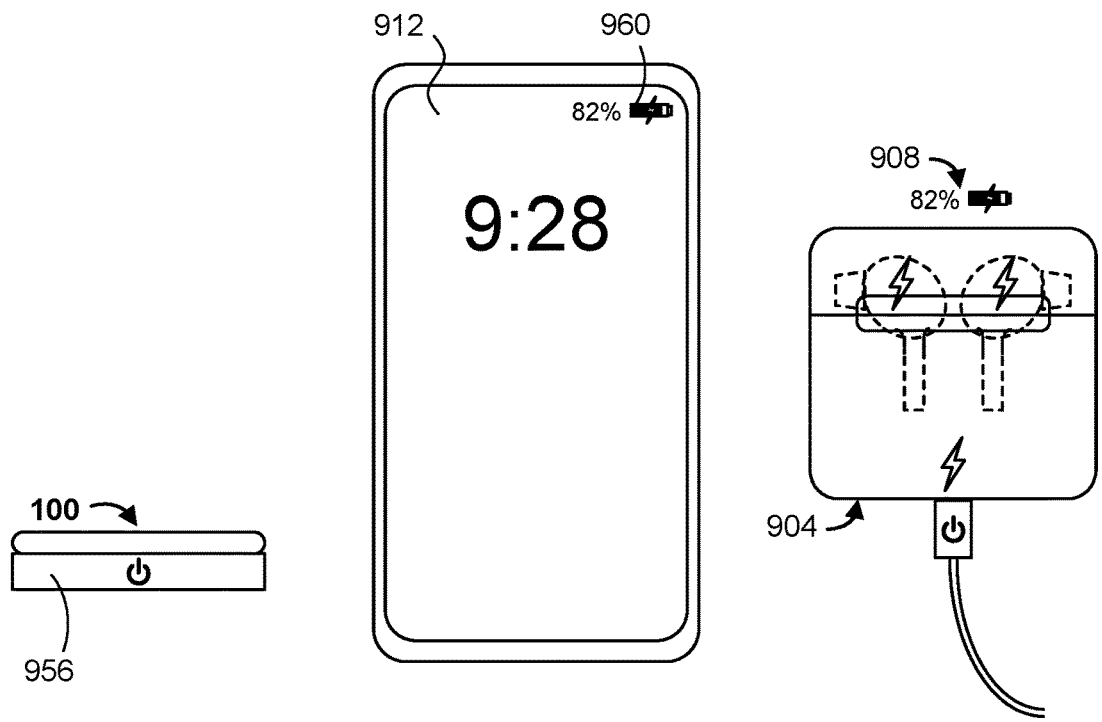

FIG. 9V illustrates a transition from FIG. 9U. In response to input 978 corresponding to optimized charging override button 976-3, optimized charging of device 100 and of earbuds 902 is disabled. Accordingly, device 100 begins charging via charging pad 956 (e.g., without regard to whether the scheduled time for optimized charging to be completed has been reached). In particular, device charging status 960 includes a charging icon and indicates an increase in the battery charge level of device 100 in the time elapsing between the scenario in FIG. 9U and the scenario in FIG. 9V (e.g., as indicated by the clock in lock screen user interface 912). Similarly, earbud charging status 908 also includes a charging icon and indicates an increase in the battery charge level of earbuds 902 in the time elapsing between the scenario in FIG. 9U and the scenario in FIG. 9V. FIG. 9V also shows charging icons over earbuds 902, to indicate that earbuds 902 are charging.

Figure 9W:
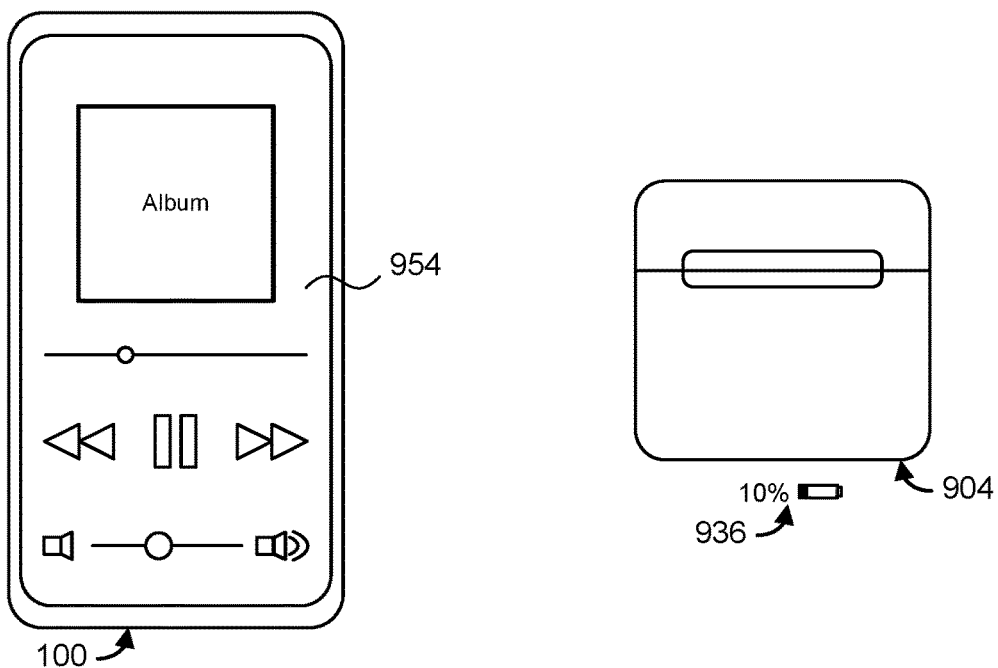

FIGS. 9W-9AD illustrate example user interactions associated with providing alerts for notifying a user of low battery charge levels for peripherals, such as the example alerts described herein with reference to FIGS. 9I-9N.

Figure 9X:
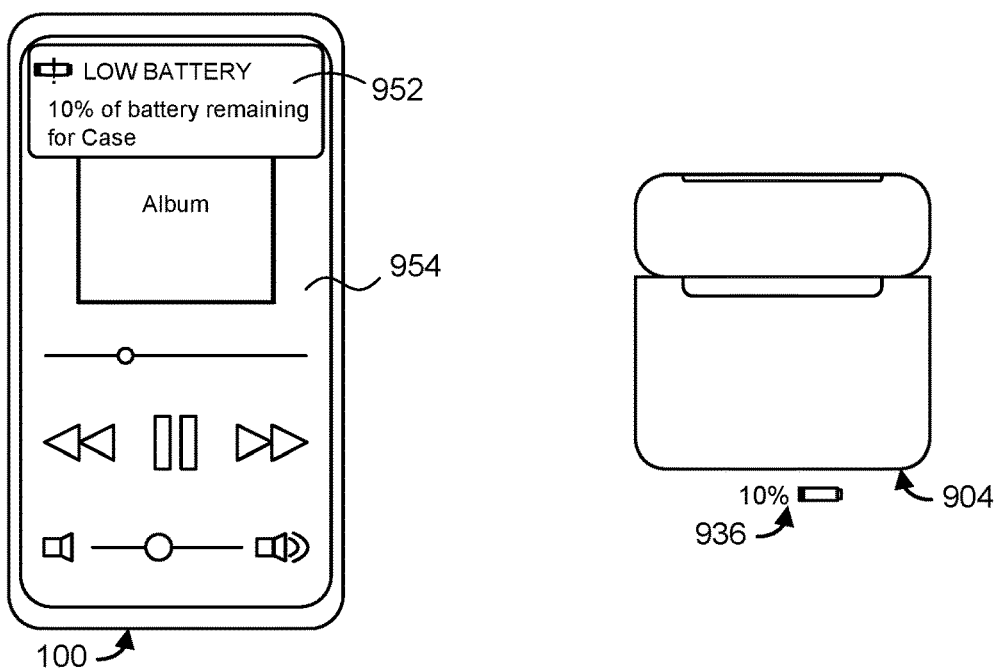

FIGS. 9W-9X illustrate providing a low battery alert in response to detecting opening of case 904. FIG. 9W shows device 100 and case 904, which are in communication with each other. Case charging status 936 indicates that the battery of case 904 is 10% charged. In the example in FIG. 9W, earbuds 902 are not positioned inside case 904.

FIG. 9X illustrates a transition from FIG. 9W. FIG. 9X shows that case 904 has been opened (e.g., the lid of case 904 has been lifted). In accordance with a determination that the battery level of case 904 is at or below a threshold low charge level (e.g., 10% in the example in FIG. 9X), and in response to case 904 being opened, device 100 displays low battery notification 952 over a portion of music playback user interface 954 displayed on device 100. With respect to the low battery notifications shown in FIGS. 9X-9AD, one of ordinary skill will recognize that other ways of displaying a low battery notification, such as those described herein with reference to FIGS. 9I-9N, may be used.

Figure 9Y:
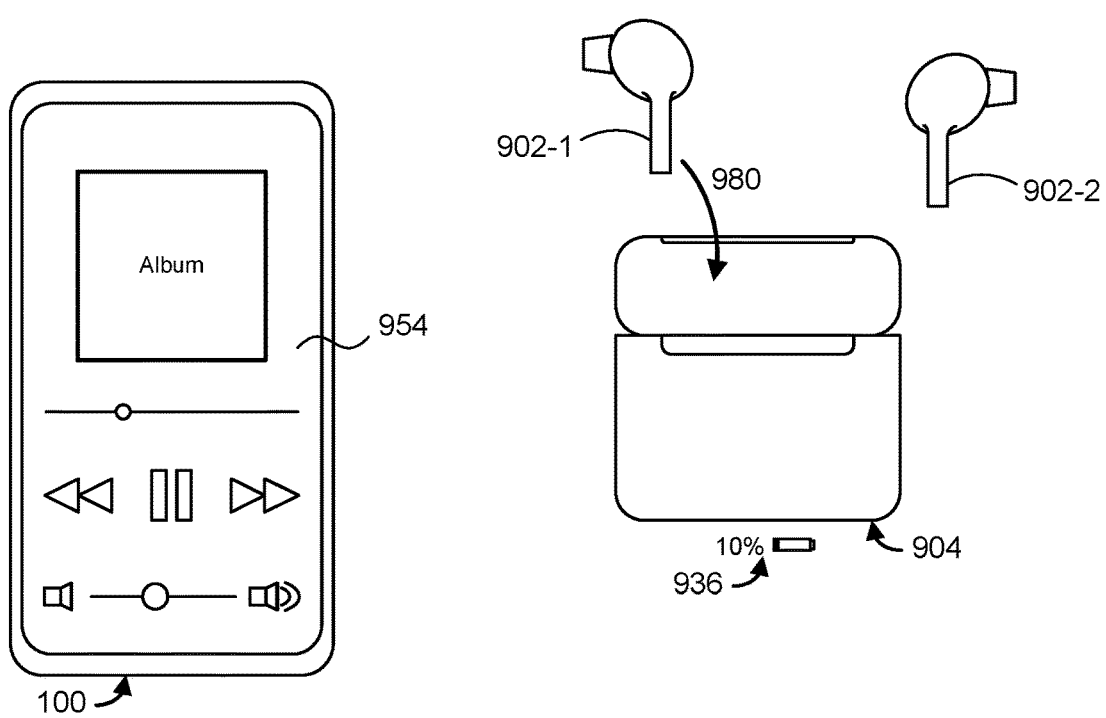
Figure 9Z:
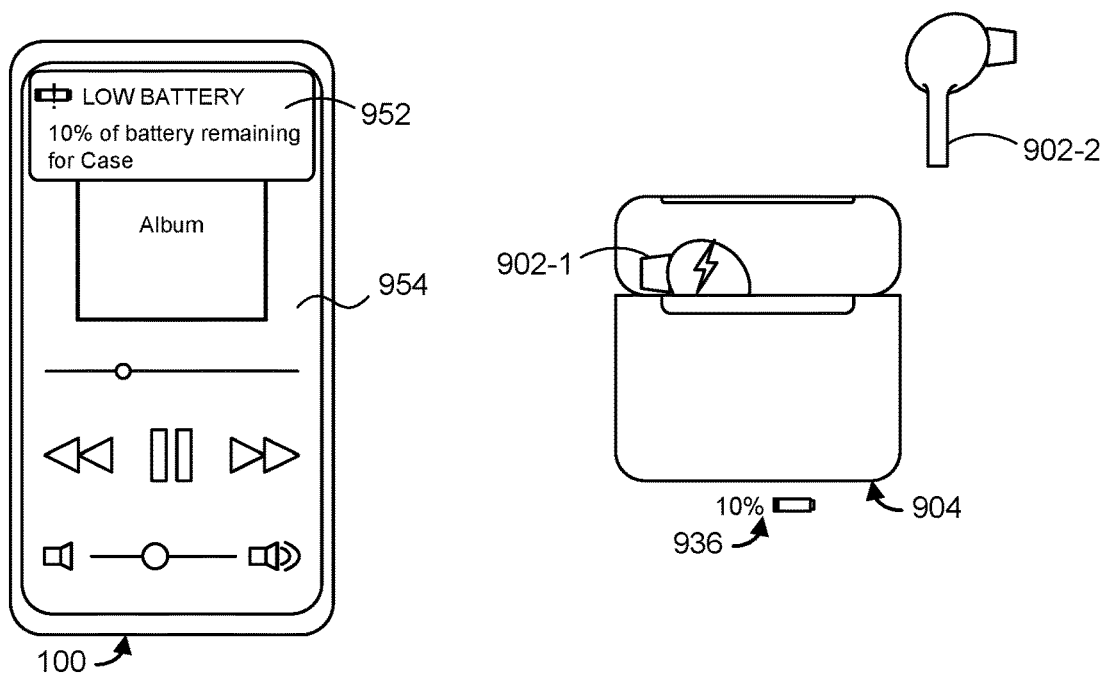
Figure 9A:
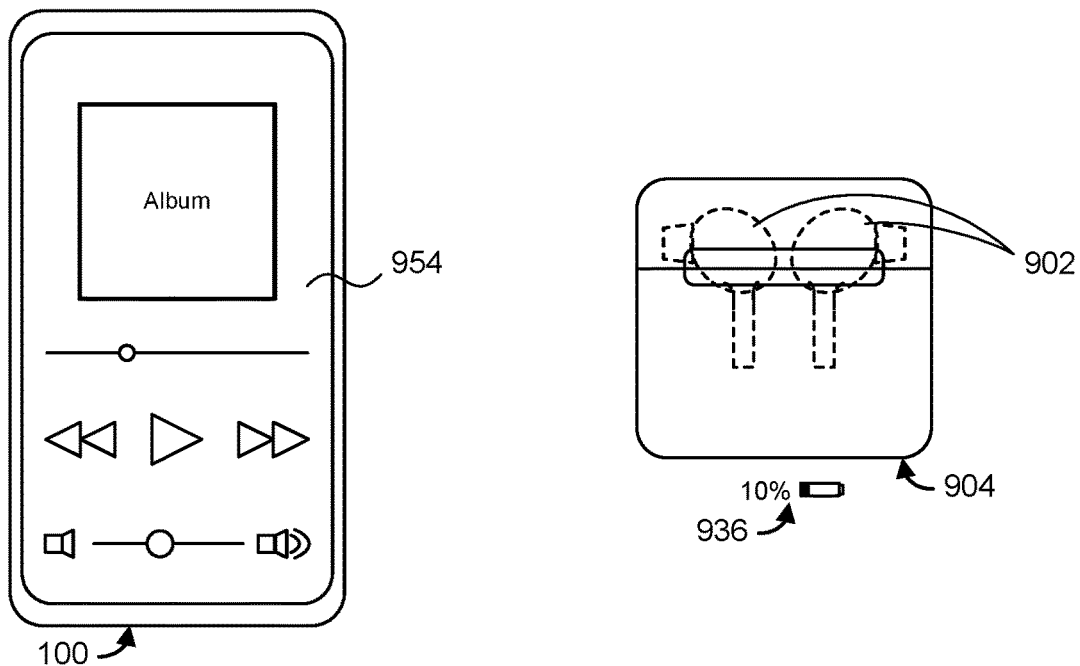
Figure 9A:
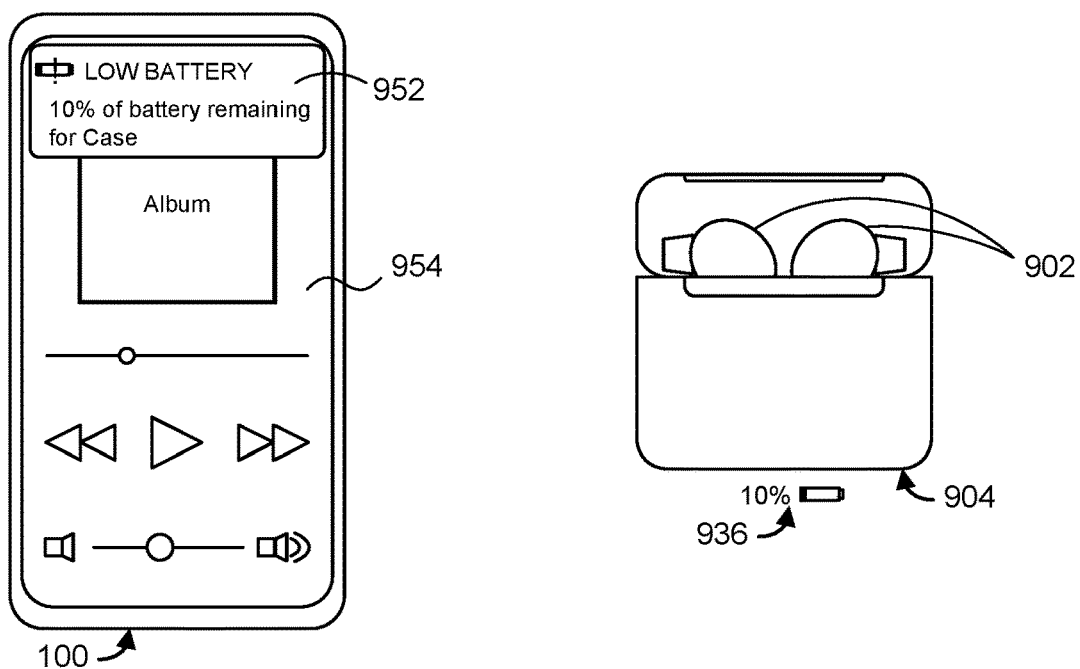
Figure 9A:
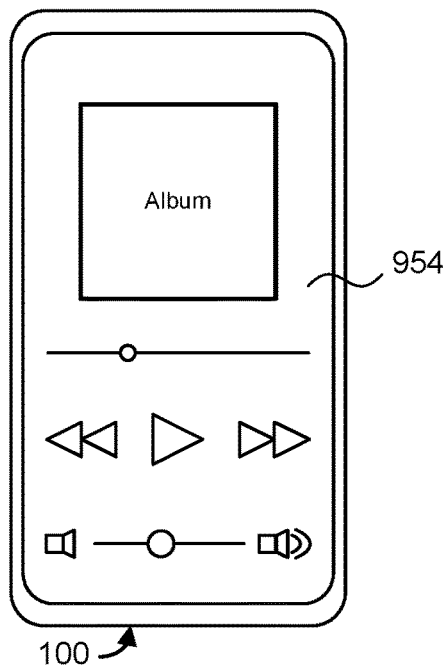
Figure 9A:
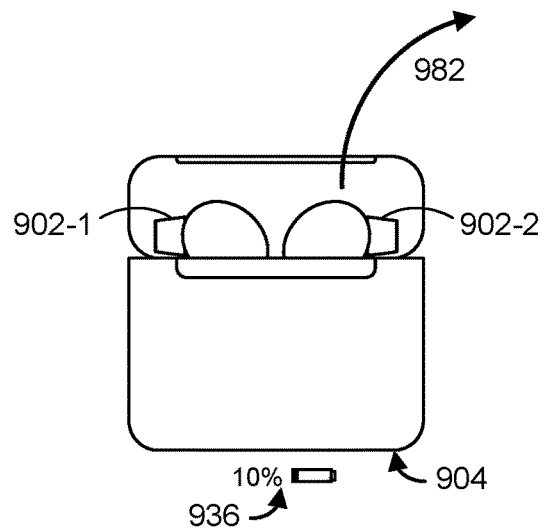
Figure 9A:
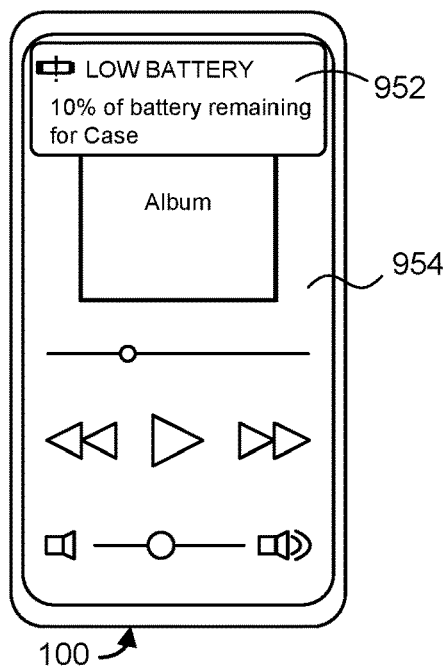
Figure 9A:
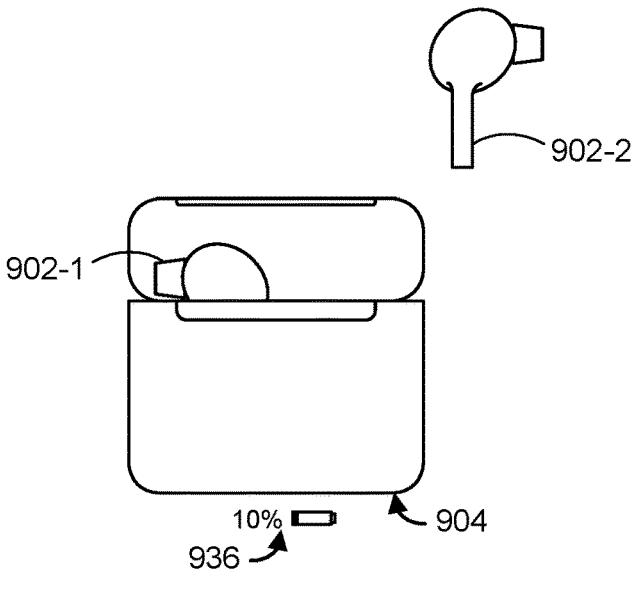

FIGS. 9Y-9Z illustrate providing a low battery alert in response to detecting placement of an earbud 902-1 in case 904. FIG. 9Y shows earbuds 902 outside of case 904. Case charging status 936 indicates that the battery of case 904 is 10% charged.

FIG. 9Z illustrates a transition from FIG. 9Y. FIG. 9Z shows that earbud 902-1 has been placed inside case 904, according to the motion indicated by arrow 980 in FIG. 9Y, and is being charged by case 904. In accordance with a determination that the battery level of case 904 is at or below a threshold low charge level (e.g., 10% in the example in FIG. 9Z), and in response to detecting the placement of earbud 902-1 into case 904, device 100 displays low battery notification 952. In the example in FIG. 9Z, low battery notification 952 is displayed in response to detecting placement of one earbud (e.g., earbud 902-1) into case 904 (e.g., due to case 904 needing sufficient charge with which to charge replaced earbud 902-1, and/or in anticipation of case 904 needing sufficient charge with which to eventually charge the other earbud 902-2 after earbud 902-2's battery has been discharged with use and earbud 902-2 has been replaced in case 904 for charging). Alternatively in some embodiments, display of a low battery notification requires both earbuds 902 to be placed inside case 904.

FIGS. 9AA-9AB illustrate providing a low battery alert in response to detecting opening of case 904 while earbuds 902 are inside case 904. FIG. 9AA shows earbuds 902 positioned inside case 904, and case 904 closed. Case charging status 936 indicates that the battery of case 904 is 10% charged. In the example shown in FIGS. 9AA-9AB, earbuds 902 are not being charged by case 904 (e.g., because earbuds 902 are already fully charged). In some circumstances, where earbuds 902 are not fully charged, earbuds 902 are charged by case 904 while positioned inside case 904.

FIG. 9AB illustrates a transition from FIG. 9AA. FIG. 9AB shows that case 904 has been opened (e.g., the lid of case 904 has been lifted). In accordance with a determination that the battery level of case 904 is at or below a threshold low charge level (e.g., 10% in the example in FIG. 9AB), and in response to case 904 being opened, device 100 displays low battery notification 952. In the example in FIG. 9AB, low battery notification 952 is displayed in response to detecting the opening of case 904 and in accordance with a determination that both earbuds 902 are positioned inside case 904 when case 904 is opened. Alternatively in some embodiments, display of a low battery notification requires at least one earbud of earbuds 902 (e.g., but not necessarily both earbuds 902) to be inside case 904.

FIGS. 9AC-9AD illustrate providing a low battery alert in response to detecting removal of an earbud 902-2 from case 904. FIG. 9AC shows earbuds 902 positioned inside case 904. Case charging status 936 indicates that the battery of case 904 is 10% charged.

FIG. 9AD illustrates a transition from FIG. 9AC. FIG. 9AD shows that earbud 902-2 has been removed from case 904, according to the motion indicated by arrow 982 in FIG. 9AC. In accordance with a determination that the battery level of case 904 is at or below a threshold low charge level (e.g., 10% in the example in FIG. 9AD), and in response to detecting the removal of earbud 902-2 from case 904, device 100 displays low battery notification 952. In the example in FIG. 9AD, low battery notification 952 is displayed in response to detecting removal of one earbud (e.g., earbud 902-2) from case 904 (e.g., in anticipation of case 904 needing sufficient charge with which to eventually charge removed earbud 902-2 after earbud 902-2's battery has been discharged with use and earbud 902-2 has been replaced in case 904 for charging). Alternatively in some embodiments, display of a low battery notification requires both earbuds 902 to be removed from case 904.

In some embodiments, in response to one or more of the user interactions described herein with reference to FIGS. 9W-9AD, case 904 transmits information, such as information about the battery level of case 904, to device 100, optionally via earbuds 902. In some embodiments, device 100 does not receive current battery level information about case 904 unless one or more of the described user interactions occurs. For example, case 904 transmits information in response to its lid being opened (or in response to another condition, such as a low battery condition, being met while its lid is open), and/or in response to one or more earbuds 902 being placed in or removed from case 904, and forgoes transmitting the battery level information at other times (e.g., case 904 only transmits the battery level information when the lid is open). This reduces how often case 904 transmits information, thereby reducing power usage by case 904 and improving battery life of case 904 as well as any earbuds that case 904 may be used to recharge. In some embodiments, device 100 receives current battery level information about a peripheral such as one or both earbuds 902 and/or case 904 without regard to whether one or more of the described user interactions has occurred (e.g., earbuds 902 and/or case 904 transmits information to device 100 even if one or more of the described user interactions has not occurred), and in some such embodiments, low battery notifications are provided without requiring any of the described user interactions.

FIGS. 10A-10C are flow diagrams illustrating method 1000 of charging devices and connected peripheral audio output devices in accordance with some embodiments. Method 1000 is performed at an electronic device (e.g., portable multifunction device 100 (FIG. 1A) or device 300 (FIG. 3A)) with a display (e.g., touch-sensitive display system 112 in FIG. 1A or display 340 in FIG. 3A) and an input device (e.g., a touch-sensitive surface, such as touch-sensitive display system 112 in FIG. 1A or touchpad 355 in FIG. 3A). The electronic device is capable of wireless communication with a set of peripherals that includes a first peripheral (e.g., a wearable audio output device such as wearable audio output device 301 (FIG. 3B), optionally including one or more peripheral components, such as one or more (e.g., a pair of) earbuds, as illustrated for example by earbuds 902 (FIG. 9A)) and a second peripheral (e.g., a case for the earbuds, as illustrated for example by case 904 (FIG. 9A)). Some operations in method 1000 are, optionally, combined and/or the order of some operations is, optionally, changed.

As described herein, method 1000 limits charging of the battery of a device (e.g., a peripheral) to a level below a charge limit of the battery until criteria for fully charging the battery to the charge limit have been met (e.g., by manual user request or in anticipation of a time when the user typically begins using the device after a period of non-use). Keeping a battery in a fully charged state can place stress on the battery and cause the battery performance and capacity to degrade over time, so maintaining the battery charge level below the charge limit at times when the user does not need the battery to be fully charged reduces such strain and degradation, and improves battery health and capacity over the long run. In addition, the battery charging optimization provided by method 1000 is performed by the device, without requiring a user to manually regulate battery charging (e.g., by repeatedly turning on the display to monitor the charge level of the battery and manually connecting and disconnecting a charger as needed). Performing an operation (e.g., automatically) when a set of conditions has been met without requiring further user input enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

While the electronic device is in wireless communication with a set of peripherals that includes a first peripheral (e.g., including one or more peripheral components, such as one or more (e.g., a pair of) earbuds) and a second peripheral (e.g., a case for the earbuds), and in accordance with a determination that the first peripheral satisfies charging criteria that require that the first peripheral is coupled (e.g., physically, electrically, magnetically, etc.) with the second peripheral (1002), the electronic device performs one or more operations. For example, in FIG. 9B, device 100 is in wireless communication with earbuds 902 and with case 904, and earbuds 902 are coupled with case 904 by being placed inside case 904. In some embodiments, the charging criteria require that both of a pair of earbuds be coupled with the case. In some embodiments, the charging criteria require that at least one of the pair of earbuds be coupled with the case. In some embodiments, information about the coupling state between the first and second peripherals is transmitted to the electronic device by the set of peripherals.

The one or more operations include initiating (1004) charging of the first peripheral, by the second peripheral, to a first threshold charge level that is less than a charge limit (e.g., a maximum charge level) of the first peripheral (e.g., the electronic device transmits instructions to the second peripheral to charge the first peripheral to at most the first threshold charge level). In some embodiments, the first threshold charge level is substantially less than the charge limit (e.g., a respective charge level between 50% and 90% of the charge limit, such as 70%, 75%, 80%, etc.). For example, FIGS. 9B-9E illustrate charging of earbuds 902 by case 904 to a threshold charge level that is an 80% charge level.

The one or more operations include, in accordance with a determination (e.g., in response to determining) that charging completion criteria for the first peripheral are met (1006): initiating (1008) charging of the first peripheral, by the second peripheral, to the charge limit (e.g., a maximum charge level) of the first peripheral.

In some embodiments, the charging completion criteria (e.g., for a respective device) require that the first peripheral is coupled (e.g., physically, electrically, magnetically, etc.) with the second peripheral (e.g., in FIG. 9F, earbuds 902 are coupled to case 904). In some embodiments, the charging completion criteria for the first peripheral include a requirement that the electronic device receives an input requesting further charging of the first peripheral (e.g., in FIG. 9F, device 100 receives input 926 requesting that earbuds 902 be charged beyond the threshold charge level to full). In some embodiments, the charging completion criteria for the first peripheral include a requirement that the first peripheral is in a respective context (e.g., a particular time of day, as indicated in FIG. 9P, and/or a geographical location, such as a location that a user has specified as his home or office). In some embodiments, the charging completion criteria for the first peripheral are based on usage patterns and/or activity levels of the first peripheral and/or the second peripheral. For example, the charging completion criteria for the first peripheral include a requirement that is met during a predefined time period prior to when a user typically begins using the first peripheral (e.g., during a time when a user typically does not use the first peripheral, such as while the user is sleeping, and within a predefined amount of time, such as an hour, two hours, 45 minutes, etc., prior to when the user typically uses the first peripheral, such as upon waking up, such that the first peripheral is fully charged, or approximately fully charged, when the user typically begins using the first peripheral).

In some embodiments, the electronic device initiates charging of the first peripheral to the charge limit of the first peripheral by transmitting instructions to the second peripheral to charge the first peripheral. In some embodiments, the instructions to the second peripheral include instructions to charge the first peripheral to the charge limit. In some embodiments, charging of the first peripheral is automatically stopped at the charge limit (e.g., by charging protection circuitry and/or software) without the instructions to the second peripheral specifying a charge level to which to charge the first peripheral. In some embodiments, in accordance with a determination that the charging completion criteria for the first peripheral are not met (e.g., while the charging completion criteria for the first peripheral are not met), the charge level of the first peripheral is maintained at the first threshold charge level (e.g., charging of the first peripheral to above the first threshold charge level is forgone).

In some embodiments, the electronic device receives (1010) a request to establish the wireless communication between the electronic device and the set of peripherals (e.g., a request to communicate with device 100, transmitted from case 904 to device 100 in response to case 904 being opened (FIG. 9D)). In some embodiments, in response to receiving the request to establish the wireless communication, the electronic device displays a user interface (e.g., user interface 910 (FIG. 9D)) that includes: an indication that the wireless communication has been established (e.g., optionally, the display of user interface 910 serves as the indication that the wireless communication has been established; alternatively, user interface 910 includes a separate indication about the wireless connection, such as the information about earbuds 902 and case 904 displayed in user interface 910 (FIG. 9D)); and an indication that charging of the first peripheral is currently limited to the first threshold charge level (e.g., indication 922 indicating that optimized charging of earbuds 902 is enabled (FIG. 9D)). In some embodiments, the user interface includes information about a charge level of the first peripheral (e.g., indication 916 of the charging status of earbuds 902 (FIG. 9D)) (or in some embodiments, respective charge levels of one or more (or two or more) components of the first peripheral) and/or information about a charge level of the second peripheral (e.g., indication 920 of the charging status of case 904 (FIG. 9D)).

Displaying an indication that battery charging is limited to a level below a charge limit of the battery provides the user with visual feedback about the current state of battery charging. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the electronic device displays (1012) a first user interface element, wherein activation of the first user interface element corresponds to a request to charge the first peripheral to the charge limit (e.g., beyond the first threshold charge level). For example, in FIG. 9D, user interface 910 includes optimized charging override button 924. In some embodiments, the first user interface element is displayed in the user interface (e.g., user interface 910 (FIG. 9D)) indicating that the wireless communication has been established, optionally with an indication that charging of the first peripheral to the charge limit has been initiated (e.g., indication 916 of the charging status of earbuds 902). In some embodiments, the charging completion criteria for the first peripheral include a requirement that an input activating the first user interface element is received (e.g., while the electronic device remains in wireless communication with the first peripheral and the second peripheral). In some embodiments, in response to receiving an input activating the first user interface element, the electronic device initiates charging of the first peripheral to the charge limit (e.g., by transmitting instructions to the second peripheral to charge the first peripheral). For example, in response to input 926 on optimized charging override button 924 (FIG. 9F), device 100 initiates charging of earbuds 902 to full (e.g., as shown in and described with reference to FIGS. 9G-9H).

Displaying a user interface element that can be activated to remove the limit on battery charging so that charging of the battery to full can proceed enables the user to quickly override the default behavior when the default behavior is not appropriate or desired, without requiring the user to navigate through complex settings menu hierarchies. Providing additional control options while reducing the number of inputs needed to access such control options enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the electronic device receives (1014) an input corresponding to a request to charge the electronic device (e.g., detecting coupling of the electronic device with a power source or charger) (e.g., placement of device 100 on charging pad 956 (FIG. 9O)). In some embodiments, in response to receiving the input corresponding to the request to charge the electronic device, the electronic device: initiates charging of the electronic device (e.g., to a threshold charge level for the electronic device that is less than a charge limit of the electronic device) (e.g., in FIG. 9P, device 100 is already charged to 80%, the threshold charge level for optimized charging in the example in FIG. 9P) and displays a second user interface element (e.g., optimized charging user interface 962 (FIG. 9P)) that includes information about: a charge level of the electronic device (e.g., battery status information 964 for device 100 (FIG. 9P)); and one or more charge levels of the first peripheral (e.g., battery status information 966 for earbuds 902 (FIG. 9P)) (or in some embodiments, respective charge levels of one or more (or two or more) components of the first peripheral) and/or the second peripheral (e.g., battery status information 968 for case 904 (FIG. 9P)).

Displaying an indication of the charge level of an electronic device as well as the charge level(s) of one or more connected peripherals in response to an input to initiate charging of the electronic device provides the user with visual feedback about the current battery levels of multiple devices/peripherals that may need to be charged. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the electronic device receives (1016) an input corresponding to activation of the second user interface element (e.g., a tap input or a press input such as a long press input, such as input 974 (FIG. 9S)). In some embodiments, in response to receiving the input corresponding to activation of the second user interface element, the electronic device displays a plurality of user interface elements (e.g., in a user interface such as updated optimized charging user interface 962-2 (FIG. 9T)), including (e.g., at least two of the following): a third user interface element corresponding to the electronic device (e.g., optimized charging override button 976-1 (FIG. 9T)); a fourth user interface element corresponding to the first peripheral (e.g., optimized charging override button 976-2 (FIG. 9T)); and a fifth user interface element corresponding to the electronic device and to the first peripheral (e.g., optimized charging override button 976-3 (FIG. 9T)). In some embodiments, the electronic device receives an input corresponding to activation of a respective user interface element of the plurality of user interface elements. In some embodiments, in response to receiving the input corresponding to activation of the respective user interface element: in accordance with a determination that charging completion criteria for the electronic device are met, including a determination that the respective user interface element is the third user interface element or the fifth user interface element, the electronic device initiates charging of the electronic device to a charge limit of the electronic device. In some embodiments, determining that the charging completion criteria for the first peripheral include are met includes determining that the respective user interface element is the fourth user interface element or the fifth user interface element. In some embodiments, in response to receiving an input activating the third or fifth user interface element, the electronic device initiates charging of the first peripheral to the charge limit. For example, in response to input 978 (FIG. 9U), charging criteria for device 100 and earbuds 902 are satisfied, and both device 100 and earbuds 902 begin charging to full (FIG. 9V).

Allowing activation of a displayed user interface element indicating charge levels of an electronic device and one or more peripherals, resulting in display of another user interface element that can be activated to remove limits on battery charging so that the electronic device and/or peripheral(s) can be charged to full, enables the user to quickly override the default behavior when the default behavior is not appropriate or desired, without requiring the user to navigate through complex settings menu hierarchies. Providing additional control options while reducing the number of inputs needed to access such control options enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, receiving the input corresponding to the request to charge the electronic device includes (1018) detecting wireless coupling of the electronic device with a power source that transmits power to the electronic device wirelessly (e.g., an inductive charger) (e.g., which causes the displaying of the second user interface element, as described with reference to operation 1014). For example, in response to wireless coupling of device 100 with charging pad 956 (e.g., via the placement of device 100 on charging pad 956 (FIG. 9O)), device 100 displays optimized user interface 962 (FIG. 9P).

Displaying an indication of the charge level of one or more peripherals, in some cases in addition to displaying an indication of the charge level of an electronic device, in response to an input to initiate charging of the electronic device provides the user with visual feedback about the current battery levels of additional devices/peripherals that may need to be charged. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, while displaying the second user interface element (e.g., that includes the information about the charge levels), the electronic device detects (1020) coupling of the second peripheral with a power source (e.g., receiving an input corresponding to a request to initiate charging of the second peripheral). In some embodiments, in response to detecting the coupling of the second peripheral with a power source, the electronic device ceases to display the information about the one or more charge levels of the first peripheral and/or the second peripheral. In some embodiments, information about the charge level of the electronic device is displayed in a first respective user interface element that is separate from a second respective user interface element that displays the information about the charge level(s) of the first peripheral and/or the second peripheral. In some embodiments, in response to receiving the input corresponding to the request to charge the second peripheral, the electronic device ceases to display the second respective user interface element (e.g., and optionally continues to display the first respective user interface element). For example, in response to detecting coupling of case 904 with a power source, device 100 optionally ceases to display battery status information 968 for case 904 in optimized charging user interface 962.

Ceasing to display the indication of the charge level of one or more peripherals (e.g., one or more earbuds and/or a charging case for the earbuds) in response to detecting coupling of a respective peripheral (e.g., the charging case) to a power source provides the user with visual feedback that charging of at least the respective peripheral has been initiated and removes a notification that has been addressed and that no longer needs to be displayed. Providing improved feedback to the user and reducing clutter in the user interface enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, (e.g., while the electronic device is in wireless communication with the set of peripherals) in accordance with a determination that a charge level of the second peripheral is below a threshold charge level for the second peripheral (e.g., a low charge threshold) (1022), the electronic device displays an alert of the charge level of the second peripheral. In some embodiments, the alert of the charge level of the second peripheral is not displayed if the charge level of the second peripheral is above the threshold charge level. In some embodiments, the alert of the charge level of the second peripheral is conditionally displayed and is different from an indication of the charge level of the second peripheral, where the indication is displayed without regard to the charge level of the second peripheral (e.g., the indication is a battery level indicator for the second peripheral, and the alert indicates that the battery level is below a threshold). In some embodiments, the alert of the charge level of the second peripheral is displayed upon establishing wireless communication between the electronic device and the set of peripherals (or more specifically, the second peripheral). In some embodiments, the alert of the charge level of the second peripheral is displayed in response to the charge level of the second peripheral decreasing below the threshold charge level for the second peripheral, during charging of the first peripheral by the second peripheral. For example, FIGS. 9L-9N show different examples of displayed indications that the battery level of case 904 is low. In some embodiments, the alert of the charge level of the second peripheral is displayed in response to detecting coupling of the electronic device with a power source.

Displaying an alert that the charge level of the second peripheral is below a threshold charge level provides visual feedback to the user prompting the user to charge the second peripheral so that the user can continue to use the second peripheral (and other peripherals that rely on the second peripheral, for example for charging). Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the second peripheral is (1024) a case for the first peripheral (e.g., a case for multiple peripheral components of the first peripheral, that is capable of charging the first peripheral or the components of the first peripheral), and displaying the alert of the charge level of the second peripheral is performed (e.g., in accordance with the determination that the charge level of the second peripheral is below the threshold charge level for the second peripheral, and) in response to detecting opening of the case (e.g., in addition to being performed in accordance with the determination that the charge level of the second peripheral is below the threshold charge level for the second peripheral). For example, in FIGS. 9W-9X and 9AA-9AB, device 100 displays a low battery alert 952 for a charging case 904 in accordance with a determination that the charge level of the charging case 904 is below a threshold charge level for the charging case 904, and in response to opening of the case.

Where the second peripheral is a charging case for the first peripheral, displaying an alert that the charge level of the case is below a threshold charge level in response to detecting opening of the case provides visual feedback to the user of the charge state of the case, that prompts the user to charge the case so that the user can continue to use the case to charge the first peripheral. Requiring user interaction with the case, such as opening of the case, in order for the alert to be displayed reduces how often the case communicates its charge state information, thereby reducing power usage and improving battery life of the case. In addition, providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, displaying the alert of the charge level of the second peripheral is performed (1026) (e.g., in accordance with the determination that the charge level of the second peripheral is below the threshold charge level for the second peripheral, and in response to detecting the opening of the case, and) in accordance with a determination that the first peripheral is coupled with the second peripheral (e.g., one or more peripheral components of the first peripheral are coupled with the second peripheral, such as one or both earbuds of a pair of earbuds being positioned inside the charging case, sometimes called an earbud case). For example, in FIGS. 9AA-9AB, device 100 displays a low battery alert 952 for charging case 904, in response to opening of the charging case, in accordance with a determination that the charge level of the charging case 904 is below a threshold charge level for the charging case 904, and a determination that one or both earbuds 902 are coupled with (positioned inside) the charging case 904.

Where the second peripheral is a charging case for the first peripheral, opening of the case while the first peripheral is positioned inside the case may indicate that the user is about to remove and use the first peripheral, thereby discharging the battery of the first peripheral. Because the user may eventually replace the first peripheral inside the case, particularly to recharge the first peripheral after its battery has been depleted from use, displaying an alert that the charge level of the case is below a threshold charge level in response to detecting the opening of the case while coupled with the first peripheral provides visual feedback to the user that prompts the user to charge the case, so that the case will have sufficient charge to later charge the first peripheral. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, displaying the alert of the charge level of the second peripheral is performed (1028) (e.g., in accordance with the determination that the charge level of the second peripheral is below the threshold charge level for the second peripheral, and) in response to detecting decoupling of the first peripheral from the second peripheral (e.g., detecting decoupling of one or more peripheral components of the first peripheral from the second peripheral, such as removal of one or both earbuds of a pair of earbuds from (e.g., inside) a charging case). Optionally, where the second peripheral is a case for the first peripheral (e.g., the decoupling of the first peripheral from the second peripheral includes removal of the first peripheral from the case), the decoupling of the first peripheral must occur while the case is open. For example, in FIGS. 9AC-9AD, device 100 displays a low battery alert 952 for charging case 904, in response to removal of an earbud 902 from charging case 904, in accordance with a determination that the charge level of the charging case 904 is below a threshold charge level for the charging case 904. As shown in FIGS. 9AC-9AD, in this example, removal of an earbud 902 from charging case 904 requires that the charging case be open.

Where the second peripheral is a charging case for the first peripheral, removal of the first peripheral from the case may indicate that the user is about use the first peripheral, thereby discharging the battery of the first peripheral. Because the user may eventually replace the first peripheral inside the case, particularly to recharge the first peripheral after its battery has been depleted from use, displaying an alert that the charge level of the case is below a threshold charge level in response to detecting the removal of the first peripheral from the case provides visual feedback to the user that prompts the user to charge the case, so that the case will have sufficient charge to later charge the first peripheral. Requiring user interaction with the case, such as opening of the case and/or removal of the first peripheral, in order for the alert to be displayed reduces how often the case communicates its charge state information, thereby reducing power usage and improving battery life of the case. In addition, providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, displaying the alert of the charge level of the second peripheral is performed (1030) (e.g., in accordance with the determination that the charge level of the second peripheral is below the threshold charge level for the second peripheral, and) in response to detecting coupling of the first peripheral with the second peripheral (e.g., detecting coupling of one or more peripheral components of the first peripheral with the second peripheral, such as by detecting placement of one or both earbuds of a pair of earbuds into a charging case). Optionally, where the second peripheral is a case for the first peripheral (e.g., the coupling of the first peripheral with the second peripheral includes placement of the first peripheral into the case), the coupling of the first peripheral must occur while the case is open. For example, in FIGS. 9Y-9Z, device 100 displays a low battery alert 952 for charging case 904, in response to an earbud 902 being placed into charging case 904, in accordance with a determination that the charge level of the charging case 904 is below a threshold charge level for the charging case 904. As shown in FIGS. 9Y-9Z, in this example, placing an earbud 902 into charging case 904 requires that the charging case be open.

Where the second peripheral is a charging case for the first peripheral, placement of the first peripheral inside the case may initiate charging of the first peripheral by the case (e.g., if the first peripheral is not fully charged), which would discharge the battery of the case. However, if the charge level of the case is below a threshold charge level, the case may be unable to charge the first peripheral. Accordingly, displaying an alert that the charge level of the case is below the threshold charge level in response to detecting placement of the first peripheral inside the case provides visual feedback to the user that prompts the user to charge the case, so that the first peripheral may be charged, and also to replenish the battery of the case. Requiring user interaction with the case, such as opening of the case and/or insertion of the first peripheral, in order for the alert to be displayed reduces how often the case communicates its charge state information, thereby reducing power usage and improving battery life of the case. In addition, providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, (e.g., while the electronic device is in wireless communication with the set of peripherals, and optionally before the first peripheral satisfies the charging criteria that require that the first peripheral is coupled with the second peripheral) in accordance with a determination that a charge level of the first peripheral is below a second threshold charge level for the first peripheral (e.g., a low charge threshold) (1032), the electronic device displays an alert of the charge level of the first peripheral. For example, in FIG. 9J, device 100 displays notification 932 in response to the battery level of earbuds 902 decreasing below an example low charge level of 10%. In some embodiments, the second threshold charge level (e.g., a threshold low charge level of 5%, 10%, or 15%, or a predefined value between 5% and 15%, inclusive, for a low battery alert as in the example in FIG. 9J) is different from (e.g., below) the first threshold charge level for the first peripheral (e.g., a threshold charge limit of 75%, 80% or 90%, or a predefined value between 70% and 90%, inclusive, for optimized charging as in the example in FIG. 9E). In some embodiments, the second threshold charge level is the same as the first threshold charge level for the first peripheral. In some embodiments, determining that the charge level of the first peripheral is below the second threshold charge level for the first peripheral includes determining that a respective charge level of a component of the first peripheral (e.g., a respective earbud of one or more earbuds that make up the first peripheral) is below the second threshold charge level. In some embodiments, determining that the charge level of the first peripheral is below the second threshold charge level for the first peripheral includes determining that the respective charge levels of multiple (e.g., all) components of the first peripheral (e.g., both of two earbuds) are below the second threshold charge level.

In some embodiments, the alert of the charge level of the first peripheral is not displayed if the charge level of the first peripheral is above the second threshold charge level. In some embodiments, the alert of the charge level of the first peripheral is conditionally displayed and is different from an indication of the charge level of the first peripheral, where the indication is displayed without regard to the charge level of the first peripheral (e.g., the indication is a battery level indicator for the first peripheral, and the alert indicates that the battery level is below a threshold). In some embodiments, the alert of the charge level of the first peripheral is displayed in response to the charge level of the first peripheral decreasing below the threshold charge level for the first peripheral, during use of the first peripheral (e.g., to output audio) while the first peripheral is not coupled with, and not being charged by, the second peripheral.

Displaying an alert that the charge level of the first peripheral is below a threshold charge level provides visual feedback to the user prompting the user to charge the first peripheral so that the user can continue to use the first peripheral. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in accordance with the determination that the charge level of the first peripheral is below the second threshold charge level for the first peripheral, the first peripheral outputs (1034) an audio alert in conjunction with the electronic device displaying the alert of the charge level of the first peripheral. In some embodiments, the audio alert at the first peripheral is a tone, beep, chime, or other audible alert. In some embodiments, the audio alert at the first peripheral is synchronized with the displayed alert at the electronic device (e.g., output of the audio alert and the displayed alert are initiated at the same time, or output of the audio alert and the displayed alert are initiated at respective times to compensate for any time delay between initiating output of an alert and actual output of the alert, such that the two alerts are output simultaneously). For example, as shown in FIGS. 9I-9J, an audio alert 934 is output by one or both earbuds 902-1 and/or 902-2 in conjunction with display of a low battery alert 932 by device 100, in accordance with a determination that the charge level of the earbuds is below a second threshold level.

Providing an audio alert in conjunction with, and in some cases synchronized with, displaying the visual alert of the low charge level of the second peripheral provides additional feedback to the user prompting the user to charge the first peripheral so that the user can continue to use the first peripheral. Providing multiple types of feedback simultaneously increases the likelihood that the user will notice the feedback, associate the different feedback with the same action, and perform the action. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800 and 850) are also applicable in an analogous manner to method 1000 described above with respect to FIGS. 10A-10C. For example, the devices, device connections, user interfaces, and alerts described above with reference to method 1000 optionally have one or more of the characteristics of the devices, device connections, user interfaces, and alerts described herein with reference to other methods described herein (e.g., methods 600, 800 and 850). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at a first electronic device:
while an audio output device is concurrently wirelessly connected with both the first electronic device and a second electronic device that is different from the first electronic device and playing first audio corresponding to first audio data transmitted by the second electronic device to the audio output device:
detecting, at the first electronic device, a user request to play a second audio that is associated with a media item; and
in response to detecting the user request, transmitting to the audio output device second audio data corresponding to the second audio;
wherein, in accordance with the second audio data being transmitted to the audio output device, the audio output device ceases playing the first audio, and begins playing the second audio.
2. The method of claim 1, wherein the first electronic device, the second electronic device, and the audio output device are associated with an identical user account.
3. The method of claim 1, wherein the audio output device, while concurrently wirelessly connected with both the first electronic device and the second electronic device, is disconnected from the second electronic device in accordance with the second electronic device transitioning from an active state to an inactive state.
4. The method of claim 3, the method further including:
in accordance with a determination that the second electronic device is in the inactive state and fails to satisfy proximity criteria with respect to the audio output device, presenting an alert indicating that the audio output device is disconnected from the second electronic device; and
in accordance with a determination that the second electronic device has transitioned from the active state to the inactive state and satisfies the proximity criteria with respect to the audio output device, presenting an alert indicating that the audio output device is disconnected from the second electronic device.
5. The method of claim 1, the method including:
while the audio output device is concurrently wirelessly connected with both the first electronic device and the second electronic device:
determining whether the first electronic device fails to satisfy proximity criteria with respect to the audio output device; and
in response to determining that the first electronic device fails to satisfy the proximity criteria with respect to the audio output device, displaying a disconnection alert.
6. The method of claim 1, the method further including:
while the audio output device is wirelessly connected with the second electronic device but not the first electronic device:
in response to the first electronic device satisfying connection criteria, including the first electronic device transitioning from an inactive state to an active state, establishing a connection between the first electronic device and the audio output device, wherein, after the connection between the first electronic device and the audio output device is established, the audio output device is concurrently wirelessly connected with both the first electronic device and the second electronic device.
7. The method of claim 1, the method further including:
in response detecting at the first electronic device, while the audio output device is wirelessly connected with the second electronic device but not the first electronic device, a user request to play the second audio that is associated with a media item:
   establishing a connection between the first electronic device and the audio output device, wherein, after the connection between the first electronic device and the audio output device is established, the audio output device is concurrently wirelessly connected with both the first electronic device and the second electronic device.

8. The method of claim 7, the method including:
after establishing a connection between the first electronic device and the audio output device, and before playing the second audio, conveying an alert to a user of the first electronic device indicating that the audio output device is connected to the first electronic device.

9. The method of claim 8, wherein the alert conveying that the audio output device is connected to the first electronic device is displayed in accordance with a determination that the first electronic device is in an active state.

10. The method of claim 7, the method including:
in response to detecting at the first electronic device, while the audio output device is wirelessly connected with the second electronic device but not the first electronic device, the user request to play the second audio that is associated with a media item:
   in accordance with a determination that the first electronic device does not have an established audio output path to the audio output device, pausing the second audio until an audio output path to the audio output device is established, and playing the second audio upon establishing the audio output path to the audio output device; and
   in accordance with a determination that the first electronic device has an established audio output path to the audio output device, playing the second audio.

11. The method of claim 1, wherein, in accordance with the second audio data being transmitted to the audio output device and the audio output device ceasing playing the first audio, the first audio is paused on the second electronic device.

12. The method of claim 1, the method including:
after transmitting to the audio output device second audio data corresponding to the second audio, ceasing to play the second audio in response to receiving a request from the second electronic device to cease playing the second audio, wherein the request to cease to play second audio occurs in response to a user selection of a selectable user interface element displayed on a display of the second electronic device that causes the first audio to resume playback on the audio output device.

13. The method of claim 1, the method including:
in response to detecting the user request and before transmitting to the audio output device second audio data corresponding to the second audio, displaying on the first electronic device a prompt that displays an option for connecting the first electronic device to the audio output device.

14. A first electronic device, comprising:
a display;
an input device;
one or more processors; and
memory storing one or more programs, wherein the one or more programs are configured to be executed by the one or more processors, the one or more programs including instructions for:
   while an audio output device is concurrently wirelessly connected with both the first electronic device and a second electronic device that is different from the first electronic device and playing first audio corresponding to first audio data transmitted by the second electronic device to the audio output device:
      detecting, at the first electronic device, a user request to play a second audio that is associated with a media item; and
      in response to detecting the user request, transmitting to the audio output device second audio data corresponding to the second audio;
      wherein, in accordance with the second audio data being transmitted to the audio output device, the audio output device ceases playing the first audio, and begins playing the second audio.

15. The first electronic device of claim 14, wherein the first electronic device, the second electronic device, and the audio output device are associated with an identical user account.

16. The first electronic device of claim 14, wherein the audio output device, while concurrently wirelessly connected with both the first electronic device and the second electronic device, is disconnected from the second electronic device in accordance with the second electronic device transitioning from an active state to an inactive state.

17. The first electronic device of claim 16, wherein the one or more programs include instructions for:
   in accordance with a determination that the second electronic device is in the inactive state and fails to satisfy proximity criteria with respect to the audio output device, presenting an alert indicating that the audio output device is disconnected from the second electronic device; and
   in accordance with a determination that the second electronic device has transitioned from the active state to the inactive state and satisfies the proximity criteria with respect to the audio output device, forgoing presenting an alert indicating that the audio output device is disconnected from the second electronic device.

18. The first electronic device of claim 14, wherein the one or more programs include instructions for:
   while the audio output device is concurrently wirelessly connected with both the first electronic device and the second electronic device:
      determining whether the first electronic device fails to satisfy proximity criteria with respect to the audio output device; and
      in response to determining that the first electronic device fails to satisfy the proximity criteria with respect to the audio output device, displaying a disconnection alert.

19. The first electronic device of claim 14, wherein the one or more programs include instructions for:
   while the audio output device is wirelessly connected with the second electronic device but not the first electronic device:
      in response to the first electronic device satisfying connection criteria, including the first electronic device transitioning from an inactive state to an active state, establishing a connection between the first electronic device and the audio output device, wherein, after the connection between the first electronic device and the audio output device is established, the audio output device is concurrently wirelessly connected with both the first electronic device and the second electronic device.

20. A non-transitory computer readable storage medium storing one or more programs, the one or more programs comprising instructions that, when executed by a first electronic device with a display and an input device, cause a first electronic device to:
 while an audio output device is concurrently wirelessly connected with both the first electronic device and a second electronic device that is different from the first electronic device and playing first audio corresponding to first audio data transmitted by the second electronic device to the audio output device:
  detect, at the first electronic device, a user request to play a second audio that is associated with a media item; and
  in response to detecting the user request, transmit to the audio output device second audio data corresponding to the second audio;
 wherein, in accordance with the second audio data being transmitted to the audio output device, the audio output device ceases playing the first audio, and begins playing the second audio.

21. The first electronic device of claim 14, wherein the one or more programs include instructions for:
 in response detecting at the first electronic device, while the audio output device is wirelessly connected with the second electronic device but not the first electronic device, a user request to play the second audio that is associated with a media item:
  establishing a connection between the first electronic device and the audio output device, wherein, after the connection between the first electronic device and the audio output device is established, the audio output device is concurrently wirelessly connected with both the first electronic device and the second electronic device.

22. The first electronic device of claim 21, wherein the one or more programs include instructions for:
 after establishing a connection between the first electronic device and the audio output device, and before playing the second audio, conveying an alert to a user of the first electronic device indicating that the audio output device is connected to the first electronic device.

23. The first electronic device of claim 22, wherein the alert conveying that the audio output device is connected to the first electronic device is displayed in accordance with a determination that the first electronic device is in an active state.

24. The first electronic device of claim 21, wherein the one or more programs include instructions for:
 in response to detecting at the first electronic device, while the audio output device is wirelessly connected with the second electronic device but not the first electronic device, the user request to play the second audio that is associated with a media item:
  in accordance with a determination that the first electronic device does not have an established audio output path to the audio output device, pausing the second audio until an audio output path to the audio output device is established, and playing the second audio upon establishing the audio output path to the audio output device; and
  in accordance with a determination that the first electronic device has an established audio output path to the audio output device, playing the second audio.

25. The first electronic device of claim 14, wherein in accordance with the second audio data being transmitted to the audio output device and the audio output device ceasing playing the first audio, the first audio is paused on the second electronic device.

26. The first electronic device of claim 14, wherein the one or more programs include instructions for:
 after transmitting to the audio output device second audio data corresponding to the second audio, ceasing to play the second audio in response to receiving a request from the second electronic device to cease playing the second audio, wherein the request to cease to play second audio occurs in response to a user selection of a selectable user interface element displayed on a display of the second electronic device that causes the first audio to resume playback on the audio output device.

27. The first electronic device of claim 14, wherein the one or more programs include instructions for:
 in response to detecting the user request and before transmitting to the audio output device second audio data corresponding to the second audio, displaying on the first electronic device a prompt that displays an option for connecting the first electronic device to the audio output device.

28. The computer readable storage medium of claim 20, wherein the first electronic device, the second electronic device, and the audio output device are associated with an identical user account.

29. The computer readable storage medium of claim 20, wherein the audio output device, while concurrently wirelessly connected with both the first electronic device and the second electronic device, is disconnected from the second electronic device in accordance with the second electronic device transitioning from an active state to an inactive state.

30. The computer readable storage medium of claim 29, wherein the one or more programs comprise instructions that, when executed by the first electronic device with the display and the input device, cause the first electronic device to:
 in accordance with a determination that the second electronic device is in the inactive state and fails to satisfy proximity criteria with respect to the audio output device, present an alert indicating that the audio output device is disconnected from the second electronic device; and
 in accordance with a determination that the second electronic device has transitioned from the active state to the inactive state and satisfies the proximity criteria with respect to the audio output device, forgo presenting an alert indicating that the audio output device is disconnected from the second electronic device.

31. The computer readable storage medium of claim 20, wherein the one or more programs comprise instructions that, when executed by the first electronic device with the display and the input device, cause the first electronic device to:
 while the audio output device is concurrently wirelessly connected with both the first electronic device and the second electronic device:
 determine whether the first electronic device fails to satisfy proximity criteria with respect to the audio output device; and
 in response to determining that the first electronic device fails to satisfy the proximity criteria with respect to the audio output device, display a disconnection alert.

32. The computer readable storage medium of claim 20, wherein the one or more programs comprise instructions that, when executed by the first electronic device with the display and the input device, cause the first electronic device to:
- while the audio output device is wirelessly connected with the second electronic device but not the first electronic device:
  - in response to the first electronic device satisfying connection criteria, including the first electronic device transitioning from an inactive state to an active state, establish a connection between the first electronic device and the audio output device, wherein, after the connection between the first electronic device and the audio output device is established, the audio output device is concurrently wirelessly connected with both the first electronic device and the second electronic device.

33. The computer readable storage medium of claim 20, wherein the one or more programs comprise instructions that, when executed by the first electronic device with the display and the input device, cause the first electronic device to:
- in response detecting at the first electronic device, while the audio output device is wirelessly connected with the second electronic device but not the first electronic device, a user request to play the second audio that is associated with a media item:
  - establish a connection between the first electronic device and the audio output device, wherein, after the connection between the first electronic device and the audio output device is established, the audio output device is concurrently wirelessly connected with both the first electronic device and the second electronic device.

34. The computer readable storage medium of claim 33, wherein the one or more programs comprise instructions that, when executed by the first electronic device with the display and the input device, cause the first electronic device to:
- after establishing a connection between the first electronic device and the audio output device, and before playing the second audio, convey an alert to a user of the first electronic device indicating that the audio output device is connected to the first electronic device.

35. The computer readable storage medium of claim 34, wherein the alert conveying that the audio output device is connected to the first electronic device is displayed in accordance with a determination that the first electronic device is in an active state.

36. The computer readable storage medium of claim 33, wherein the one or more programs comprise instructions that, when executed by the first electronic device with the display and the input device, cause the first electronic device to:
- in response to detecting at the first electronic device, while the audio output device is wirelessly connected with the second electronic device but not the first electronic device, the user request to play the second audio that is associated with a media item:
  - in accordance with a determination that the first electronic device does not have an established audio output path to the audio output device, pause the second audio until an audio output path to the audio output device is established, and play the second audio upon establishing the audio output path to the audio output device; and
  - in accordance with a determination that the first electronic device has an established audio output path to the audio output device, play the second audio.

37. The computer readable storage medium of claim 20, wherein, in accordance with the second audio data being transmitted to the audio output device and the audio output device ceasing playing the first audio, the first audio is paused on the second electronic device.

38. The computer readable storage medium of claim 20, wherein the one or more programs comprise instructions that, when executed by the first electronic device with the display and the input device, cause the first electronic device to:
- after transmitting to the audio output device second audio data corresponding to the second audio, cease to play the second audio in response to receiving a request from the second electronic device to cease playing the second audio, wherein the request to cease to play second audio occurs in response to a user selection of a selectable user interface element displayed on a display of the second electronic device that causes the first audio to resume playback on the audio output device.

39. The computer readable storage medium of claim 20, wherein the one or more programs comprise instructions that, when executed by the first electronic device with the display and the input device, cause the first electronic device to:
- in response to detecting the user request and before transmitting to the audio output device second audio data corresponding to the second audio, display on the first electronic device a prompt that displays an option for connecting the first electronic device to the audio output device.

\* \* \* \* \*